(12) United States Patent
Allen et al.

(10) Patent No.: US 7,802,685 B2
(45) Date of Patent: Sep. 28, 2010

(54) MULTISTEP SEPARATION OF PLASTICS

(75) Inventors: Laurence E. Allen, San Rafael, CA (US); Brian L. Riise, Richmond, CA (US); Paul C. Allen, El Cerrito, CA (US); Ron C. Rau, Oakland, CA (US); Michael B. Biddle, El Cerrito, CA (US)

(73) Assignee: MBA Polymers, Inc., Richmond, CA (US)

( * ) Notice: Subject to any disclaimer, the term of this patent is extended or adjusted under 35 U.S.C. 154(b) by 1353 days.

(21) Appl. No.: 10/511,224

(22) PCT Filed: Apr. 14, 2003

(86) PCT No.: PCT/US03/11642

§ 371 (c)(1),
(2), (4) Date: Jun. 28, 2005

(87) PCT Pub. No.: WO03/086733

PCT Pub. Date: Oct. 23, 2003

(65) Prior Publication Data

US 2006/0001187 A1    Jan. 5, 2006

Related U.S. Application Data

(60) Provisional application No. 60/372,001, filed on Apr. 12, 2002, provisional application No. 60/397,948, filed on Jul. 22, 2002, provisional application No. 60/397,808, filed on Jul. 22, 2002, provisional application No. 60/397,953, filed on Jul. 22, 2002, provisional application No. 60/397,980, filed on Jul. 22, 2002.

(51) Int. Cl.
    *B04B 5/10*     (2006.01)
    *B07B 15/00*    (2006.01)
    *B03C 7/00*     (2006.01)

(52) U.S. Cl. ............... 209/12.1; 209/127.1; 209/930
(58) Field of Classification Search ............. 209/12.1, 209/12.2, 127.1, 127.4, 128, 930
See application file for complete search history.

(56) References Cited

U.S. PATENT DOCUMENTS

| | | | |
|---|---|---|---|
| 5,131,212 A | 7/1992 | Grey et al. | |
| 5,314,071 A * | 5/1994 | Christian et al. | 209/4 |
| 5,895,790 A | 4/1999 | Good | |
| 6,007,005 A * | 12/1999 | Gonzales et al. | 241/20 |
| 6,090,862 A | 7/2000 | Tatsuda et al. | |
| 6,114,401 A | 9/2000 | Doonan | |
| 6,274,637 B1 | 8/2001 | Schallenberg | |
| 6,335,376 B1 * | 1/2002 | Allen et al. | 521/40.5 |
| 6,452,126 B1 * | 9/2002 | Xiao et al. | 209/127.1 |
| 6,460,788 B1 * | 10/2002 | de Feraudy | 241/19 |
| 6,689,838 B1 | 2/2004 | Fischer et al. | |
| 7,014,132 B2 * | 3/2006 | Vandeputte | 241/20 |
| 7,037,951 B2 | 5/2006 | Inagaki | |
| 2004/0004033 A1 | 1/2004 | Vandeputte | |
| 2004/0164005 A1 | 8/2004 | Allen, III | |
| 2004/0182753 A1 | 9/2004 | Allen, III et al. | |

FOREIGN PATENT DOCUMENTS

| | | |
|---|---|---|
| DE | 40 20 417 A | 1/1992 |
| DE | 44 24 143 A | 11/1996 |
| DE | 0761 763 A | 3/1997 |
| DE | 197 15 418 A | 10/1998 |
| DE | 197 44 964 A | 4/1999 |
| EP | 0 634 260 A2 | 1/1995 |
| EP | 0 696 618 A | 2/1996 |
| EP | 0 756 238 A1 | 1/1997 |
| EP | 1 226 913 A1 | 7/2002 |
| JP | 07-024437 | 1/1995 |
| JP | 07-025943 A | 5/1995 |
| JP | 07-334583 | 12/1995 |
| JP | 08-259747 A | 2/1997 |
| JP | 10-225934 | 8/1998 |
| JP | 2001-323121 | 11/2001 |
| JP | 2002-088212 | 3/2002 |
| JP | 2002-292628 | 10/2002 |
| WO | WO 98/03318 | 1/1998 |
| WO | WO 99/25493 A | 5/1999 |
| WO | WO 01/81058 A | 11/2001 |
| WO | WO 03/087215 | 10/2003 |

| WO | WO 2004/009200 A1 | 1/2004 |
| WO | WO 2004/009242 A1 | 1/2004 |
| WO | WO 2005/123817 A1 | 12/2005 |

OTHER PUBLICATIONS

D. E. Karvelas et al., "Separation and Recovery of Thermoplastics by Froth Floatation", Nov. 9-11, 1999, 6$^{th}$ Annual Recycling Conference Proceedings Book, Detroit, Michigan, pp. 233-237.
European Search Report for Application No. EP 09 17 7754.0, dated Jan. 20, 2010, 4 pages.
Notice for Reasons for Rejection for Application No. JP 2003-583720, dated Jun. 16, 2009, 11 pages.
First Examination Report for Application No. IN 2533/CHENP/2004, dated Aug. 21, 2009, 2 pages.
Notification of the First Office Action for Application No. CN 03813514.0, dated May 25, 2007, 4 pages.
Notification of the Second Office Action for Application No. CN 03813514.0, dated Aug. 15, 2008, 4 pages.
Communication pursuant to Article 96(2) EPC for Application No. EP 03 746 760.2, dated Dec. 20, 2004, 5 pages.
Communication pursuant to Article 96(2) EPC for Application No. EP 03 746 760.2, dated Jul. 14, 2005, 5 pages.
Communication pursuant to Article 96(2) EPC for Application No. EP 03 746 760.2, dated Nov. 25, 2005, 4 pages.
Communication pursuant to Article 96(2) EPC for Application No. EP 03 746 760.2, dated Jun. 1, 2006, 5 pages.
Communication pursuant to Article 96(2) EPC for Application No. EP 03 746 760.2, dated Oct. 12, 2006, 5 pages.
Communication pursuant to Article 96(2) EPC for Application No. EP 03 746 760.2, dated Dec. 27, 2006, 5 pages.
Communication pursuant to Article 96(2) EPC for Application No. EP 03 746 760.2, dated Jul. 20, 2007, 5 pages.
Communication pursuant to Article 9(3) EPC for Application No. EP 03 746 760.2, dated Mar. 10, 2008, 7 pages.
Communication pursuant to Article 94(3) EPC for Application No. EP 03 746 760.2, dated Jul. 16, 2008, 4 pages.
Communication pursuant to Article 94(3) EPC for Application No. EP 03 746 760.2, dated Mar. 16, 2009, 2 pages.

\* cited by examiner

*Primary Examiner*—John Q Nguyen
*Assistant Examiner*—Mark Hageman
(74) *Attorney, Agent, or Firm*—Fish & Richardson P.C.

(57) ABSTRACT

Multistep recycling processes for preparing recycled plastic materials. The processes feature a sequence of operations selected from the group consisting of preprocessing operations, size reduction operations, gravity concentration operations, color sorting, sorting by thickness, friction, or differential terminal velocity or drag in air, surface to mass control operations, separation processes enhanced by narrow surface to mass distributions, blending operations, and extrusion and compounding operations. Plastic-rich mixtures are subjected to the process, and one or more recycled plastic materials are collected as outputs of the sequence of processes.

42 Claims, 25 Drawing Sheets

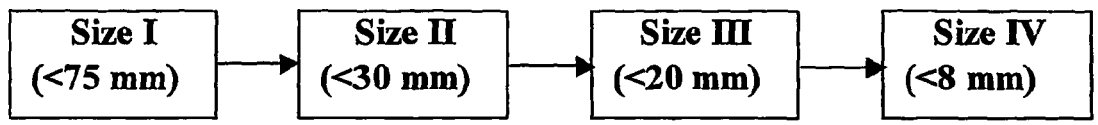
FIG._1
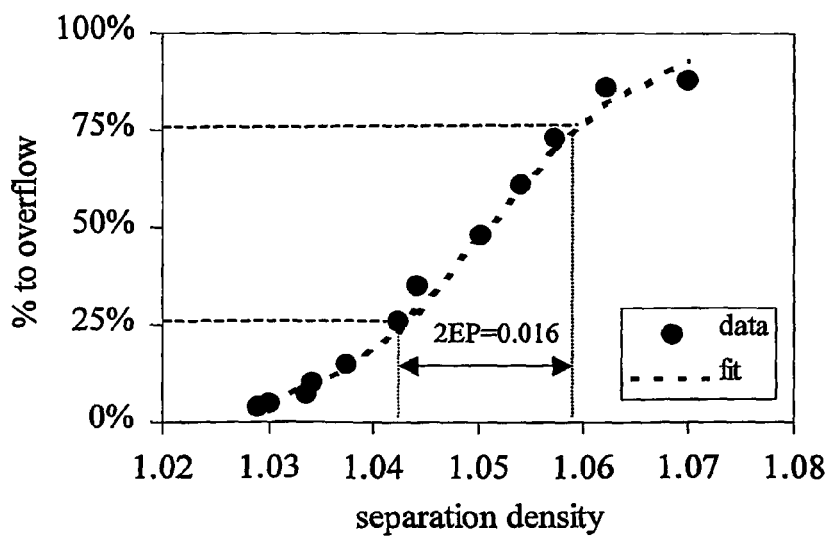
FIG._2

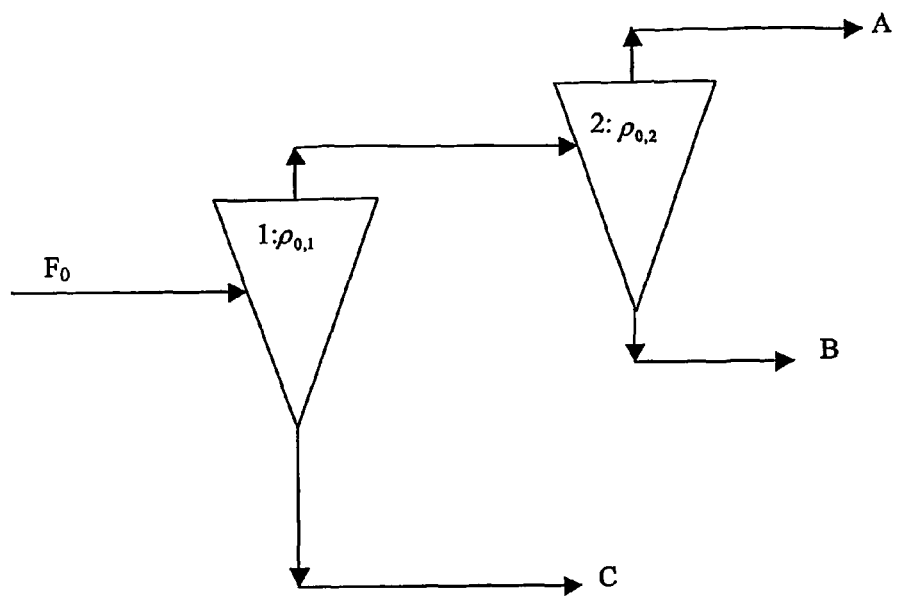
FIG._3
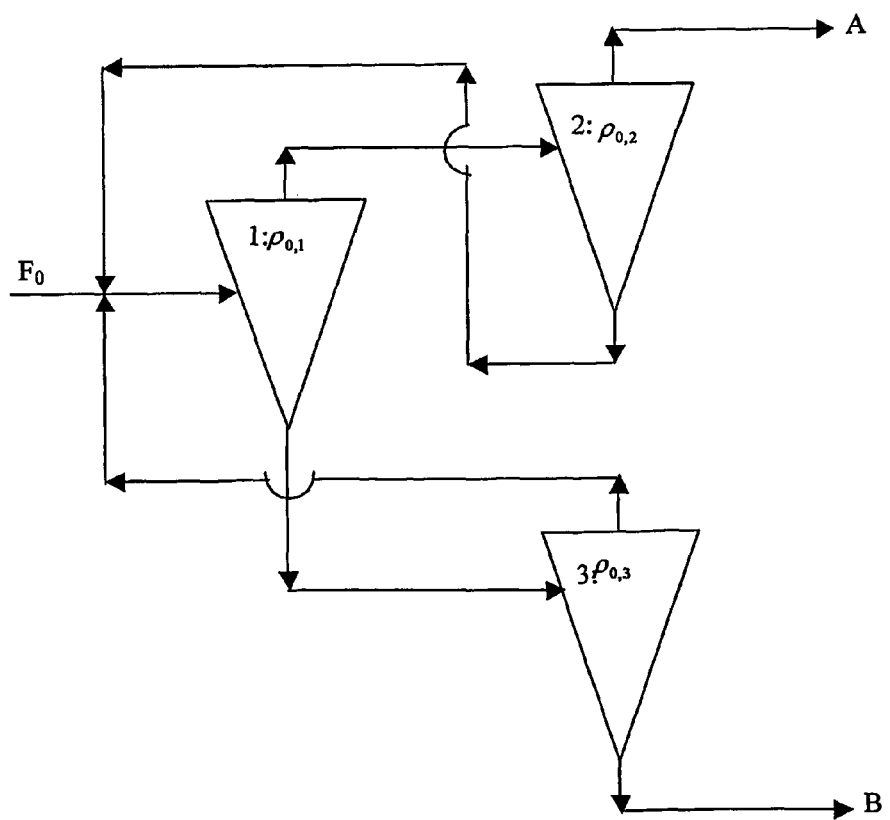
FIG._4

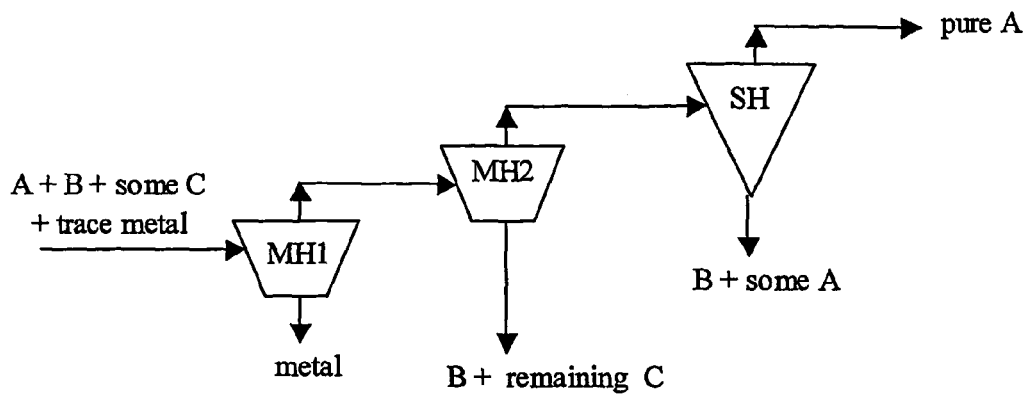
FIG._5
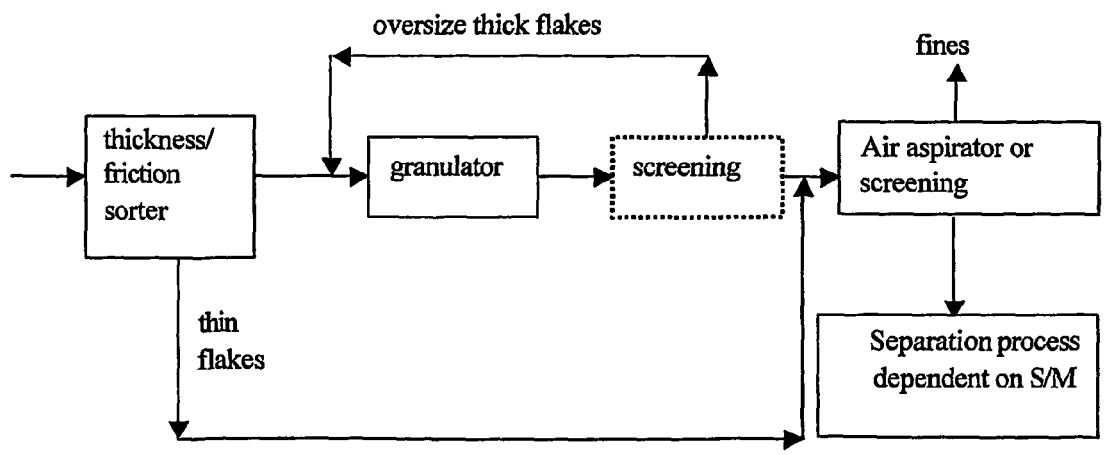
FIG._6

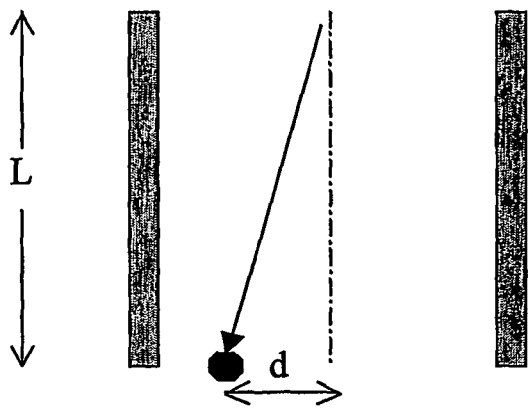
FIG._7
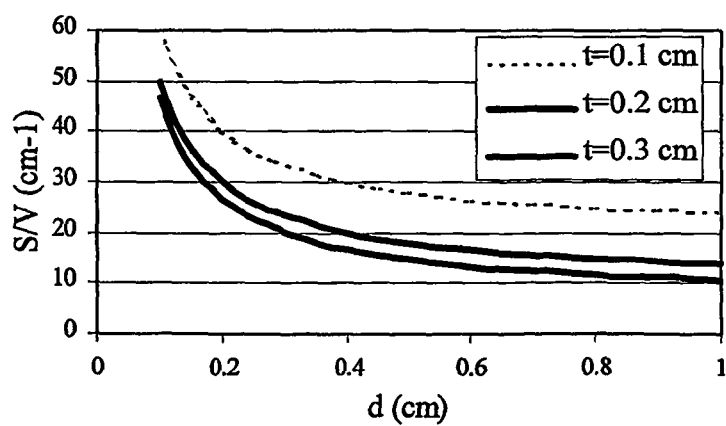
FIG._8

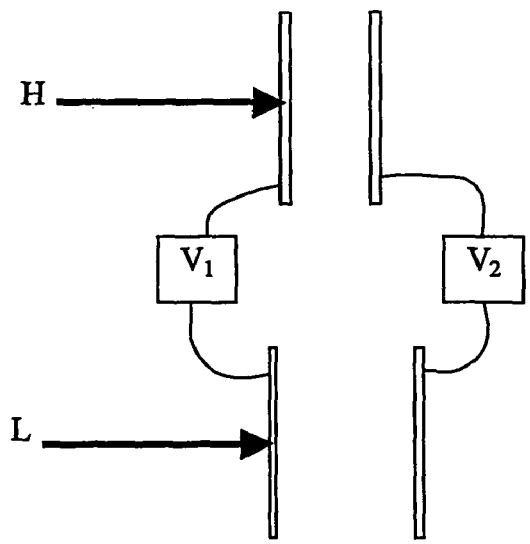
FIG._9
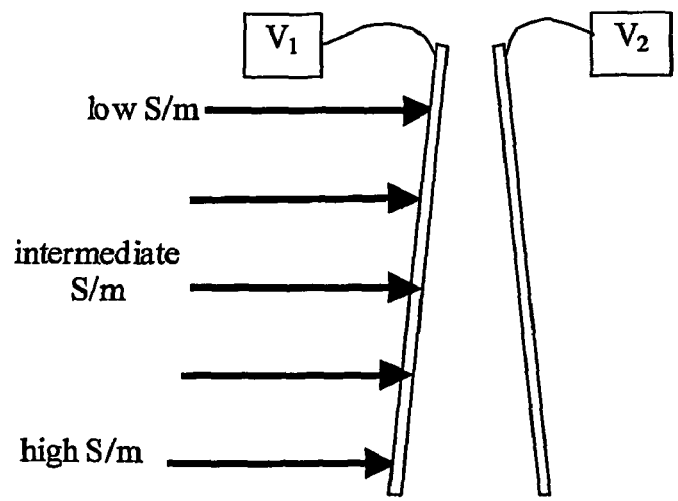
FIG._10

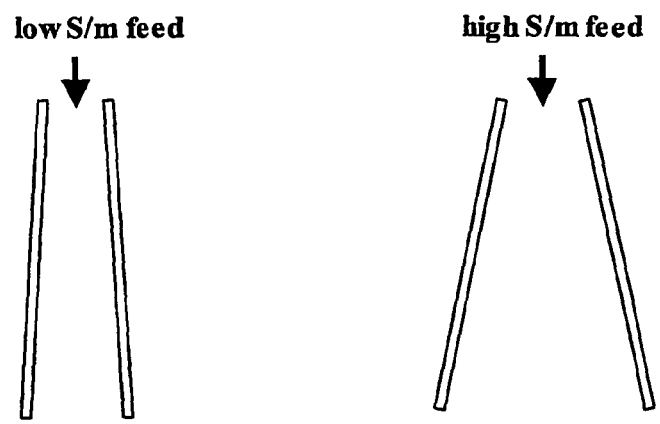
FIG._11
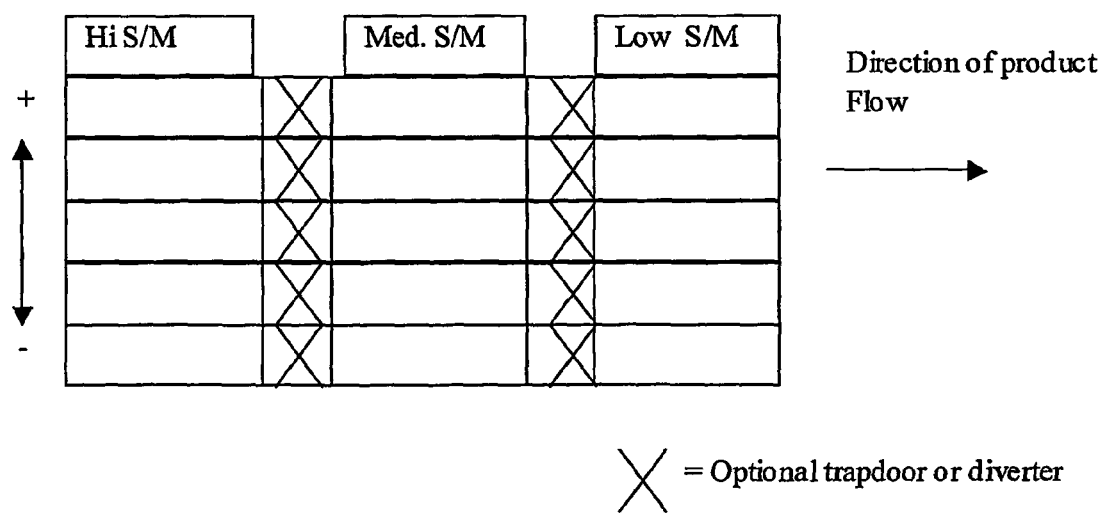
FIG._12

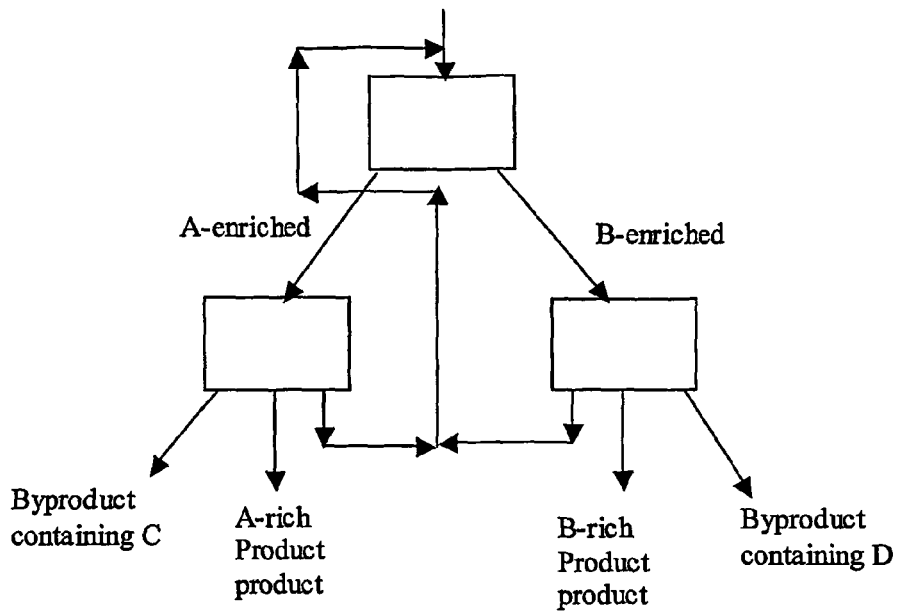
FIG._13
P ➔ R ➔ W ➔ C ➔ R ➔ SMC ➔ SMD ➔ B ➔ E
FIG._14
P ➔ R ➔ TF ➔ W ➔ C ➔ SMC ➔ SMD ➔ B ➔ E
FIG._15
P ➔ C ➔ R ➔ W ➔ SMC ➔ SMD ➔ B ➔ E
FIG._16

P → R → W → C → TF → SMC → SMD → B → E

P → R → W → C → SMC → SMD → C → B → E

*FIG. 19*

P → R → SMC → SMD → B → E

*FIG. 20*

P → R → W → SMC → SMD → W → B → E

*FIG. 21*

P → R → SMC → SMD → W → B → E

*FIG. 22*

P ➔ R ➔ W ➔ C ➔ R ➔ SMC ➔ SMD ➔ E

*FIG._23*

P ➔ R ➔ W ➔ C ➔ R ➔ SMC ➔ SMD ➔ B

*FIG._24A*

P ➔ R ➔ W ➔ C ➔ R ➔ SMD ➔ B ➔ E

*FIG._24B*

| | |
|---|---|
| P → R → W → TF | *PP* |
| P → R → W → TF → C | *PP* |
| P → C → R → W → TF | *PP* |
| P → C → R → W → TF → C | *PP* |
| P → C → R → W → SMC → SMD → C | *PP* |
| P → R → W → SMC → SMD | *PP* |
| P → R → SMC → SMD → W → C | *PP, ABS, HIPS* |
| P → R → SMC → SMD → W | *PP, ABS, HIPS* |
| P → C → R → SMC → SMD → W → C | *PP, ABS, HIPS* |
| P → C → R → SMC → SMD → W | *PP, ABS, HIPS* |
| P → W → C → R → SMC → SMD → W → C | |
| P → W → C → R → SMC → SMD → W | |
| P → W → R → SMC → SMD → W → C | |
| P → W → R → SMC → SMD → W | |
| P → W → R → W → SMC → SMD → W → C | |
| P → W → R → W → SMC → SMD → W | |
| P → W → R → W → SMC → SMD → W → C | |
| P → R → W → SMC → SMD → C | |
| P → R → W → SMC → SMD | *ABS, HIPS* (truncated cone metal remove) |
| P → W → R → W → SMC → SMD | *ABS, HIPS* (pregrind elutriation) |
| P → R → W → SMC → SMD → W | *ABS, HIPS* (final grade bracketing) |
| P → SMC → R → W → SMC → SMD → C | |
| P → SMC → R → W → SMC → SMD | |
| P → SMC → R → W → SMC → SMD → C | |

P → R → W → SMC

W → SMC → SMD → W

W → SMC → SMD

R → W → SMC → SMD

R → W → SMC → SMD → W

R → W → SMC → SMD

C → R → W → SMC → SMD

C → R → W → SMC → SMD

FIG._24D

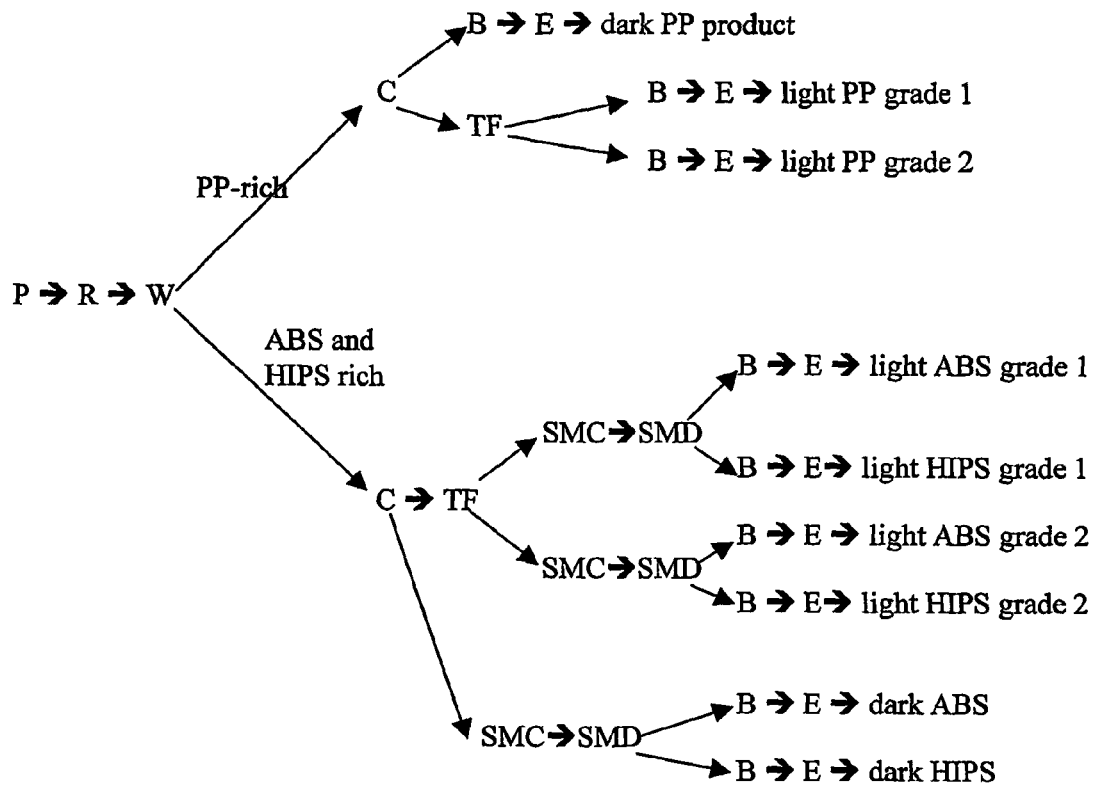
FIG._25
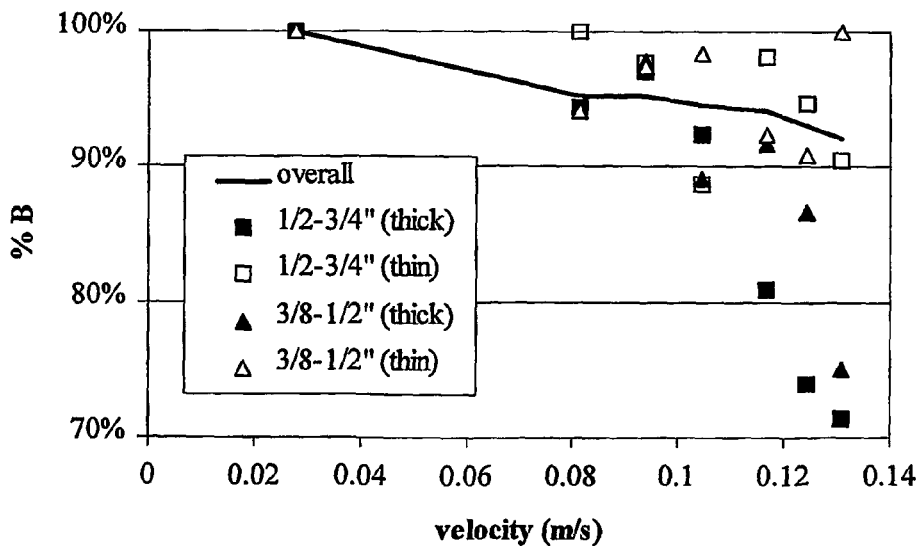
FIG._26

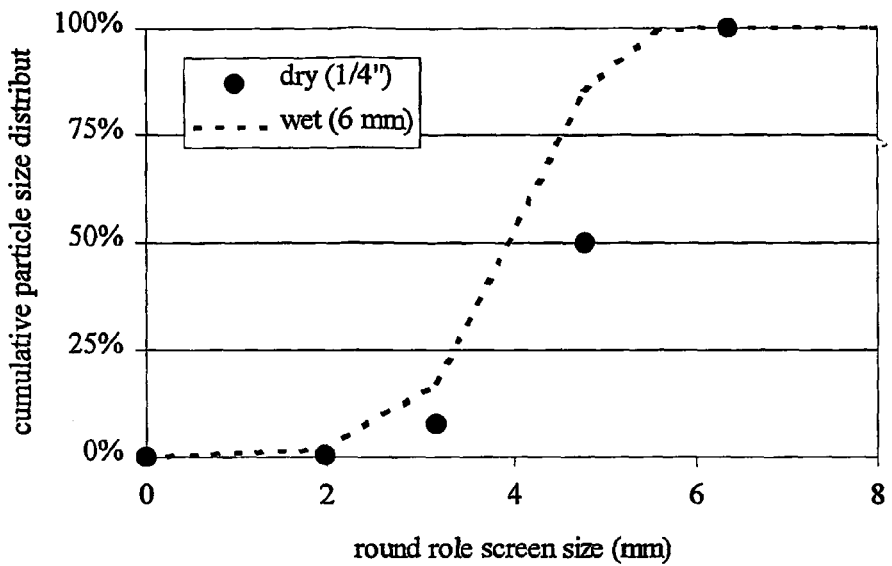
FIG._27
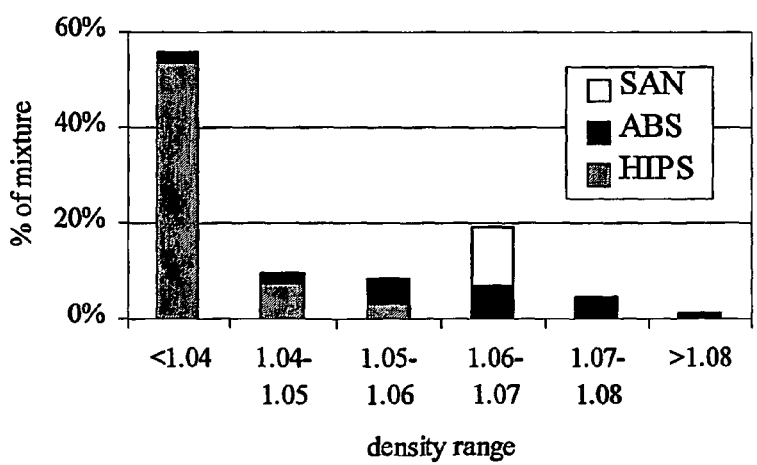
FIG._28

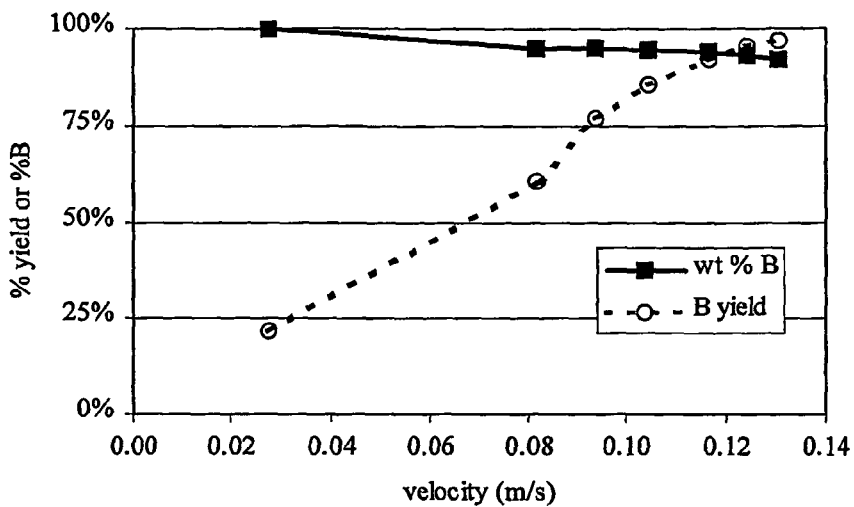
FIG._29
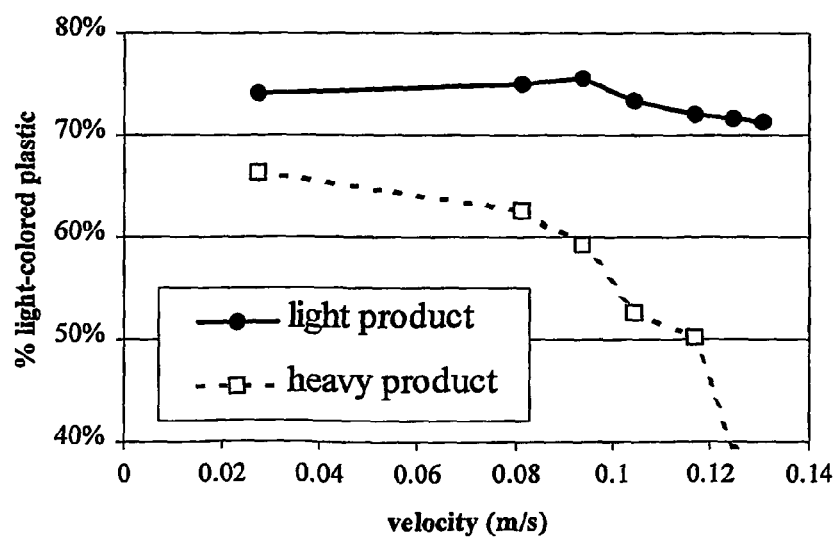
FIG._30

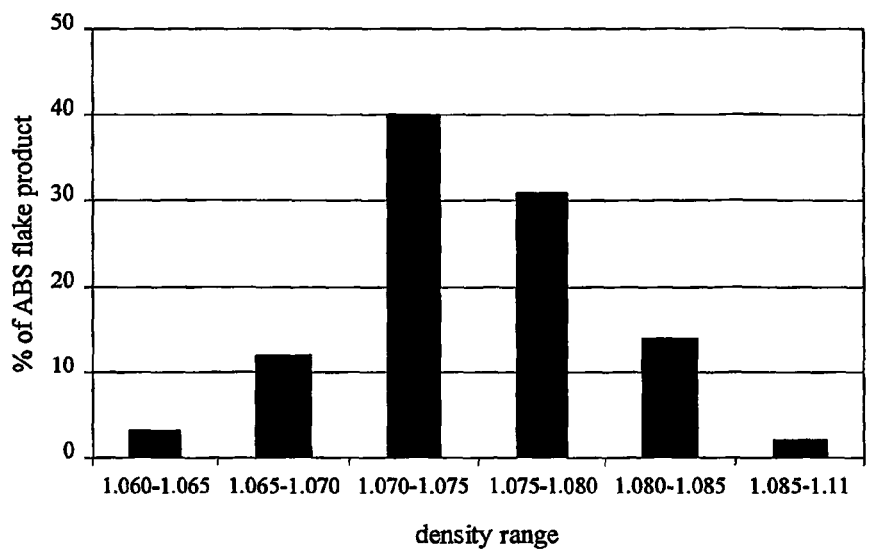
FIG._31
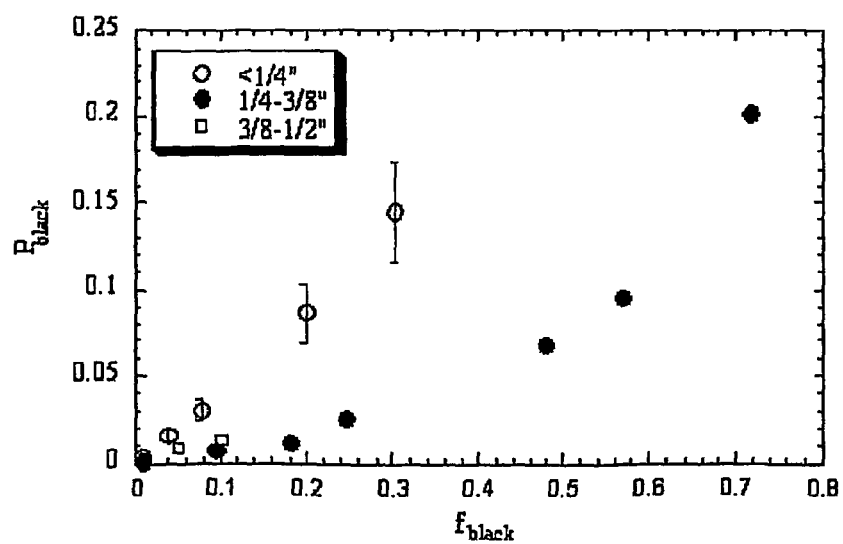
FIG._32

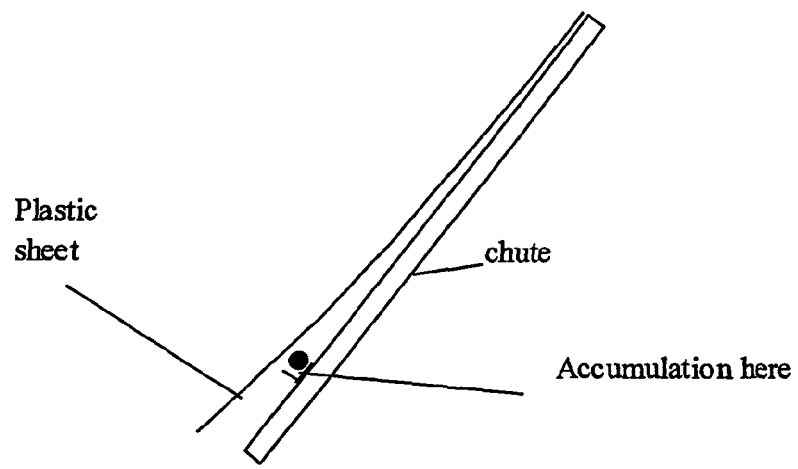
FIG._33
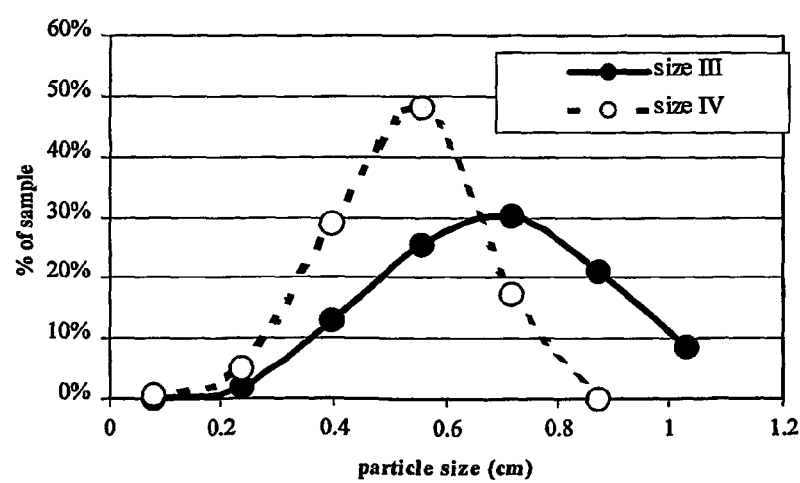
FIG._34

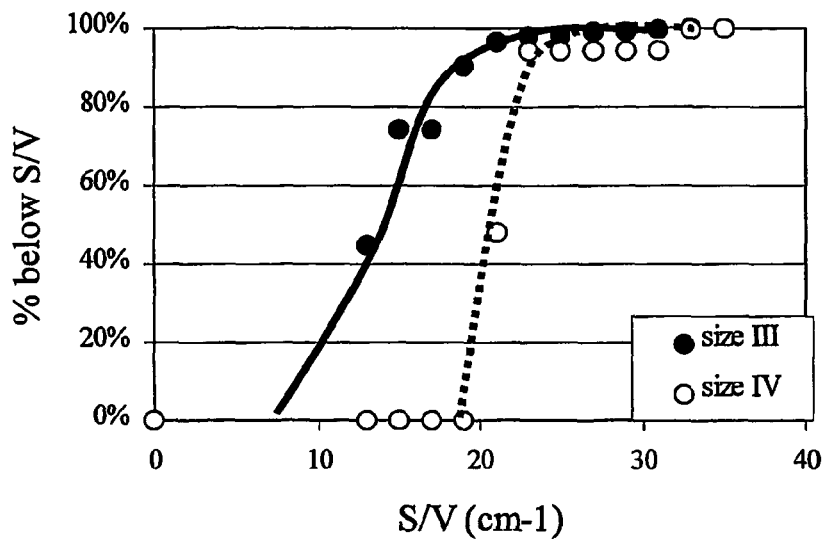
FIG._35
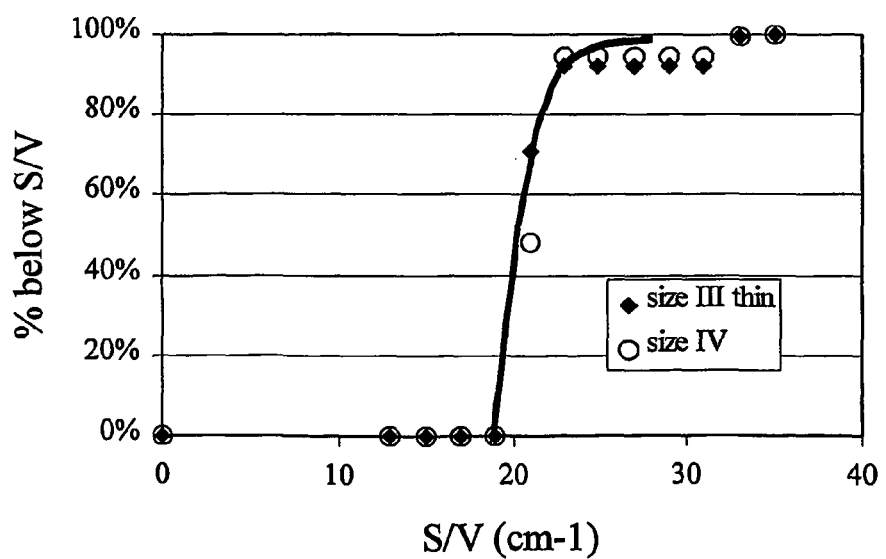
FIG._36

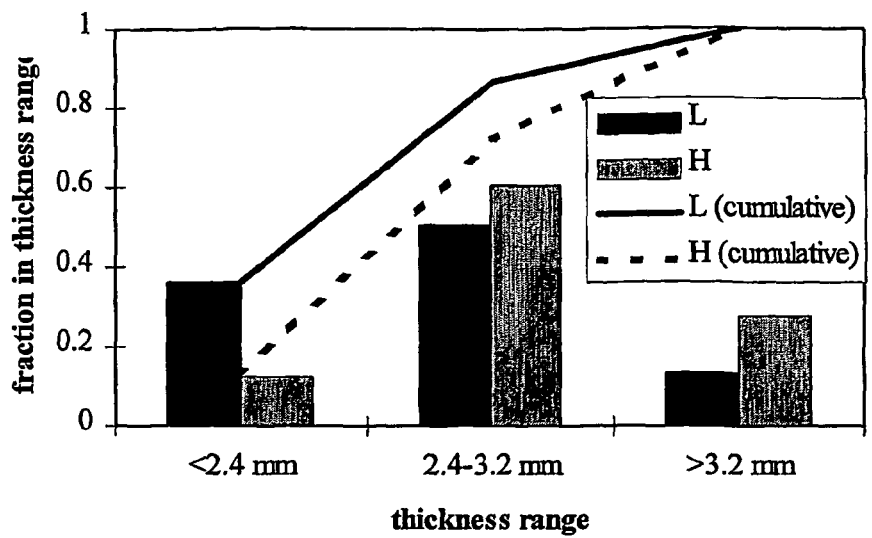
FIG._38
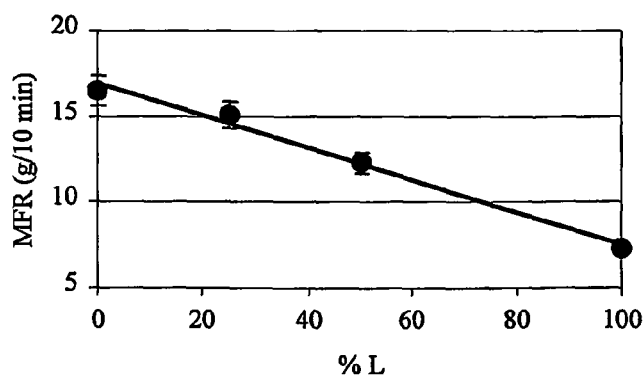
FIG._39

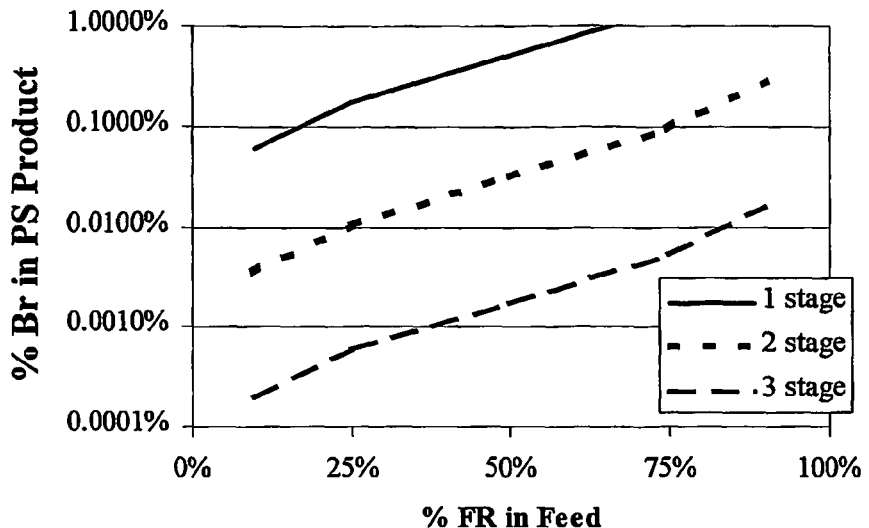
FIG._40
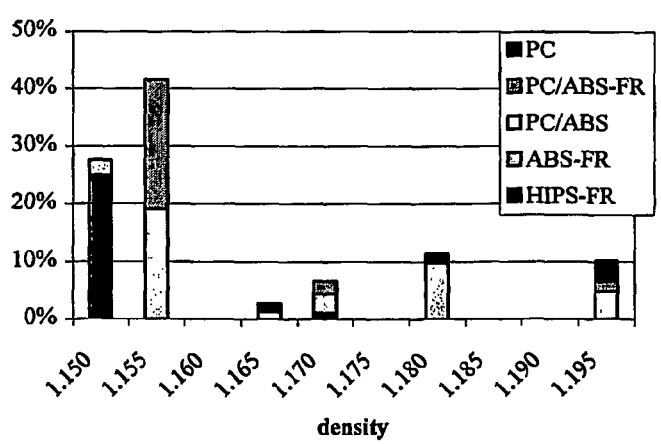
FIG._41

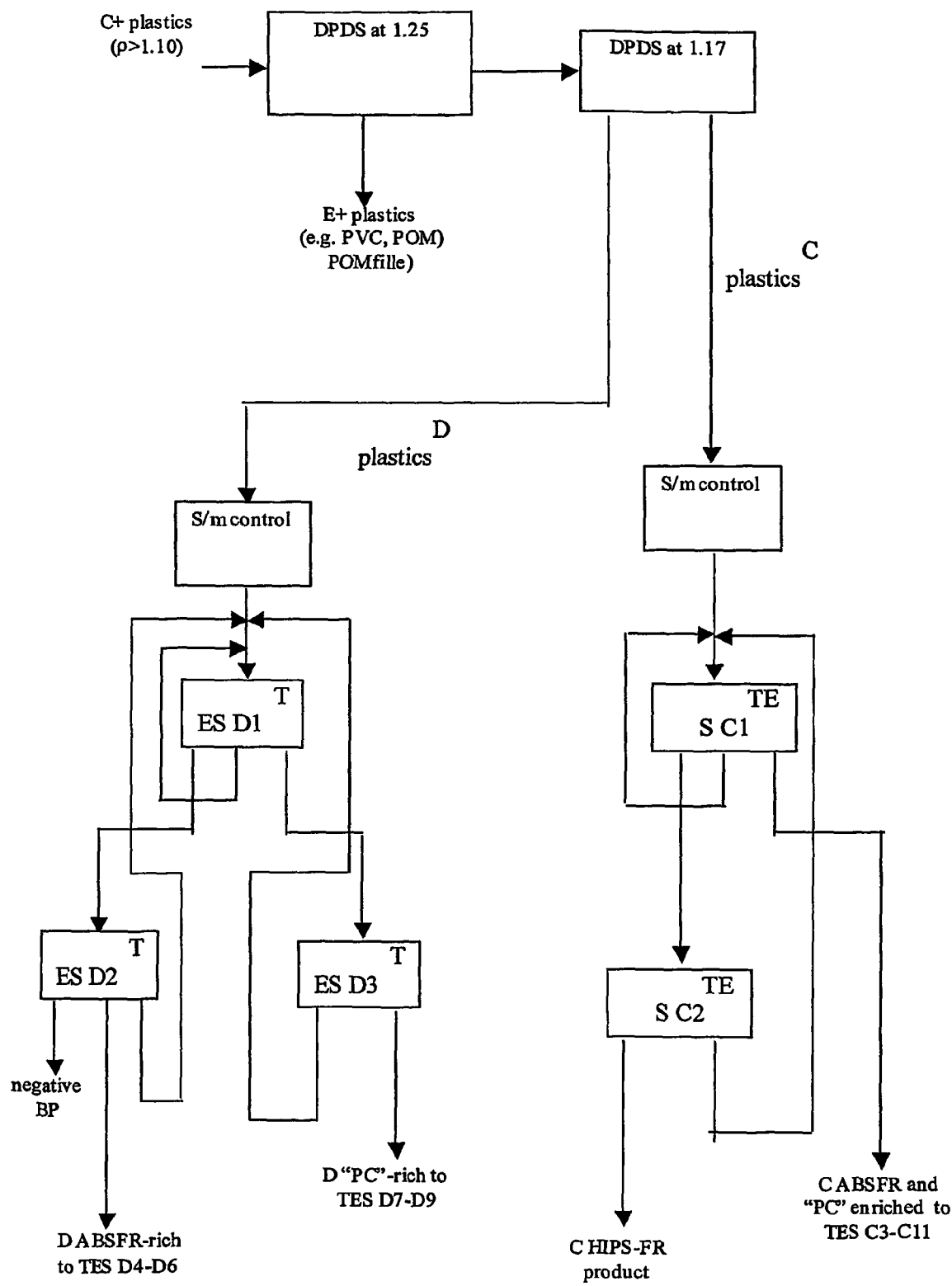
FIG._42

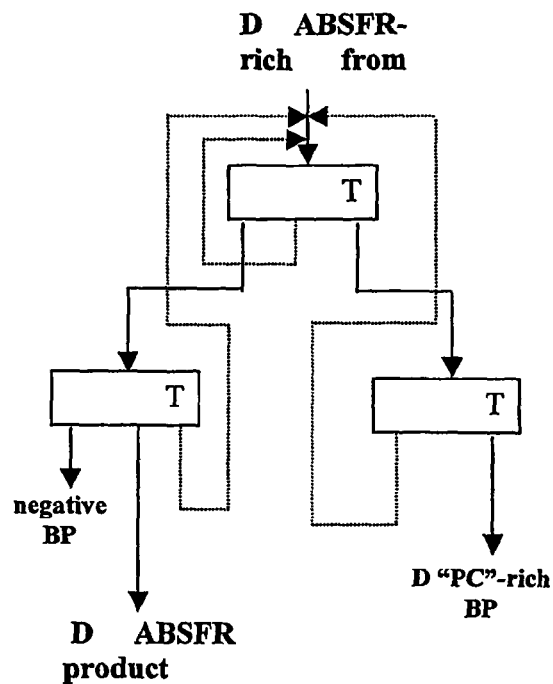
FIG._43A
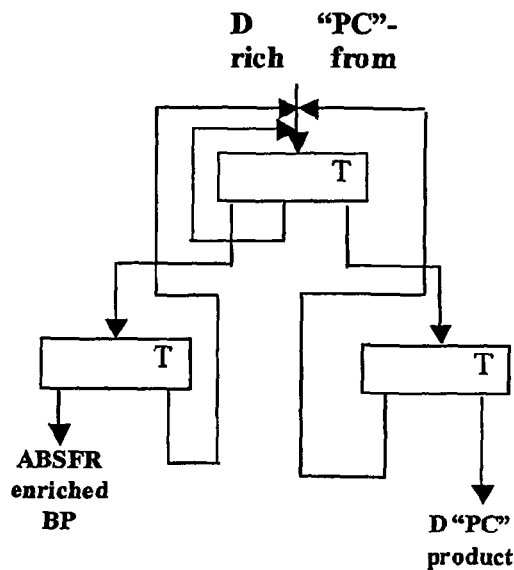
FIG._43B

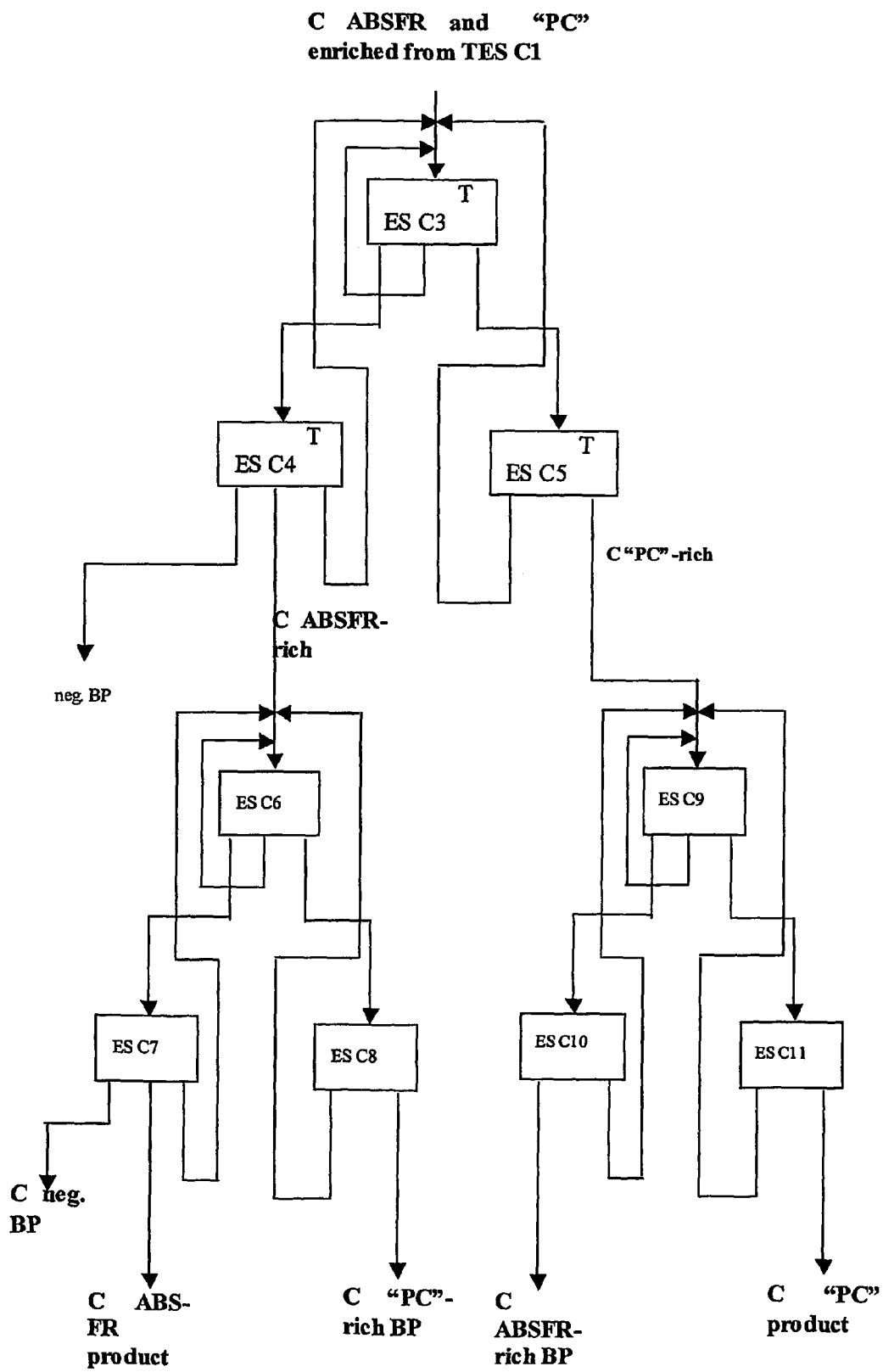
FIG._44

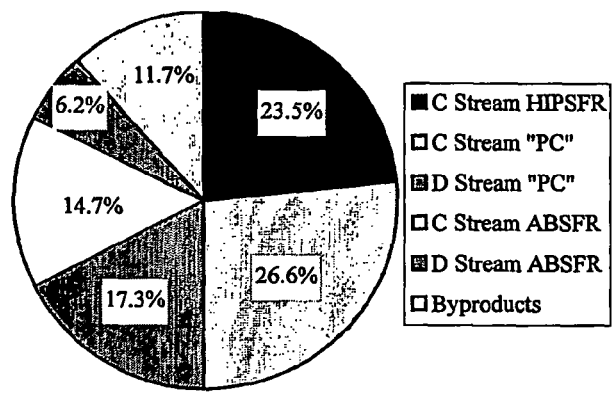
FIG._45
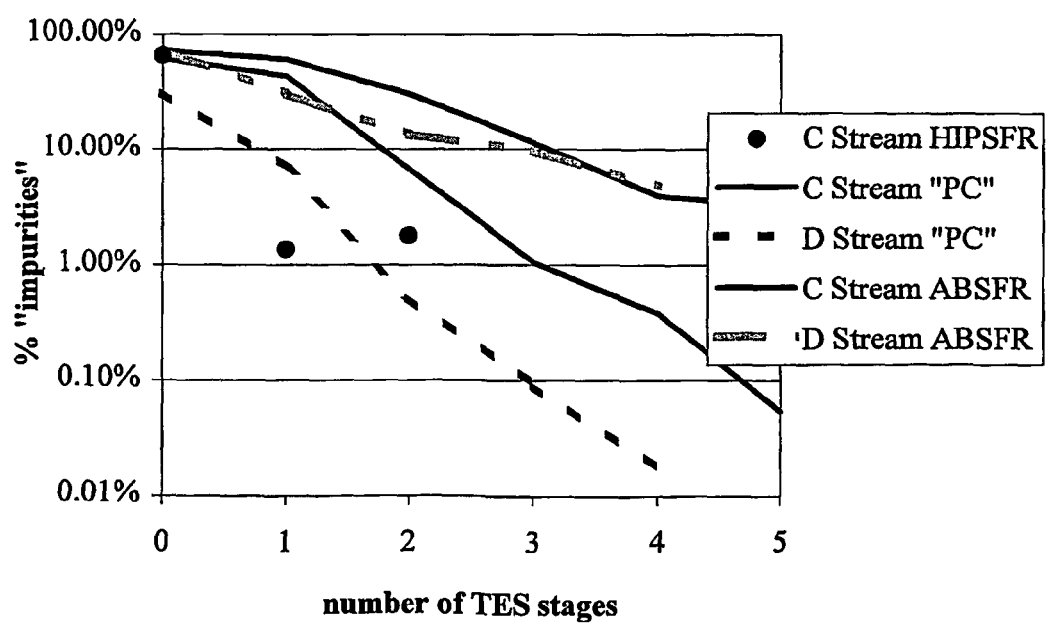
FIG._46

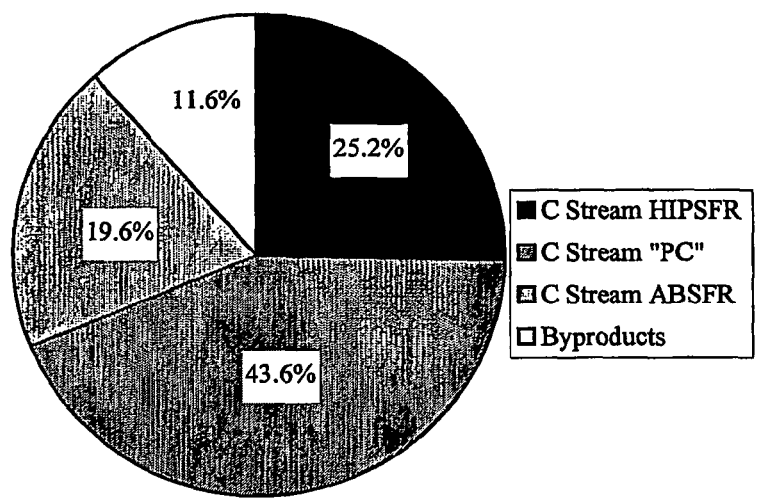
FIG._47
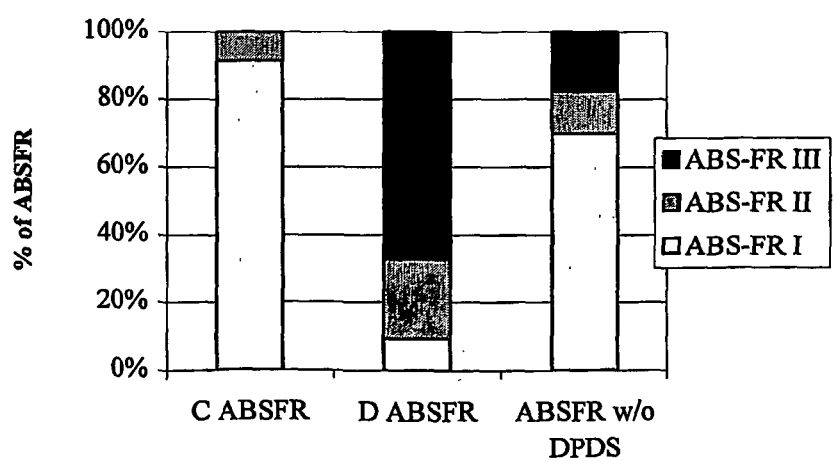
FIG._48

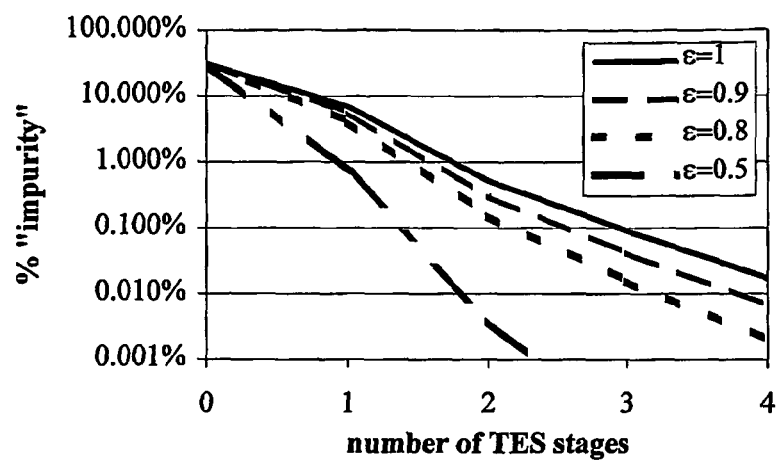
FIG._49
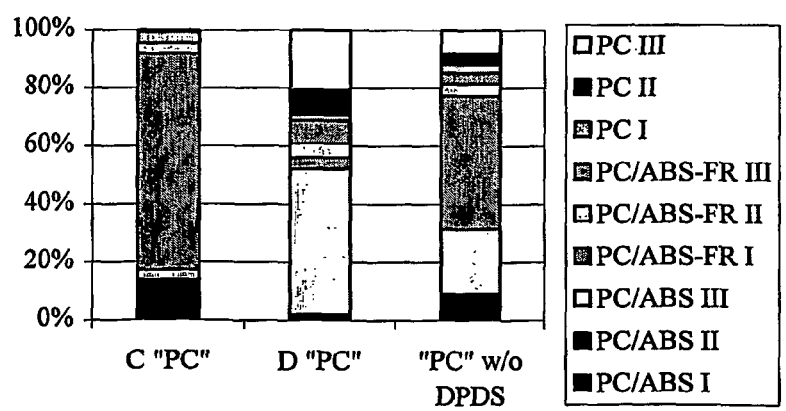
FIG._50

MULTISTEP SEPARATION OF PLASTICS

CROSS-REFERENCE TO RELATED APPLICATIONS

This application claims the benefit of Provisional Application Ser. Nos. 60/372,001, filed Apr. 12, 2002, 60/397,948, filed Jul. 22, 2002, 60/397,808, filed Jul. 22, 2002, 60/397,953, filed Jul. 22, 2002 and 60/397,980, filed Jul. 22, 2002 which are incorporated by reference herein. This application is also related to International Application Serial No. PCT/US03/11602, titled "Compositions of Materials Containing Recycled Plastics" to L. E. Allen, III, B. L. Riise, Ron C. Rau and Michael B. Biddle, filed on Apr. 14, 2003, which is also incorporated by reference herein.

TECHNICAL FIELD

This invention relates to recycling plastics.

BACKGROUND

By generating over 10 of millions metric tons of material, hundreds of billions of dollars of production per year, and being responsible for approximately millions of jobs, plastics and related businesses represent the fourth largest industry in the United States. Unlike other material industries such as steel and aluminum, however, this industry depends almost solely on nonrenewable raw material, mostly imported petroleum. This dependence becomes even more significant as the growth rate of plastics continues to outpace that of all other materials.

Most of the plastic supplied by today's manufacturers ends its life in landfills or incinerators simply because the technology has not been available to recover it economically. The Environmental Protection Agency estimates that the amount of plastic in municipal solid waste grew from less than 1 million metric tons prior to 1960 to over 20 million metric tons by 2000. Take-back and producer-responsibility legislation is becoming increasingly common to help deal with the quantities of plastics being produced.

Durable goods, such as automobiles, appliances and electronics equipment, account for about one-third of the plastics in municipal solid waste. Durable goods are increasingly being collected and partially recycled at the end of their useful lives to avoid disposal costs and potential liabilities, and to recover metals and other marketable raw materials.

The recovery of plastics from durable goods requires a plastic-rich raw material. Automobiles, appliances and electronics generally contain metals. Generally, the metals content is higher than the plastics content (typically plastics content is less than 30%) in these items, so a metal recovery operation must precede plastic recovery. Most metal recovery operations shred equipment in order to cost-effectively liberate metals from whole parts. Large-scale plastic recovery operations must be able to source this plastic-rich raw material from a number of metal recovery operations.

Most plastic parts coming from durable goods streams present unique challenges that are not met by the plastics bottle cleaning and sorting processes developed for curbside feedstocks. The principle practice today for the recovery of highly contaminated scrap is hand-separation done overseas at significant local environmental cost. The challenges in recycling plastics from durable goods include: multiple plastic types, multiple resin grades of plastic (there can be over 50 different grades of one plastic resin type such as ABS); fillers, reinforcements, and pigments; metal; paint and metallic coatings; and highly variable part sizes and shapes.

A grade of plastic is a formulation of plastic material with a particular set of targeted physical characteristics or properties. The particular physical characteristics or properties of a grade are controlled by the chemical composition of the polymers in the grade, the average molecular weights and molecular weight distributions of polymers in the grade, the rubber morphology for impact modified grades, and the group of additives in the grade.

Different grades of a given plastic type are generally compatible. Grades can generally be melt mixed to create a new material with a different property profile.

Different plastic types, on the other hand, cannot generally be melt combined as easily unless the types happen to be compatible. Blending different plastic types such as HIPS and ABS is often avoided except in special situations.

Typical suppliers of plastics-rich feed stocks are metal recyclers or shredders who can process a number of types of durable goods in a single facility. Feedstocks derived from durable goods can therefore be highly variable mixtures of different types of durable goods.

In order to create high value products, the plastic recycling process must be able to separate highly mixed streams on a flake-by-flake basis to achieve high throughput rates of products with acceptable purity. Methods such as separation by density, Density Differential Alteration, froth flotation, color sorting and triboelectrostatic separation (TES), have been used to achieve some purification of the plastics derived from durable goods, as described, for example, in Paul Allen, Development of Hydrocyclones for Use in Plastics Recycling, American Plastics Council, 1999, U.S. Pat. No. 6,238,579, U.S. Pat. No. 6,335,376, U.S. Pat. No. 5,653,867, and U.S. Pat. No. 5,399,433, each of which is incorporated by reference herein. The acceptable purity depends on the primary plastic and contaminants.

SUMMARY

The invention provides processes and apparatus implementing techniques for separating plastics with multiple processing steps. In general, in one aspect, the invention provides method for defining recycling processes. The methods include defining an arrangement of four or more different processes to be used to prepare a recycled plastic product. The processes of the arrangement are selected from the group consisting of preprocessing operations, size reduction operations, gravity concentration operations, color sorting, sorting by thickness, friction, or differential terminal velocity or drag in air, surface to mass control operations, separation processes enhanced by narrow surface to mass distributions, blending operations, and extrusion and compounding operations. The four or more processes are selected and arranged based on one or more properties of the plastic rich mixture to be separated and/or one or more desired properties of a recycled plastic material to be prepared from the waste plastic material.

In general, in another aspect, the invention provides plastics recycling processes. The processes include subjecting a plastic-rich mixture to a sequence of processes selected from the group consisting of preprocessing operations, size reduction operations, gravity concentration operations, color sorting, sorting by thickness, friction, or differential buoyancy in air, surface to mass control operations, separation processes enhanced by narrow surface to mass distributions, blending operations, and extrusion and compounding operations, and collecting a recycled plastic material as an output of the sequence of processes.

Particular implementations can include one or more of the following features. The sequence of processes can be defined based on one or more properties of the plastic-rich mixture and/or one or more desired properties of the recycled plastic material. Subjecting the plastic-rich mixture to a sequence of processes can include separating the plastic-rich mixture into different grades of plastic material. Subjecting the plastic-rich mixture to a sequence of processes can include separating the plastic-rich mixture into different types of plastic material. The process can include selecting the plastic-rich mixture from a source selected from the group consisting of white goods, office automation equipment, consumer electronics, automotive shredder residue, packaging waste, household waste, building waste, industrial molding and extrusion scrap according to one or more desired properties of the recycled plastic material. The process can include selecting the plastic-rich mixture based on a geographic location of origin of the plastic-rich mixture according to one or more desired properties of the recycled plastic material. One or more of the processes can be repeated in the sequence of processes. Subjecting the plastic-rich mixture to a sequence of processes can include blending two or more materials to obtain a desired property in the recycled plastic material. Subjecting the plastic-rich mixture to a sequence of processes can include compounding the recycled plastic material with one or more additives. Collecting a recycled plastic material as an output of the sequence of processes can include collecting a plurality of recycled plastic materials. Subjecting the plastic-rich mixture to a sequence of processes can include reducing the average size of plastic particles in the sequence of processes from about 75 mm to less than about 8 mm. The average size of plastic particles in the sequence of processes is reduced over a plurality of processes in the sequence of processes.

In general, in another aspect, the invention provides apparatus for recycling waste plastic materials. The apparatus includes three or more devices configured to perform the processes described herein.

In general, in another aspect, the invention provides plastic recycling processes for recovery of purified or enriched plastics. The purified or enriched plastics are recovered from sources including one or more of office automation equipment, white goods, consumer electronics, automotive shredder residue, packaging waste, household waste, building waste, industrial molding and extrusion scrap.

In general in another aspect, the invention provides plastic recycling processes and apparatus implementing four or more, six or more, operations selected from pre-processing operations, size reduction operations, gravity concentration operations, color sorting operations, sorting by thickness, friction, or differential terminal velocity or drag in air, surface to mass control operations, separation processes enhanced by narrow surface to mass distributions, such as triboelectric sorting, blending, extrusion and compounding.

Particular implementations can include one or more of the following features. The operations can include size reduction of particles from less than about 75 mm in size to less than about 8 mm in size. The size reduction can be performed in one or more steps. The size reduction can be performed in two or more steps.

In general, in still another aspect, the invention provides pre-processing processes and apparatus for use in separation of plastic materials. The pre-processing processes and apparatus are configured to implement one or more operations selected from metal removal, removal of fluff, foam and/or paper, removal of rubber, removal of wires, removal of non target plastics, size reduction, blending, and optical sorting.

Particular implementations can include one or more of the following features. Non-target materials can be eliminated from further processing. Materials that may damage or cause excessive wear to size reduction equipment can be removed. Bulk density of plastics in the mixture can be increased. Compositional variability with time or feed source can be reduced.

In general, in still another aspect, the invention provides size reduction processes and apparatus for use in separation of plastic materials. The size reduction processes and apparatus feature one or more of size reduction equipment for performing dry or wet granulation, equipment for removal of fines, dust and liberated paper, film or foam, or size screening into two or more fractions to enhance removal of fines, dust and liberated paper, film or foam.

In general, in still another aspect, the invention provides gravity concentration processes and apparatus for use in separation of plastic materials. The gravity concentration processes and apparatus are configured to employ one or more hydrocyclones, or modified hydrocyclones, cyvors, truncated cones, or wet elutriation devices.

In general, in still another aspect, the invention provides separation processes and apparatus employing solid particle media with precise particle size control. The use of solid particle media provides for more precise and sharp separation by density, or for more consistent separation.

In general, in another aspect, the invention provides separation processes and apparatus implementing metal removal and/or removal of non-target plastics employing one or more truncated cones.

In general, in another aspect, the invention provides separation processes and apparatus employing an arrangement of two consecutive gravity concentration devices. The devices can be hydrocyclones or cyvors. The separation is performed at an elevated density using a dense media slurry. The density of the slurry flowing to the first device is controlled by the media concentration in a tank. The overflow from the first device is sent to the second device such that the density of the slurry flowing to the second device is controlled by the separation characteristics of the first device. The underflow from the first device is enriched in plastics more dense than the density of the separation in the first device. The overflow from the second device is enriched in plastics less dense than the density of the separation in the second device. The underflow from the second device is enriched in plastics more dense than the density of the separation in the second device.

In general, in another aspect, the invention provides separation processes and apparatus employing an arrangement of three gravity concentration devices. The overflow from the first device is sent to a second device. The underflow from the first device is sent to a third device. The devices can be hydrocyclones or cyvors. In particular implementations, the second and third devices are cyvors. The underflow from the second device is returned to the feed to the first device. The overflow from the third device is returned to the feed to the first device. The overflow from the second device is a product enriched in plastics less dense than the separation density. The underflow from the third device is a product enriched in plastics more dense than the separation density. The devices may be at the density of water or the density may be increased by the addition of dense media or by adding a solute (e.g., salt) to the media.

In general, in another aspect, the invention provides separation processes and apparatus implementing wet elutriation operations to accomplish the separation of low density plastics from high density plastics.

In general, in another aspect, the invention provides separation processes and apparatus employing an arrangement of three consecutive gravity concentration devices. The first device can be a modified hydrocyclone for removal of metal. The second device can be a modified hydrocyclone for removal of high density plastics. The second device can be a hydrocyclone for the separation of low and medium density plastics.

In general, in another aspect, the invention provides separation processes and apparatus implementing precise gravity concentration separation to create a stream enriched in HIPS and a stream enriched in ABS and SAN.

In general, in another aspect, the invention provides separation processes and apparatus implementing precise gravity concentration separation to create product streams enriched in particular grades of the same plastic type. The separation processes and apparatus can be operable to separate ABS into a higher density product enriched in ABS from a first source, such as refrigerators, and a lower density product enriched in ABS from a second source, such as office automation equipment.

In general, in another aspect, the invention provides separation processes and apparatus implementing wet elutriation to sort by color.

In general, in another aspect, the invention provides separation processes and apparatus implementing wet elutriation to stabilize the color composition in order to enable or improve the effectiveness of color sorting and/or to stabilize the color of a final recycled plastic material.

In general, in another aspect, the invention provides separation processes and apparatus implementing color sorting using a belt sorter or sliding chute color sorter. In particular implementations a belt sorter is used for flakes larger than about 10 mm, while a sliding chute color sorter is used for flakes between about 6 mm and about 12 mm.

In general, in another aspect, the invention provides separation processes and apparatus implementing color sorting to remove dissimilar plastics from the waste plastic stream.

In general, the invention provides separation processes and apparatus configured to sort waste plastic material by thickness or friction. In particular implementations, the thickness or friction sorting is performed on particles between about 4 and about 20 mm. The thickness or friction sorting can be performed for rubber removal.

In general, in another aspect, the invention provides separation processes and apparatus configured with a sliding chute device for removal of rubber.

In general, in still another aspect, the invention provides separation processes and apparatus implementing thickness or friction sorting to purify plastics by type. In particular implementations, the thickness or friction sorting can be used to purify HIPS by removing PP, ABS, general purpose PS, and contaminants. In other implementations the thickness or friction sorting can be used to purify ABS by removing SAN, HIPS, and contaminants.

In general, in another aspect, the invention provides separation processes and apparatus implementing thickness or friction sorting to purify plastics by color.

In general, in another aspect, the invention provides separation processes and apparatus implementing surface to mass control to enable processes which are improved by a narrow surface to mass distribution.

In general, in another aspect, the invention provides separation processes and apparatus implementing surface to mass control. The surface to mass control is accomplished using size reduction, air aspiration, sorting using thickness or friction, a slot thickness sorter, such as a roll sorter, or a combination thereof.

In general, in another aspect, the invention provides separation processes and apparatus implementing tribelectrostatic separation on one or more streams with controlled surface to mass distributions. The tribelectrostatic separator(s) can be tuned to the particular surface to mass separation by control of the separator geometry, the separation of the charged plates, the angle of the charged plates, and/or the voltage applied to the charged plates.

In general, in another aspect, the invention provides separation processes and apparatus configured with two or more tribelectrostatic separators. In particular implementations, the separators may be all in series. A first stage separator may send products to two or more second stage separators. One or more product streams from first stage separator may be refed to the separator. One or more product streams from second stage separator(s) may be refed to the first stage separator. One or more product streams from tribelectrostatic separators may be fed to surface to mass control devices which will further control the surface to mass for re-feed to the TES.

In general, in another aspect, the invention provides separation processes and apparatus implementing triboelectrostatic separation of feed with controlled surface to mass to yield ABS and HIPS products with improved purity and mechanical properties.

In general, in another aspect, the invention provides separation processes and apparatus implementing triboelectrostatic separation of feed with controlled surface to mass to yield streams of the same plastic type with distinct properties.

In general, in another aspect, the invention provides processes and apparatus in which streams of the same plastic type with different surface to mass ratios are recombined to yield product with controlled properties.

In general, in another aspect, the invention provides separation processes and apparatus configured to employ conductive plastic to control the charge of plastic particles separated by triboelectrostatic separation.

In general, in another aspect, the invention provides separation processes and apparatus configured to employ plastic formulated with charging properties intermediate between plastics in the feed mixture to control the charge of plastic particles separated by triboelectrostatic separation.

Particular implementations can include one or more of the following features. The plastic can be a different material from the plastics to be separated. The plastic can be prepared from the plastic materials to be separated by melt blending. The plastic can be a paint or coating on another material. The plastic can be in the form of flakes or pellets. The plastic can be the same as the material of the charging device.

In general, in another aspect, the invention provides separation processes and apparatus implementing triboelectrostatic separation to separate ABS from SAN.

In general, in another aspect, the invention provides separation processes and apparatus implementing triboelectrostatic separation to create ABS-rich and SAN-enriched products with controlled compositions and properties.

In general, in another aspect, the invention provides processes configured for recombination of ABS-rich and SAN-enriched products to yield product with controlled properties.

In general, in another aspect, the invention provides separation processes and apparatus implementing triboelectrostatic separation to separate PC/ABS from flame retarded ABS.

In general, in another aspect, the invention provides separation processes and apparatus implementing triboelectrostatic separation to separate flame retarded HIPS from HIPS.

In general, in another aspect, the invention provides separation processes and apparatus implementing one or more separation processes relying on narrow surface to mass distributions. The separation processes can include density differential alteration or froth flotation.

In general, in another aspect, the invention provides processes and apparatus implementing blending to damp out variability due to feed or process variations.

In general, in another aspect, the invention provides processes and apparatus implementing blending to combine different product streams for controlled properties.

In general, in another aspect, the invention provides processes and apparatus implementing extrusion compounding to yield homogeneous products, screen packing to remove non-melting contaminants, including two stages with increasingly finer mesh screening, for the addition of additives to control product properties, and/or for the addition of virgin plastics to control product properties.

In general, in another aspect, the invention provides multistep processes and apparatus configured to provide an arrangement of processes arranged in the following order: pre-processing; size reduction; gravity concentration; color sorting; size reduction; surface to mass control; a process requiring surface to mass control, such as triboelectrostatic separation; blending; extrusion and compounding.

In general, in another aspect, the invention provides multistep processes and apparatus configured to provide an arrangement of processes arranged in the following order: pre-processing; size reduction; sorting by thickness or friction; gravity concentration; color sorting; surface to mass control; a process requiring surface to mass control, such as triboelectrostatic separation; blending; extrusion and compounding. In particular implementations, the processes can be used for early removal of rubber or foam.

In general, in another aspect, the invention provides multistep processes and apparatus configured to provide an arrangement of processes arranged in the following order: pre-processing; color sorting, such as belt color sorting; size reduction; gravity concentration; surface to mass control; a process requiring surface to mass control, such as triboelectrostatic separation; blending; and extrusion and compounding.

In general, in another aspect, the invention provides multistep processes and apparatus configured to provide an arrangement of processes arranged in the following order: pre-processing; size reduction; gravity concentration; color sorting; sorting by thickness or friction; surface to mass control; a process requiring surface to mass control, such as triboelectrostatic separation; blending; and extrusion and compounding.

In general, in another aspect, the invention provides multistep processes and apparatus configured to provide an arrangement of processes arranged in the following order: pre-processing; size reduction; gravity concentration; color sorting; blending; and extrusion and compounding.

In general, in another aspect, the invention provides multistep processes and apparatus configured to provide an arrangement of processes arranged in the following order: pre-processing; size reduction; gravity concentration; blending; and extrusion and compounding.

In general, in another aspect, the invention provides multistep processes and apparatus configured to provide an arrangement of processes arranged in the following order: pre-processing; size reduction; gravity concentration; color sorting; surface to mass control; a process requiring surface to mass control, such as triboelectrostatic separation; color sorting; blending; and extrusion and compounding. In particular embodiments, the processes and apparatus can be implemented for separations where color control is important.

In general, in another aspect, the invention provides multistep processes and apparatus configured to provide an arrangement of processes arranged in the following order: pre-processing; size reduction; surface to mass control; a process requiring surface to mass control, such as triboelectrostatic separation; blending; and extrusion and compounding. In particular embodiments, the processes and apparatus can be implemented to reduce costs of waste water treatment.

In general, in another aspect, the invention provides multistep processes and apparatus configured to provide an arrangement of processes arranged in the following order: pre-processing; size reduction; gravity concentration; surface to mass control; a process requiring surface to mass control, such as triboelectrostatic separation; gravity concentration; blending; and extrusion and compounding. In particular embodiments, the processes and apparatus can be implemented for final purification using gravity concentration, including final separation of grades using gravity concentration.

In general, in another aspect, the invention provides multistep processes and apparatus configured to provide an arrangement of processes arranged in the following order: pre-processing; size reduction; surface to mass control; a process requiring surface to mass control, such as triboelectrostatic separation; gravity concentration; blending; and extrusion and compounding. In particular embodiments, the processes and apparatus can be implemented for final purification using gravity concentration, including final separation of grades using gravity concentration.

In general, in another aspect, the invention provides multistep processes and apparatus configured to provide an arrangement of processes arranged in the following order: pre-processing; size reduction; gravity concentration; color sorting; size reduction; surface to mass control; a process requiring surface to mass control, such as triboelectrostatic separation; and extrusion and compounding. In particular embodiments, the processes and apparatus can be implemented for separations where feed mixtures and processing are consistent.

In general, in another aspect, the invention provides multistep processes and apparatus configured to provide an arrangement of processes arranged in the following order: pre-processing; size reduction; gravity concentration; color sorting; size reduction; surface to mass control; a process requiring surface to mass control, such as triboelectrostatic separation; and blending. In particular embodiments, the processes and apparatus can be implemented for separations where flake material is to be further processed by compounders.

In general, in another aspect, the invention provides separation processes and apparatus implementing thickness sorting to create unique grades of polypropylene.

In general, in another aspect, the invention provides separation processes and apparatus implementing thickness sorting to create unique grades of ABS.

In general, in another aspect, the invention provides separation processes and apparatus implementing one or more techniques for removing bromine-containing plastics from other plastics. The techniques can include feed source selection; gravity concentration, which can be implemented in multiple stages and/or with precise separation control; color sorting; the use of devices capable of detection and selective ejection of materials containing bromine; triboelectrostatic separation; and/or thickness sorting.

In general, in another aspect, the invention provides separation processes and apparatus implementing triboelectrostatic separation in one or more stages to recover engineering thermoplastics (e.g., PC, PC/ABS, PPO and flame retardant ABS and HIPS). In particular implementations the processes and apparatus can be configured to provide gravity concentration and/or color sorting.

In general, in another aspect, the invention provides processes and apparatus configured to provide for the selection of types and relative amounts of recycled plastic material products. The selection of types and relative amounts can be implemented as selection of source materials to enable recovery of targeted plastics and/or selection of separation processes and arrangement of processes to enable recovery of targeted plastics.

Particular implementations can provide one or more of the following advantages. The layout of a recycling processing plant can be simplified by eliminating one or more the size reduction stages. Variability of mixtures of different types of durable goods can be damped out in a number of ways. A preprocessing step can be employed to eliminate non-target materials from further processing, remove materials that can damage or cause excessive wear to size reduction equipment, increase the bulk density of plastics in the mixture, and/or reduce the compositional variability with time or feed source. Wet granulation reduces the amount of dust and fines produced. Also, narrower particle size distribution and cleaner plastic surfaces are created. Size screening in two or more fractions can be used to enhance removal of fines, dust and liberated paper, film or foam. Solid particle media with precise particle size control can be used to provide more precise and sharp separation by density and for more consistent separation. The effectiveness of color sorting and stabilizing the final product color can be improved when processes that are more effective with a particular particle size are used to separate particles in the range of that particle size. A size reduction sequence can be used to reduce energy consumption since the amount of energy required to granulate materials is proportional to the surface area created. By saving finer granulation to later stages of the process, the high energy process is only performed on a target portion of the material. Product composition can be controlled by the source of feed materials as well as the arrangement of component processes in the overall recycling process. This can result in products with unique and desirable properties.

Separating based on particle size can reduce the amount of fines and dust produced by processing the plastic material. This reduces health risks posed to workers in the recycling facility by reducing particles that can be respirated. The selective process also reduces fire hazards and noise.

The plastic material products produced by the multiple processes are consistent because the feed source and processes have been selected to create consistent products.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a size reduction hierarchy in a separation process according to one aspect of the invention.

FIG. 2 shows a graph of the percent of granular material reporting to overflow as a function of separation density cut points produced by a gravity concentration process.

FIG. 3 shows one implementation of a two stage density separation using a single media tank where the process separates waste plastic material into three recycled plastic materials.

FIG. 4 shows one implementation of a double precision density separation which creates two recycled plastic materials with three separation devices using internal recycle.

FIG. 5 illustrates one implementation of a purification of three waste plastic materials using hydrocyclones.

FIG. 6 shows a schematic of a process for selecting recycled plastic material based on the material's surface to mass ratio.

FIG. 7 in an illustration of a charged particle being deflected in an electric field as would occur in a TES separator.

FIG. 8 shows the surface to volume (proportional to mass) ratios for circular disks at various thicknesses and diameters comparable to the size of plastic particles separated in a TES separator.

FIG. 9 is a schematic of a top view of one implementation of a TES separator for high surface to mass and low surface to mass streams of material.

FIG. 10 is schematic diagram of one implementation of a top view of a TES separator with varying electric field.

FIG. 11 shows a schematic diagram of two implementations of side views of TES separators with different effective electric fields.

FIG. 12 shows one implementation of a collection device for a single TES separator with tuned separation lanes for different surface to mass fractions of the recycled plastic material.

FIG. 13 shows one implementation of a two stage arrangement of electrostatic separators that yields multiple recycled plastic materials.

FIG. 14 illustrates an example arrangement of various separation processes.

FIG. 15 shows an example arrangement of separation processes incorporating a thickness/friction sorter.

FIG. 16 illustrates an example arrangement of separation processes with a color sorter early in the process.

FIG. 17 illustrates an example arrangement of separation processes where the process uses thickness/friction sorting to create separate grades of the recycled plastic materials.

FIG. 18 shows one example arrangement of separation processes that can be used when the waste plastic material contains a recycled plastic material that reports to a particular density fraction.

FIG. 19 illustrates one arrangement of processes including two color sorting stages.

FIG. 20 shows one example arrangement of separation processes where gravity concentration separation is not included.

FIG. 21 shows one example arrangement of separation processes where gravity concentration is used twice during the process, once as the final separation stage.

FIG. 22 shows one example arrangement of separation processes where gravity concentration is only used one time as the final separation stage.

FIG. 23 shows one example arrangement of separation processes where no blending process occurs after separation.

FIG. 24A illustrates one example arrangement of separation processes where the recycled plastic materials are not compounded or extruded.

FIG. 24B illustrates one example arrangement of separations processes where surface to mass control is not utilized.

FIG. 24C illustrates exemplary arrangements of separation processes.

FIG. 24D illustrates a number of specific subgroupings of processes.

FIG. 25 shows a diagram of a hypothetical separation strategy for U.S. white goods.

FIG. 26 shows the results of separating a waste plastic material using gravity concentration at various velocities.

FIG. 27 compares a wet granulation process to a dry granulation process by showing particle size distribution as a function of screen sizes used during separation.

FIG. 28 shows a density histogram of the different plastic types found in an exemplary mixture recovered from office automation equipment.

FIG. 29 illustrates the results of one example of elutriation separation of recycled plastic materials, comparing yield to the velocity of the elutriation system.

FIG. 30 shows the percentage of light colored plastic in an exemplary recycled plastic material as a function of the velocity of the elutriation system.

FIG. 31 shows the density distribution of an exemplary mixture of ABS flakes recovered from shredded U.S. refrigerators after separating the flakes using wet density separation.

FIG. 32 shows a plot of product purity as a function of feed defect composition for different particle size ranges in an example using a sliding chute color sorter.

FIG. 33 illustrates one implementation of a device for removing rubber based on differential frictional and elastic properties.

FIG. 34 shows a comparison of the particle size distribution of two exemplary particle size groups before and after a granulation process.

FIG. 35 illustrates a comparison of two exemplary particle size groups using the percent of particles found at a particular surface to volume ratio.

FIG. 36 illustrates the surface to volume distributions of two exemplary recycled plastic materials after using thickness/friction sorting to separate out higher surface to volume flakes of recycled plastic material.

FIG. 38 is a graph shows the size distributions by thickness for fractions of exemplary light and heavy plastic material after granulation.

FIG. 39 shows the melt flow rate of ABS as a function of the percent of light ABS in an exemplary ABS product after the ABS product has been processed through a TES system and an air-leg separator.

FIG. 40 shows the percent of bromine in PS product as a function of the waste plastic material composition after single precision, double precision and a third density separation of an exemplary binary mixture of flame retarded and non-flame retarded HIPS.

FIG. 41 is a graph of the grades of HIPS, ABS, PC/ABS, and PC that were recovered from an exemplary separation of office automation equipment where the recycled plastic materials are shown as a percentage the waste plastic material and as a function of density.

FIG. 42 shows a schematic of one implementation of a process for the recovery of HIPS, ABS (flame retarded and non-), PC/ABS (flame retarded and non-) and PC using double precision density separation followed by TES.

FIG. 43A shows a schematic of one implementation of a process for the recovery of ABS-FR and a stream containing PC and PC/ABS using TES.

FIG. 43B shows a schematic for one implementation of a process of recovery of a PC-containing product using TES.

FIG. 44 shows a schematic for one implementation of a process of recovery of an ABS-FR and PC product using TES.

FIG. 45 is a pie chart illustrating the distribution of recycled plastic material, including flame retarded HIPS, 2 streams containing PC (i.e. enriched in PC and PC/ABS), 2 streams of flame retarded ABS and byproducts, resulting from a separation of office automation equipment as shown in FIG. 41.

FIG. 46 shows the percent impurity in exemplary flame retarded ABS, flame retarded HIPS and PC (i.e. PC and PC/ABS) products as a function of the number of TES separation stages.

FIG. 47 is a pie chart showing the yield of flame retarded HIPS, PC (i.e. PC and PC/ABS, flame retarded ABS, and byproducts when double precision density separation is not used in the right hand processes of FIG. 42.

FIG. 48 is a graph of the composition of flame retarded ABS recovered from an exemplary process using double precision density separation and a process not using double precision density separation.

FIG. 49 is a graph of the composition of PC (i.e. PC and PC/ABS) recovered from an exemplary process using double precision density separation and a process not including double precision density separation.

FIG. 50 shows the percent of impurity in an exemplary stream of PC (i.e. PC and PC/ABS) recycled plastic material as a function of the number of TES stages.

Like reference symbols in the various drawings indicate like elements.

DETAILED DESCRIPTION

A plastic recycling process and apparatus according to one aspect of the invention is capable of separating highly mixed streams of waste plastic material into products with a required purity. Different separation processes have different levels of effectiveness based in part on the size and the properties of the waste plastic material. Accordingly, the separation processes of the invention can include performing particular separation techniques on appropriately sized waste plastic material, and the apparatus of the invention can include devices configured to perform such processes. Alternatively, or in addition, the separation processes can include performing multiple processing steps sequentially, and the apparatus of the invention can include two or more devices configured to perform some or all of these processing steps. The products of these processes, and products derived from further manipulation of these products, are referred to in this specification as "recycled plastic materials".

Size reduction processes, arrangements of these processes, and apparatus configured to perform the processes have been developed such that feed streams rich in plastics can be separated into multiple product and byproduct streams. The processes and apparatus can be applied to a variety of plastics-rich streams derived from post-industrial and post-consumer sources. These streams can include plastics from office automation equipment (printers, computers, copiers, etc.), white goods (refrigerators, washing machines, etc.), consumer electronics (televisions, video cassette recorders, stereos, etc.), automotive shredder residue, packaging waste, household waste, building waste and industrial molding and extrusion scrap. In this specification, these materials will generally be referred to as "waste plastic material".

The size of waste plastic material can be reduced step-wise. FIG. 1 illustrates a general process featuring such a step-wise reduction in particle size, showing that large pieces of material (Size I) are reduced to progressively smaller sizes (Sizes II, III and IV).

In general, Size I includes materials with a top size less than about 75 mm, and corresponds to material found in fluff products from automobile shredders or appliance shredders, as well as plastics-rich whole parts such as those from electronics. Size reduction of the material from Size I to Size II (materials with a top size of about 30 mm) is performed in order to increase the bulk density, to liberate non-target materials and to create a more uniform particle size distribution. This size reduction stage can be performed before shipping to a plastics recycling plant in order to reduce shipping costs and to facilitate liberation so initial separation can increase the yield of target materials. Size III material has a top size of about 20 mm. In order to achieve a narrow and controlled particle size distribution, size reduction from Size II to Size III is typically performed at the plastics recycling plant or at a satellite plant. Size IV material has a top size of about 8 mm or less, and is useful for separations requiring a controlled and high surface area to mass ratio. This size is less than optimal for some of the separations performed with Size III materials, so a separate size reduction step can be performed. Some size reduction processes can take the flakes directly from Size I to Size III, from Size II to Size IV, or from Size I to Size IV.

The plastics recycling processes of the invention can utilize a number of separation processes that are ordered to optimize efficiency and to create a valuable combination of products. The ordering can depend on the source, the particle size, and properties of the waste plastic material. In particular implementations, some operations can be repeated if required to achieve a desired purity or if the operations are required for different reasons at different stages in the process.

In some implementations, a separation process according to the invention features a sequence of operations including preprocessing (P), size reduction (R), gravity concentration (W), color sorting (C), thickness/friction/buoyancy sorting (TF), surface to mass control (SMC), separation processes enhanced by narrow surface to mass distributions (SMD), blending (B) and extrusion (E). Each of these operations is described in more detail below.

Preprocessing

Preprocessing includes a group of operations that are organized to create an enriched plastic material for further processing. Since preprocessing includes multiple operations, some operations can be performed remotely while others can be performed at together at the same facility. One example of preprocessing is described in Provisional Application No. 60/397,953, filed on Jul. 22, 2002, which is incorporated by reference herein. Preprocessing is differentiated from size reduction because preprocessing is often done remotely or by the waste plastic material supplier, whereas size reduction is more typically included in the plastics recycling plant. In one implementation, the two processes are distinguished based on the size reduction from Size I to Size II material. In some cases, some operations that are included as part of size reduction can be performed remotely, and some that are part of preprocessing can be performed at the main plastics recycling facility.

The preprocessing operations are performed to remove or screen hazardous materials, to remove materials that might damage size-reduction equipment used later in the plastics recycling process, to increase the yield of target plastics, and/or to increase the material bulk density. In addition, preprocessing can include operations that will tend to make the material more consistent for subsequent processes. The order and inclusion of the various processes depends on the feed material source and composition.

In one implementation, preprocessing screens and removes hazardous materials. To avoid contamination of downstream processes and to avoid negatively affecting the health and safety of workers in the plastics recycling plant, all materials are screened at a preprocessing facility to make sure there are no chemical, biological or radiological hazards associated with the material to be sent to the plastics recycling facility. In many cases, this process will involve inspection by technicians, but it can also involve automated sorting in special instances.

Preprocessing can include the removal of materials that might damage size reduction equipment. The removal of metal, and especially large chunks of metal, can help prolong the life of size reduction equipment. Processes such as air aspiration, gravity concentration, magnets, electrostatic separation devices, eddy current separators, optical sorters, thickness/friction sorters or even hand picking can be employed to remove metals. The choice of these processes will depend on factors such as the amount of metal in the feed, the size of the metal pieces, and the types of metal.

Air aspiration includes processes performed by devices such as air-legs, gravity tables, air tables or destoners. These processes can remove low density components such as foam and fluff and/or high density components such as metals from the waste plastic material. Materials such as rubber can also be removed by some of these devices due to their unique bouncing properties and because many rubber materials tend to be thicker than most plastics. Multiple stages of one or more of these processes can be performed in series to improve the separation or to accomplish the removal of both light and heavy materials.

The effectiveness of air aspiration depends on the drag force on a particle relative to the gravitational force. Thinner particles should tend to report lighter than thick particles of the same density. Sorting by thickness can therefore improve the performance of air aspiration. One example of the use of an air-leg separator to remove metal from plastic-rich material is described in Example 1, below.

Gravity concentration is another process that can be included as part of preprocessing. Gravity concentration efficiently removes all types of metal from plastic, and can be used to separate dense plastics, such as circuit boards, from waste plastic material streams. The main disadvantage of the elutriation process relative to less efficient processes such as air aspiration is that typically the material must dried before proceeding to subsequent dry processes. One example of the use of elutriation in separating metals from plastics as well as the separation of plastics of different densities is described in Example 2, below.

Increasing the yield of target plastics can be another goal of preprocessing. The removal of metal, as described above, can increase the yield of plastics. In addition, techniques such as sorting by thickness or friction, air aspiration, or gravity concentration can be used to improve the yield of target plastics.

Sorting materials by thickness and/or friction is another process which can be employed as part of a preprocessing operation. Such sorters can include slot thickness sorters, roll sorters that separate based on thickness and/or friction, sorters screening for length with long fingers, and sorters utilizing the frictional and elastic properties of rubber compared with other materials.

Thickness/friction sorting is often able to remove thick pieces of rubber or foam that can be found in certain feed streams (e.g. automotive shredder residue and foam from the shredding of white goods). Removing these materials during preprocessing improves the yield of target plastics and sometimes can significantly increase the bulk density of the material.

Sorting by thickness/friction can be effective on the larger particles found in preprocessing (Size I) or size reduction (Size II). Depending on the type of thick contaminant found in the feed material, thickness/friction sorting can be performed either in Size I or Size II material. One example of the use of thickness/friction sorting for the removal of rubber from an automotive shredder residue feed is described in Example 3, below.

In addition to removing metals as described above, gravity concentration can be useful in improving the yield of target plastics by removing plastics that have densities far from the densities of the target plastics, as is also shown in Example 2. Sorting by thickness/friction can improve the effectiveness of gravity concentration for plastic separation. One example of sorting different thickness fractions with gravity concentration is illustrated in Example 4.

Another goal of preprocessing can be to increase the bulk density of plastics-rich material prior to shipping. Methods of increasing the bulk density include size reduction as well as the removal of light components, such as foam. Size reduction can be used in preprocessing. After removal of large chunks of metal that might damage size reduction equipment, Size I material can be sent to, for example, a rotary grinder, where it is ground to produce a Size II material having a significantly higher bulk density than the Size I material. In addition to increasing the bulk density of the material, the size reduction stage is able to liberate contaminant materials such as foam, rubber, metal screws, paper, and the like. This liberated material can then be removed either as part of a preprocessing stage or as part of the dry process.

Another possible function of preprocessing is stabilizing any variations in feed composition of materials supplied to a plastics recycling plant. Methods to accomplish stabilizing variation include, but are not limited to, blending, purposeful segregation of feedstock materials, thickness/friction sorting, optical sorting, and gravity concentration.

The material exiting a preprocessing operation can be blended together to yield a batch of uniform material to send to a plastics recycling plant. This strategy can be useful if the feedstock at the preprocessing facility is relatively uniform, but it can fail if the feedstock changes significantly over periods larger than those required to accumulate the mass of material to be blended.

Purposeful segregation can also be used to improve the consistency of material sent to a plastics recycling plant. Single feedstock types can be run in batches and sent to plastic recycling facilities capable of processing those types of material.

Thickness/friction sorting can also be employed to stabilize the composition of the product of preprocessing, as shown in Example 6. Plastics from certain feed stocks tend to be thicker than plastics from other feed stocks. Even if all feedstocks are intermingled going into preprocessing, thickness/friction sorting often can separate plastics of various types from various sources.

Optical sorting, such as sorting by color or contrast, can also stabilize the composition of feed to a plastics recycling plant. Plastics from certain feed stocks will tend to include different colors than plastics from other feed stocks. Even if all feedstocks are intermingled going into preprocessing, sorting by color can separate plastics of various types from various sources.

Gravity concentration is another process which often can stabilize the feed composition going to a particular plant, as shown in Example 5. Certain types of feed tend to have plastics with certain densities, and varying density distributions will reflect a changing plastic composition. The feed to a plastic recycling plant can be stabilized if plastics more or less dense than the target plastics are removed.

As discussed above, preprocessing operations can be situated at the plastic recycling facility or at locations where the feed material is produced as a byproduct from other operations, such as automobile or white goods shredding for metal recovery.

Size Reduction

Size reduction typically includes one or more processes at the front end of a plastics recycling plant that are arranged to accomplish a variety of tasks. Size reduction can be implemented to remove metals that can damage size reduction equipment or that can negatively affect downstream separation processes, to reduce the plastic particle size such that much of the non-plastic material is liberated, to create a relatively narrow particle size distribution, and possibly to stabilize the composition of materials sent to downstream processes.

In one implementation, Size II material received at a plastics recycling facility is first passed through a sequence of unit operations designed to carefully protect a granulator which reduces the material to size III. These operations can begin with the removal of ferrous and nonferrous metals from the plastics-rich feed material using metal removal equipment as described above in the context of preprocessing. These operations are primarily focused on removing pieces which could be large enough to damage or cause rapid wear of size reduction equipment. Although a great deal of metal removal may have occurred during preprocessing as described above, there may be situations in which no preprocessing is performed, or where any preprocessing does not include removal of metals, or where metal removal is limited. It is also possible that there is only limited control over the preprocessing stages—for example, where preprocessing is performed by the feedstock supplier. In addition, removal of smaller pieces of metal not removed in preprocessing can help improve the efficiency of and reduce maintenance in downstream separation processes.

After metal removal, the Size II (or Size III) material can be fed to a granulator which reduces the particle size to the point that the vast majority of non-plastic material is liberated from the plastic. The particle size (Size III or Size IV) and size distribution can be controlled by an appropriate choice of the granulator screen and by screening after granulation with a top size slightly smaller than the granulator screen. Any oversize material at this screening can be re-fed to the granulator.

The bottom size in the size III or Size IV material is controlled by air aspiration or size screening. Different size fractions smaller than the top screen are isolated after granulation by screening. The size fractions are fed to aspirators tuned specifically for the different size fractions. Very small particles fines are removed along with foam, paper, and other fluff. The plastics-rich products from these aspiration steps can be re-combined prior to further processing.

A particularly useful method for size reduction is known as wet granulation, which can result in reduced production of dust and fines, a narrower particle size distribution, and a cleaner surface. One example of wet granulation is described in Example 7.

Stabilization of the material composition can be another function of size reduction. Even if the composition is stabilized to some degree during preprocessing, there will typically be some variability that can be further damped out during size reduction. Processes such as sorting by thickness/friction, color sorting, or blending can be used to stabilize the compositions of materials fed to downstream processes.

Gravity Concentration

One of the intrinsic physical properties that can differ from plastic to plastic is the density. The density of plastics typically ranges from less than 1.0 g/cm$^3$ to over 1.7 g/cm$^3$. Table 1 lists the ranges of densities of several common plastics found in feedstocks derived from durable goods.

TABLE 1

Densities of Common Plastics in Durable Goods

| Plastic type | Typical density range |
| --- | --- |
| polypropylene (PP) | <1.0 |
| polyethylene | <1.0 |
| polystyrene (GPPS) | 1.0 |
| PP (talc or CaCO$_3$ filled) | 1.0-1.1 |
| HIPS | 1.04-1.07 |
| ABS | 1.04-1.12 |
| Nylon 6 or 66 | 1.13-1.14 |
| PC/ABS | 1.12-1.15 |
| HIPS-FR (V-0) | 1.15-1.16 |
| PC/ABS-FR | 1.17-1.18 |
| PC | 1.2 |
| ABS-FR | 1.21-1.23 |
| PET | >1.2 |
| PBT | >1.3 |
| PVC | >1.3 |
| Acetal (POM) | >1.4 |

This broad range of densities includes individual plastic types with rather narrow density distributions. Separation by density can be effective at splitting highly mixed streams of plastic into two or more streams containing a greatly reduced number of plastic components. The creation of simpler mixtures can improve the consistency of the mixtures and allow them to be more effectively separated by downstream processes. In some cases, density alone can be able to adequately isolate plastic of a given type.

There are a number of methods for separating materials by density. Such methods typically feature the use of liquids as a suspending media for the separation of plastics by differential buoyancy and use components such as settling tanks, gravity concentration and hydrocyclones.

In one embodiment, water can be used as a liquid suspending media. Light products such as polyolefins (PP and PE) and foam will float to the top of such suspending media. Particles more dense than the liquid medium will sink. For convenience, plastic-rich streams with density less than water are referred to as the A product. Materials in progressively higher density ranges are referred to as B, C, D, E and F products. The designated density ranges for each of these products is arbitrary, although the designations are often based on the most effective density cuts for separating the plastics in a particular feed material. In order to separate plastics with specific gravities over 1.0 from each other, devices such as hydrocyclones using higher density liquids, solutions or suspensions can be used. Gravity elutriators using either water or higher density liquids, solutions or suspensions can also be used to separate plastics with specific gravities over 1.0.

Wet elutriation separates according to the different settling velocity of different components. Wet elutriation can be performed with a rising current of fluid or in a centrifugal field. Wet elutriation with a rising current classifier or with a shortened cone hydrocyclone are preferred techniques.

Hydrocyclones can be used for separating plastics by density. The size of plastic flakes separated in hydrocyclones is less critical than those separated by elutriation. In order to obtain effective and relatively narrow density cuts, however, the distribution of particle sizes is preferably relatively narrow and the amount of fine particles is preferably minimal. It can be advantageous if the surface to mass ratio is small for gravity concentrations, since adhering bubbles can alter the apparent density of the plastic flakes. If the flakes are larger than about 20 mm, however, conveyance can be difficult and contaminants may not be sufficiently liberated from the target plastic materials. In some implementations, gravity concentration using a hydrocyclone is performed on Size III plastic flakes.

In streams of durable goods, there are typically several different types of plastics including many in different density ranges. It can be useful to apply multiple density separation stages to yield a number of intermediate product streams containing one or more plastic types. Typically, a first density cut is made using water. Water is used at the first cut because the first stage can be used to initially wet and rinse the material. The water can remove some of the adhered fines and grime that can alter the performance in higher density separations. The first stage separation also tends to be an easier cut, since few plastics are within 0.04 g/cm$^3$ of the density of water.

The relative ease of separation with water as the density bath allows a higher throughput in this separation stage, e.g., if all separators are sized the same. If all the equipment is the same size, maintenance can be simplified.

The light products from the density cut in water are typically polyolefins and foam. This A product can be further processed in stages such as those described below. The plastics more dense than water are typically sent to a second density separator at an elevated density.

The second density separator is typically set at a density to isolate the next density grouping of materials. This grouping, which reports to the light product in this separation, is known as B material. The B material can be further processed in stages such as those described below. The more dense material can also be processed in subsequent density separators at progressively higher densities to yield C, D, E, F and G products. These higher density products can then be further processed as described below.

Density separation at higher densities can be done using salt solutions or suspensions of solid particles. In some implementations, the separation is done using a suspension of solid particles. There can be several advantages to using solid particle suspensions instead of aqueous salt solutions for density augmentation. The solid particles can be relatively easy to remove from water after processing, which greatly simplifies water treatment operations. The surface cleanliness of product plastics can also be improved when solid suspensions are used for density augmentation. In addition to the abrasive nature of solid particles cleaning the plastic surface, a final rinse stage can be effective to remove solid particles from the surface.

The density sort can be used at elevated densities when the solid particles have been classified such that they have a controlled particle size distribution. Larger solid particles can settle too rapidly in hydrocyclone separators. Smaller solid particles can be more difficult to remove after processing and because they can be prone to induce frothing in the liquid suspension.

A precise density cut can be achieved using a media FIG. 2 shows one example of the percentage of a granular material reporting to overflow at different separation densities. The EP of this distribution (defined as one half of the density difference between 25% of a material reporting to underflow and 75% of the material reporting to underflow) is about 0.008 g/cm$^3$. FIG. 2 illustrates one example of using density control to separate different plastic types with very similar densities.

The use of a classified solid media also allows for the application of a two-stage density separation when the dense media is fed from a single feed tank. The concentration of solid particles is typically larger in the heavies outlet of the hydrocyclone than it is in the lights outlet. Therefore, the feed density into a second stage hydrocyclone separator can be made incrementally smaller or larger than the density in the first stage. Careful media classification allows for the control of the increment in the density from the first to the second stage.

The underflow from the first hydrocyclone has a density that is slightly higher than that in the feed, and the underflow from the second hydrocyclone has a density that is slightly higher than the overflow from the first hydrocyclone. This two stage separation, can be implemented to separate a material into three product streams (A, B and C) by controlling the media concentration in a single mixing tank, as illustrated in FIG. 3.

FIG. 4 shows another arrangement of density separation, a double precision density separation (DPDS), where two product streams are created using three separation devices with internal recycle. This configuration can lead to an improved separation, as illustrated in Example 9, which describes the use of this configuration to improve the separation described in Example 8. As in the configuration shown in FIG. 3, the densities can be controlled with a single density tank. The second stage devices can be hydrocyclones or other devices, such as cyvors which are described further in U.S. Pat. No. 6,238,579, which is incorporated by reference herein.

In some cases, it can be useful to employ a simpler gravity separation system, such as an elutriation system which can achieve reasonable separations without the need for dense media. Elutriation is particularly useful as a separation technique if there is a wide split between the densities of the plastics to be separated. Separation by thickness, color and size prior to elutriation can be useful for improving the efficiency of the separation. Elutriation tends to work best for particles larger than about 10 mm. Example 10 describes one example of using gravity concentration to separate A and B plastics from higher density plastics. As shown in Example 10, the light product from a gravity concentration system typically contains A plastics and B plastics along with small amounts of denser plastics. Trace amounts of fine metals can also be present. The A plastics can be separated from B plastics and the denser plastics either before or after elutriation using, e.g., water in a hydrocyclone or settling bath. The B plastics can be separated from denser plastics using density separation techniques such as dense media hydrocyclones, further elutriation stages, or with careful tuning of modified hydrocyclones using water as the liquid medium. Other separation techniques, such as sorting by color, sorting by thickness or friction, or sorting by techniques which depend on a narrow surface to mass distribution can also help separate B plastics from C plastics.

FIG. 5 shows an arrangement of hydrocyclones that can be used to separate A, B and C plastics without the use of dense media. In this arrangement, two hydrocyclones modified such that they have short or no cone sections are placed prior to a standard hydrocyclone. In the first modified hydrocyclone (MH1), any residual metal fed to the system is removed. Metal sits on the bottom of the modified hydrocyclone until the bottom is opened up to remove the metal. Alternatively, a small opening can allow the metal to continuously exit through the bottom of the modified hydrocyclone. The outlet is preferably pressurized to allow proper and consistent functioning of the downstream hydrocyclones.

In the second modified hydrocyclone, the outlet is made large enough such that nearly all of the remaining C plastic exits along with a large fraction of the B plastic. This stream can be sent to further gravity separation systems such as an elutriator or dense media hydrocyclone. Alternatively, it can be sent on to processes such as color sorting, thickness/friction sorting or processes that depend on a narrow surface to mass distribution.

Nearly all of the A plastic and some of the B are then sent to a standard hydrocyclone (SH) which can be adjusted to yield a nearly pure A stream and a heavies stream which contains all of the remaining B as well as a portion of the A material. The pure A stream is typically sent to processes such as color sorting, thickness/friction sorting or processes that depend on a narrow surface to mass distribution. The heavies stream from SH can be recycled back to the feed of the system, combined with the heavy product from MH2, or separately sent to processes such as color sorting, thickness/friction sorting or processes that depend on a narrow surface to mass distribution. This arrangement can include additional stages of modified and standard hydrocyclones that can be tuned to create an additional number of product streams of varying purities.

Color sorting prior to gravity concentration can improve the effectiveness of elutriation, and gravity concentration prior to color sorting can improve the effectiveness of color sorting, as shown in Example 11, below.

Gravity concentration can be used for a number of purposes in addition to segregation of different types of plastics. For example, gravity concentration can be used to separate different grades of the same plastic type, as demonstrated in Example 12.

After a separation technique requiring narrow surface to mass distribution has purified plastics by type, gravity concentration may be used to separate some of the plastic of that type to allow improved product properties with high yield. For example a separation technique requiring narrow surface to mass distribution, SMD, (e.g. triboelectric electrostatic separation) may be used to concentrate the ABS and SAN copolymers from a feed mixture and then the ABS and SAN concentrate may be fed to a gravity concentration system to segregate an unfilled, low-density ABS from a higher density SAN from a still higher density, heavily-filled (e.g. flame retardant) ABS. This is advantageous because it can improve yield of ABS and SAN type plastics and reduce the number of SMD separators required. A similar system would work well with high-impact polystyrene, (HIPS), polyphenylene ether blends with HIPS, and flame retardant HIPS. Gravity concentration after SMD purification concentrates materials by type allows, for example, density cut points to be set selectively for each plastic grade within the type rather than a cut point that is a compromise to provide high yields of both low density HIPS and low density ABS in a mixture to be separated by type downstream using SMD.

Gravity concentration can also be used to facilitate downstream processes. For example, some separation processes work best when only a small number of components are in the feed mixture. Gravity concentration can help such processes by providing a much narrower array of materials in the mixture. In addition, gravity concentration can be used to provide more consistent materials to downstream processes. Electrostatic separation, color sorting and other processes can be more effective when their feed composition is stabilized. Density separation can be a useful technique for stabilizing the types of components in a mixture.

Wet gravity sorting techniques are assumed to include drying systems. Size I and II particles are customarily dried with vibratory screening. Size III and IV may be dried with either vibratory screening systems or with centrifugal dryers. Several varieties of centrifugal dryers are available. The variety with a stationary cylindrical screen oriented vertically or inclined with the discharge generally higher than the feed point. These dryers have a central rotating shaft which moves the subject material around the inside of the cylindrical screen and upward toward the discharge. Fluid is passed through the screen and collected in the peripheral chamber. In some embodiments, a mechanical dryer can be employed on each discharge from a wet sorting system according to particle size and required level of dryness. In dense media systems or washing systems it is customary remove the dense or wash fluid in one drying step followed by a rinsing operation and a second drying step.

In addition to mechanical dryers there are a variety of thermal dryers that may be employed to prepare material for a subsequent process. A size reduction system can also act as a dryer by imparting heat energy via mechanical work to many plastic materials, thus accomplishing two objectives with one operation. Air desiccant drying systems are a variety of thermal drying system which use a desiccant material to dry air which in turn dries the subject material. The desiccant is subsequently redried in a thermal process.

Many separation processes which rely on surface to mass distribution such as differential density alteration and electrostatic separation are greatly improved by very low surface moisture which often requires thermal processes.

Color Sorting

Most feed materials will include some mixture of different color plastics. The off-color plastics can be the same type of plastic with different pigments, another type of plastic, or an unwanted contaminant. In order to make high purity plastic products with consistent colors, it can be desirable to eliminate any off-color contaminants.

Color sorting is a unit operation which works by optical detection and removal of off-color components. The off-color can be an actual variation in color or can be a shade contrast as observed by a black and white camera and some combination of lighting and filters. Commercial color sorters are available to perform this function on granular materials such as plastics. These units can be configured to detect and eject defects from plastics on conveyor belts or sliding down inclined chutes.

Conveyor belt color sorters can be effective up to high defect levels and for relatively large particles (Size I, II or III). The efficiency and throughput improve as the particle size increases until the point where it is difficult to evenly convey and distribute the particles on the belt. The particles are conveyed along the belt and are ejected at the end of the belt, so separation in a belt color sorter can be relatively independent of the frictional, adhesive or elastic properties of the particles. Belt color sorters typically can only detect off-color for a single side of the particles. This can be a problem if it is important to completely eject painted or coated particles or particles with off-color specks.

Sliding chute color sorters can work with Size II, III or IV flakes. Larger flake sizes can be more difficult to convey and smaller flakes can be more difficult to eject without also ejecting good flakes. Sliding chute color sorters can handle reasonably high off-color compositions, but they work well with smaller off-color compositions. They typically can also inspect both sides of a particle. Sliding chute color sorters can be effective as a cleaning stage that can remove small amounts of off-color defects. Color sorting works well for larger flakes of a uniform size. Color sorting can thus work well for size II or size m. Examples 13 and 14 describe two examples of the use of color sorting using different equipment on different size flakes. In addition to its function of isolating particular colors of products into light or dark streams or streams of a particular color, color sorting can be used to separate different types of plastics. Example 15 describes one example of the use of color sorting to improve the purity of a product plastic.

Sorting by Thickness, Friction or Differential Terminal Velocity or Drag in Air

Other characteristics of materials which might be useful in distinguishing different types of plastic from each other and from contaminants are the thickness of the plastic and the frictional, adhesive or elastic properties of the material. All of these properties are grouped in a single category in this specification because in some cases they can be subject to separation using similar or identical unit operations.

Different types of plastic in different parts tend to have different thicknesses. Plastics in feedstocks such as automotive shredder residue tend to be very thick, whereas plastics found in appliances tend to be thinner. Within a given feedstock, different types of plastics can be present in different thicknesses. For example, lower modulus materials such as polypropylene tend to be in thicker parts than stiffer materials such as ABS.

Different grades of a given plastic type can also appear in parts with different thicknesses. For example, thermoformed plastic derived from extruded sheet plastic tends to be thinner than injection molded plastic. Since extrusion and injection molding grades have different properties, sorting by thickness can be able to separate the different grades of a given plastic. Contaminants such as rubber and foam can tend to be thicker than most plastic parts.

Depending on the types of plastics and contaminants in a feed stream, sorting by thickness and/or friction can be useful to separate plastics at a number of stages in the process. Some devices for such separation include roll sorters, slot sorters, screening devices with elongated slots or fingers which overlap, sorters which rely on differential friction and/or bouncing of materials, or devices which separate based on the surface to mass ratio of particles.

Roll sorters work by passing singulated streams of material down inclined counter-rotating rollers which rotate upwards away from the gap between the rollers. The gap between the rollers typically widens from the proximal end (at the feeder) towards the distal end (away from the feeder), so that thinner materials end up in fractions closer to the proximal end and thicker fractions end up at the distal end.

In addition to the thickness, roll sorters also sort based on frictional and/or elastic properties. Materials such as rubber can adhere to the rollers, and therefore can have difficulty falling between the gap even if they are thin enough. Rubber can also tend to bounce along the rollers such that it is unable to report in any fraction based purely on thickness. In some cases, thick rubber particles can even be dragged around the rotating rollers such that thick rubber particles can report to a thin fraction collected at the proximal end of the roll sorter.

Slot sorters typically include long slots of a certain thickness aligned axially along a rotating cylindrical drum. The sample is fed into the rotating drum. Material thinner than the slots is able to exit the drum through the slots. Thicker material is typically removed through and end of the rotating drum.

Devices which rely on differential friction and/or bouncing of material can also be used. One such device is a sliding chute with a cover on the upper end and a collection device somewhere along the chute. Particles that can flow freely down the chute are not captured, whereas particles that tend to bounce due to friction and their bouncing characteristics are captured. Example 16 demonstrates one example of the use of such a device.

Devices which rely on differences of terminal velocity or drag in air in combination with friction and bouncing properties can also be used. Air tables, for example, separate materials into thin and thick fractions while at the same time removing rubber and foam into a stream containing only the thinnest plastics. This fraction, which contains rubber and foam, can be further sorted by thickness (e.g. with a roll or slot sorter) to recover a plastics-rich product stream and a stream enriched in foam and rubber.

Sorting by thickness, friction or bouncing can often be improved by using two or more stages of the same or different type of separation device. Such stages might be arranged consecutively, or separated by one or more other separation devices in between. A variety of options including recycle between the devices is also possible.

Processes which separate materials based on their surface to mass ratio can in some cases be used to sort materials by thickness. Thinner materials tend to have a larger surface to mass ratio when the other dimensions are the same, so that such processes can be able to separate thin materials from thick materials. Such processes include air aspiration gravity concentration or any of the processes described herein in the in the context of separation based on narrow surface to mass distributions. It can be more effective to use other methods to sort by thickness, and in many cases thickness/friction sorting is used to enable those processes.

Thickness/friction sorting can be placed at various points in the plastics recycling process in order to accomplish a variety of separation goals. Sorting by thickness and/or friction typically works best when the plastic flakes are in a particular size range. If the particle size of a flake is as small as the thickness, sorting by thickness is not effective. If the flakes are too large, on the other hand, pieces made from thin plastic can be bent such that they actually report as a thick material. In some implementations, Size III is an appropriate size for sorting by thickness and/or friction, although sizes II and IV can work for particular types of feed material.

If used prior to density separation, thickness/friction sorting can remove problematic rubber that can show up in a number of density cuts. If the rubber shows up in a limited number of target plastic density cuts, thickness/friction sorting can be placed after density separation.

Thickness/friction sorting can also be used after color sorting to eliminate residual contaminants, to separate high surface/mass plastics from low surface/mass plastics, or to enrich a stream in a particular type or grade of plastic.

Examples 17 through 19 describe examples of the use of thickness/friction sorting as a separation technique for mixtures of plastic flakes.

Surface to Mass Control

Many plastics separation processes can be improved by controlling the surface to mass ratios of the plastic materials to be separated. Electrostatic sorting is accomplished by particles deflecting by an amount proportional to the charge to mass ratio (which is assumed to be proportional to the surface to mass ratio). Froth flotation and density differential alteration also depend on the surface to mass ratio of plastics.

A number of methods can be used to control the surface to mass distribution. Sorting by thickness using equipment such slot sorters or roll sorters can create streams with more narrowly defined surface to mass distributions. Other techniques such as air tables and air-classifiers, which depend in part on the surface drag of particles in air, can also be used to separate mixtures into streams with more narrow surface to mass distributions. Large particles with a small surface to mass ratio can be granulated such that they achieve a larger surface to mass ratio. Particles with excessively high surface to mass ratios (fines) can be removed by screening, tabling or by air classification.

In order to achieve the most narrow distribution of surface to mass ratios, it may be necessary to separate the stream through multiple stages or by combining two or more surface to mass control techniques. It can be particularly useful to apply multiple processing stages to fractions with intermediate surface to mass ratios.

A thin fraction can be removed prior to a second stage of granulation taking the material from size III to size IV, as illustrated in FIG. 6. The particle size from the granulator is carefully controlled by using a granulator screen of a given size. For further control of the particle size distribution, the granulator product can optionally be screened such that the largest particles are separated and recycled back to the granulator. The thin fraction bypasses the granulator and rejoins the stream of size IV material just prior to the removal of fines via air aspiration or screening. The combined stream with fines removed can then be sent to downstream separation processes that require careful control of the surface to mass distribution. One example of such a process is described in Example 21 and illustrated in FIG. 36.

The removal of the thin fraction prior to granulation can result in a reduction in the energy required for granulation as well as a reduction in the amount of fines created in this granulation step. Since thin materials have a higher S/V for a given size, their granulation can result in a higher relative loss of fines than the granulation of thicker materials.

This granulation stage can also add energy to the flake material that ends up as heat. This heat tends to drive off moisture. The electrostatic separation processes described below prefers a consistently dry feed material, and this granulation step can thus be implemented to provide some consistency in the moisture content of the material fed to that process.

The granulation stage can also be implemented to create a large amount of clean surface area for the granulated flakes. The clean surface typically helps further processing by exposing a surface which shows the true properties of the surface which have not been altered due to the presence of surface contamination.

Examples 20 through 23 describe methods for obtaining a narrower surface to mass distribution.

Processes Relying on a Narrow Surface to Mass Distribution: Electrostatic Separation Different types of plastics can be separated based on their relative electrostatic charging characteristics. Examples of such devices include, for example, devices in which charged particles fall through an electric field and devices in which particles on a conveyor belt are attracted to an electric potential based on their charge. One of the primary electrostatic separation techniques is known as triboelectrostatic separation (TES).

TES is a relatively simple technique. Particles typically gain or lose electrons when they come into contact with other particles or with parts of the process equipment in a TES separator. Such charging by contact or friction is known as triboelectric charging, which is described further in U.S. Pat. No. 6,335,376, which is incorporated by reference herein.

Charged particles are deflected depending on their charge to mass ratio while passing through a high-voltage electric field in the TES separator. For example, a particle with a zero initial velocity falling vertically through a horizontal electric field deflects horizontally by an amount proportional to the charge to mass ratio of the particle. In practice, this deflection ranges from several centimeters to half a meter or more. FIG. 7 schematically shows the deflection of a charged particle in such a separator.

One of the difficulties encountered in TES is that there is a distribution of charge to mass ratios in any species of a mixture. This means that there will also be a distribution of particle deflections after falling through an electric field. The broader this distribution, the less likely it will be to separate different types of materials. In order to achieve a consistent separation with high purity products, it is necessary to control the charge to mass ratios of particles fed to a TES separator.

The distribution of charge to mass ratios that determines the distribution of particle deflections includes a contribution from a charge per surface area distribution and a contribution from a surface to mass distribution. In order to achieve a consistent and adequate separation, it can be important to control both of these distributions.

Mediated triboelectrostatic separation, described in U.S. Pat. No. 6,452,126, which is incorporated by reference herein, more consistently and effectively charges plastics in a mixtures as complex and variable as post-consumer plastics. Mediation controls the charge per surface area of the particles to be separated by adding an extra component known as media to the mixture. The media is added to the mixture in such excess that the charge on the components to be separated is controlled solely by their ability to charge relative to the media.

The surface to mass ratio distribution should also be narrow in order to achieve the best possible results with a TES separator. In complex streams, such as mixed plastics from durable goods, there are distributions of both particle diameter and particle thickness that result in broad distributions of surface to mass ratios. As an example, FIG. 8 shows the surface to volume (proportional to mass) ratios for circular disks at various thicknesses and diameters comparable to the size of plastic particles separated in a triboelectrostatic separator. For a given disk diameter, the surface to volume ratio of thin particles is much higher than that for thick particles.

In a device to control the surface to mass ratio, typically two or more fractions that have narrow surface to mass distributions are recovered. These fractions can be sent to TES separators that have been tuned specifically for the given surface to mass ratio. For certain streams, separation based on electrostatics can be useful for the separation of Size I or Size II plastics (i.e. insulators capable of holding a charge) from metals (i.e. conductors that rapidly lose charge). For more complicated separations, difficulties can arise where there is a broad charge to mass distribution, when more than two components are present, or when the relative amounts of the different plastic components varies.

The principle of sorting by electrostatics relies on the deflection of particles under the influence of an electric field. The electrostatic force is proportional to the charge on the particle and the acceleration of the particle is proportional to the force divided by the mass (F=ma). This means that the acceleration of the particle due to the electric field is proportional to the charge per mass of the particle. This, in turn, means that the deflection induced by the electric field is related to the charge per mass of the particle. If there is a broad distribution of charge to mass ratios, there will be a broad distribution of deflections induced by the electric field, and separation is compromised.

The charge a plastic flake is capable of holding is proportional to its surface area, so the success of plastic-plastic separation can depend on the existence of a narrow surface to mass distribution in the material to be separated. Strategies for achieving a narrow surface to mass distribution are discussed herein in the context of Surface to Mass Control.

In addition to achieving a narrow surface to mass distribution, it can be desirable to fully and consistently charge particles in order to achieve a narrow charge to mass distribution. The charge on flakes in complex mixtures of plastic flakes can be controlled in a number of ways.

The TES devices rely on methods to consistently and uniformly charge the plastic materials in the feed to the TES units. One method for such charge control is mediation as described in U.S. Pat. No. 6,452,126, incorporated by reference above. A variety of techniques can be used to control the charge on plastic mixtures, as described in Provisional Application No. 60/397,980, filed on Jul. 22, 2002, which is incorporated by reference herein.

Conductive media can also be used as a method for charge control. Conductive media, which can be made by adding carbon black, steel fibers, or steel spheres to plastics, can be manufactured into sheets which line TES charging devices. Such sheets are called tailored media sheets (TMS). For TMS to be effective as a charging media for triboelectric separation, the material used in the TMS must be capable of consistently charging mixture components to relatively high and specified levels over a reasonably long period of time. The ability to charge plastics to a high level can be accomplished by appropriate selection of the mediating material. Such materials are often insulators, however, so they can quickly saturate with charge. Once the mediating surface is fully charged, it can no longer consistently charge mixture components.

Consistent charging can be obtained by selecting a TMS material that will allow charge to be removed from its contact surface with the mixture. This can be accomplished by adding components to the insulator to make it more conductive. Example 25 describes one example of the preparation and evaluation of TMS created from conductive media.

Since the surface to mass ratio of the low and high surface to mass ratio streams is different, the deflection of the particles is different when passed through the same electric field. High surface to mass particles deflect to a much greater degree than low surface to mass particles. It is therefore possible to use different voltages to achieve high purity products, as described in Example 24.

High surface to mass (L) and low surface to mass (H) streams can be sent to separate TES separators. As shown in FIG. 9, the voltage on the charged plates in the two separators can be controlled by the same power supply while the plate separation is varied so that different electric fields result. Separate and controllable electric fields can also be obtained by using separate power supplies for the two separators.

There is no requirement to have only two streams with different controlled surface to mass ratios. With some types of surface to mass separation devices or with multiple stages of surface to mass separation devices, three or more streams with more narrow surface to mass ratios can be obtained.

Therefore, in some embodiments, TES separators can be tuned specifically for each of the fractions.

In the limiting case of an infinite number of S/m fractions, a single separator with a continuously varying electric field can be provided, as shown in FIG. 10. In this case, the material with the lowest surface to mass ratio is fed into the TES separator where the plates are closest together and the material with the highest surface to mass ratio is fed into the TES separator where the plates are farthest apart. Materials with intermediate surface to mass ratio are fed at intermediate locations.

The effect of the electric field on particle deflections can be controlled using other techniques. The falling time in the electric field, which determines how long the forces are applied the charged particles, can be varied by using shorter plates. Because particles with a low initial velocity take longer to fall the same distance as fast moving particles, the falling time in the electric field can be significantly affected by raising or lowering the location where the particles are dropped relative to the start of the electric field. The effective electric field experienced by falling particles can also be controlled by varying the angle of the plates. FIG. 11 shows a side view of TES separators with different effective electric fields. Particles with higher surface to mass ratios require a lower effective electric field, so the angle with respect to vertical is larger. One advantage of this method of control is that the angle can be more easily adjusted than the gap between the plates, the drop height or the plate length.

Another method for varying the effective electric field experienced by falling particles is the insertion of a dielectric material into the electric field between the plates. By inserting a dielectric material into the field, the strength of the field can be selectively reduced. For example, a sheet of PVC of a predetermined thickness can be inserted between the electrically charged plates in such a way as not to interfere with the falling particles. The PVC sheet can be longer (in the direction of fall of the particles) at the end where a lower field is desired and shorter or not present in the portion of the width of the separator where the lower surface to mass particles are fed to the separator. In this way the separator can be tuned simply by varying the vertical position of a dielectric sheet. Alternatively a variable thickness dielectric can be used which is thinner at the end of the separation device through which the low surface to mass particles fall and thicker at the end of the device through which the high surface to mass particles fall. Alternatively a dielectric material can be chosen which is of a thickness that substantially eliminates the electric field between the plates, and in this way the amount of time the falling particles experience an electric field is reduced. The thick dielectric can be inserted from the top of the field so as to block the upper part of the field partially to a selected fall distance appropriate to control the deflection of the given material.

Surface to mass control can be implemented at a point in the process prior to TES. Surface to mass separation can be implemented very early in the overall process, or just prior to TES. Surface to mass control just prior to TES simplifies the early processing of material, since many of the earlier processing techniques may not depend much on the surface to mass ratio of particles. Surface to mass control techniques can also be used after TES, although in that case the techniques are for separation rather than for surface to mass control.

Surface to mass control can be integrated with a TES separator such as that shown in FIG. 10. Consider a surface to mass separator that gives a continuous distribution of surface to mass ratios. Such a separator can be a roll sorter or a vacuum gravity table such as that made by Forsberg, Inc. (Thief River Falls, Minn.). The output of such a device can be distributed along the length of the top of the TES separator and fed by a vibratory pan feeder into the TES separator. It can also be fed directly without the use of a vibratory pan feeder.

In some cases, the very thin or very thick fractions from surface to mass sorters can be undesirable. For example, rubber particles that tend to be thick can be concentrated in a stream that can be removed either before or after TES.

Where a TES is fed a number of different pre-charged feeds, these feeds can be separated into different lanes on a single vibratory feeder. Alternatively, multiple vibratory feeders can be used. The materials can be exposed to charge control media and then each different S/M fraction can be fed to an individual separator in which the field is precisely tuned to deflect the different component of the mixture the appropriate amount. In one embodiment, a three lane vibratory feeder allows exposure to a reusable charge control material or media in each lane. The media can alternatively be removed from the charging mixture before the mixture is fed to the separator device via one of several means including size classification and magnetic exposure if the media contains a ferromagnetic additive. Each fraction of the mixture is then dropped through a separator with three different field intensities such that the different mixture components are deflected into a product removal device. This product removal device can be a series of augers, a moving belt, vibratory feeder or other such device. The various purified products are moved to the side of the separator and collected. Thus, in one embodiment, a multi-lane vibratory feeder is provided which sequentially collects the purified products from different surface to mass separated fractions. These fractions can be blended back together once purified by the TES separator. If the different surface to mass fractions of a given polymer have different mechanical, color or processing properties, they can be recovered without blending. This recovery without blending can be accomplished by the use of trap doors in the vibratory or auger collection device or by the use of a plough diverter on a belt collection device.

FIG. 12 shows an example of the collection of up to 15 products with a single TES device which includes three surface to mass fractions (S/M) and which includes five possible product collection lanes (usually requiring four adjustable diverters in the bottom of the electrostatic separation device). The device can combine some products with different surface to mass ratios within a singe lane of the collection device. The device can provide fewer or more different surface to mass fractions and can deliver products within from two to eleven different lanes. A vibratory conveyor with multiple lanes and automatic trapdoors can be used in such a collection device.

Consider the electrostatic separation of plastic types A and B. To provide for consistent charging of plastics A and B, it can be useful to add a third component Q to the mixture containing components A and B as well as smaller amounts of other component C and D. Material Q can have charging characteristic between those of A and B, and may be in a transferable form such as flakes or pellets. Material Q may be larger or smaller than the feed mixture flakes. The Q media is preferably easily separated from the R-rich and S-rich product streams.

Q can be manufactured, for example, by melt compounding a mixture of flakes that might typically be fed to the electrostatic separator. The extrudate may be pelletized to form media pellets of Q, formed into a sheet that can be granulated for use as media, or pelletized and molded into parts suitable for media particles.

The third component need not be particulate in nature, nor does it need to be a plastic similar to A or B. For example, that the charging system can be painted with a paint that leads to characteristic charging of the A and B plastics, where the paint is specially formulated for such a feed mixture.

Smaller plastic, metal or ceramic pieces can be painted and/or coated with a mediating surface. These pieces are preferably easily separated from the A-rich and B-rich product streams.

The charging system can also be made out of a plastic such as Q. This can simplify material separation and handling issues.

When multiple plastic types are present, it may be difficult to completely separate the components in a single stage of electrostatic separation. The charge to mass distribution for a given plastic type is preferably narrow. Instead, the separation of multicomponent mixtures is preferably performed in multiple stages.

The product purities after electrostatic separation can also depend on the feed composition. In addition to careful control of the charging and surface to mass distribution as described above, techniques such as pre-blending may be employed to damp out variations in the feed composition. Multiple stages may also help to damp out variations in product purity.

Depending on the feed material, electrostatic sorting can occur in one or more stages. The desired output is two or more product streams ready for extrusion with only a minor amount of byproducts.

In order to separate a mixture of two or more components into relatively pure components, more than one stage of electrostatic separation is usually required. FIG. 13 shows a two stage arrangement of electrostatic separators that yields two primary products and byproducts that might include trace amounts of impurities C and D.

Example 24 describes implementations in which one or two stages of electrostatic separation might be employed to purify particular streams commonly found in the recycling of plastic from durable goods. The advantages of surface to mass control are also demonstrated.

TES separation processes typically contain one or more diverters which determine over what range across the bottom of the TES device the products will be collected. The diverters are positioned according to the nature of the feed mixture. In cases with variable feed composition, it is possible to adjust the diverter positions in real time to control the product quality. Control can be accomplished by limiting the deviation between measured and setpoint mass flow rates to the product streams.

Further control can be accomplished by requiring certain streams to have overall charges in certain ranges.

Processes Relying on a Narrow Surface to Mass Distribution: Density Differential Alteration and Froth Floatation Density differential alteration (DDA) is another process which depends on the surface/mass ratio. Depending on the type of materials to be separated, DDA can be used instead of, before, or after electrostatic sorting or froth flotation.

The function of DDA is to increase the volume of amorphous materials by heating the materials and allowing them to expand. Trapped moisture or gases in a plastic material will tend to form bubbles when the material is heated above the glass transition temperature. The formation of bubbles increases the volume and decreases the density of the particle.

Heat transfer to the plastic flakes is proportional to the surface area heated, and the degree of density reduction of a given material depends on the amount of heat per mass transferred to the material. Particles with a narrow surface to mass distribution should therefore show efficient and sharp effect using DDA. It is important to note that the method of heating the flakes can determine the effective surface area of a flake. Radiant or convective heating of particles on a belt can only heat about half of the total particle surface.

Lower viscosity materials tend to decrease in density more rapidly than higher viscosity materials. This suggests a method for further increasing the thickness difference between thicker injection molding grade materials from extrusion grade materials.

After DDA, the granular material can be separated by techniques such as density separation or thickness sorting. Materials that decrease in density during DDA generally also become thicker.

Froth flotation is another separation process which can depend on the surface to mass ratio distribution of the particles to be separated. Froth flotation relies on the preferential adhesion of bubbles to surfaces of certain types of plastics. These bubbles decrease the apparent density of particles, resulting in their ability to float relative to particles of similar density but without adhered bubbles. The apparent density adjustment is greater for particles with a high surface to mass ratio, so separation by froth flotation should be best for mixtures with fairly uniform distributions of surface to mass.

Blending

As discussed above in the context of preprocessing and size reduction, blending can be used either before or after those processes as part of a strategy to stabilize the feed to subsequent processes. Even if effective blending is used to stabilize the feed composition, variability in some of the separation processes can lead to variability in the purity of products over time. It is therefore desirable to blend the material at a stage prior to and/or after extrusion.

The most effective blending occurs for homogeneous particles, so post-extrusion blending can be appropriate. However, large variability in the material fed to the extruder can lead to some variability in the appearance and/or properties of different pellets. Since the process preferably works when the feed is constant, the material can be blended prior to most of the processing. This can work well with the size III material prior to density separation.

Due to the possibility of process variability in subsequent stages, there can be product pellet variations even when the feed to the separation system is constant. This can require a post-extrusion blender.

Blending can occur at the stage just prior to extrusion. Since extrusion is a relatively well-controlled process, a consistent feed to the extruder typically lead to a consistent product. Blending just prior to extrusion also provides an opportunity to check the feed flakes in the laboratory to predict the product properties and to perhaps select additives which can boost the properties to meet target specifications.

Compounding and Extrusion

The separated flakes can be extruded on a single or twin screw extruder. A feed system which can accurately add prescribed amounts of colorants, impact modifiers, antioxidants and other additives is typically included with the extrusion system.

High strength magnets can be included over the extruder throat, since pieces of metal and other magnetic material can be extruded from the extruder.

A vacuum devolatilization system can be included to improve the pellet quality of hydrolytically stable polymers and product quality of moisture sensitive polymers. Pre-drying can be included for hydrolyzable polymers such as nylons, polyesters and polycarbonates.

Another component of the extrusion system can be a fine mesh screen capable of removing solid or rubbery contaminants. Screens are typically from 40 to 120 mesh.

The extruder feed typically contains contaminants such as rubber, wood, metals and thermosets at higher levels than for extruders processing virgin plastics, so it is desirable to include screen changing systems. A typical example of this is a screen changer with an automatic backflush function when the pressure across the screen exceeds a certain value.

In some circumstances, the level of contaminants in the flakes to be extruded is so high that it can be difficult to extrude the material while removing contaminants below an acceptable level. A coarse screen (e.g. 40 mesh) can be used to extrude as a first pass and through a significantly finer mesh (e.g. 100 mesh) in a second pass. Such a two pass extrusion, though rather costly, improves extrusion of materials with high contaminant levels. In some cases, only a portion of the material can be extruded in two passes. This would enable extrusion by the remaining material in a second pass by combining it with the material that had been extruded once already.

Another desirable aspect of the extrusion system is the ability to add additional components such as additives, virgin plastics, or other plastic flakes to the plastic flakes recovered from the MBA separation process. Compositions of such compounds are described in detail in Provisional Application No. 60/397,980, filed on Jul. 22, 2002, incorporated by reference above.

Pellets can be formed using equipment standard in the industry. A screening and aspiration system is desirable after pelletization to allow a uniformly sized product without fines.

The plastic flakes can also be directly extruded into sheets or as a layer in coextruded sheets.

Examples of the Plastics Recycling Process Configurations

There are several possible arrangements of the various processes described below. The ordering of the processes typically depends on factors such as the type (or types) of feed sources processed, the geographical origin of these feed sources, the temporal distribution of the plastic from the source, and the range and quality of products desired.

Different feed stocks contain different types of plastic and different contaminant materials. An arrangement of processes useful for processing one type of feed might not be useful for other types of feed.

The geographical origin of the feed can also affect the plastic composition, which can determine the arrangement of separation processes. In different regions of the world, different types of plastic or different colors of the same plastic are used for similar products. This can be due to the availability of different plastic grades, economic factors, consumer preference or regulations which might determine the types of plastic and additives.

The temporal distribution of plastics in a feed source can be another factor that can control the arrangement of the various separation processes. The types and grades of plastics and the additives used in the plastics for some applications have changed over time. These changes can be due to factors such as the availability of improved grades of plastics and additives, changing economic factors, changing plastics processing technologies, consumer preference or regulations which might determine the types of plastic and additives.

The range and quality of products desired can have a significant effect on the arrangement of the various separation processes. More separation processes, perhaps including multiple stages, might be required if a high purity product is required from a relatively complex feed mixture. If only some of the potential products are targeted for high purity products, fewer separation processes might be employed in some later portions of the overall process.

FIGS. 14-20 illustrate example arrangements of separation processes in the overall process. For the various individual separation processes, there can be many permutations.

Two or more product streams typically exit some of the separation processes. Each of the products can contain different components that require different arrangements of separation processes to completely purify the material. There can be more than one of the arrangements shown in the figures below included in a single plastics recycling plant.

FIG. 14 illustrates an example arrangement of various separation processes that may yield good products for a wide variety of feed types. This arrangement can be applied in a wide variety of cases because it employs the component separation processes in a sequence such that all of the processes are used for the appropriate particle size An arrangement making use of thickness/friction sorting is shown in FIG. 15. In this arrangement, thickness sorting is performed on Size III material prior to gravity concentration. It can also be performed on Size II material prior to granulation with similar effect. One advantage of this arrangement is that it may be able to remove contaminants such as foam or rubber relatively early in the overall process.

Color sorting is typically performed after gravity separations because color sorting earlier in the overall process can require twice the number of process lines for gravity separation and other processes to follow. In some cases, however, color sorting can be done prior to gravity separation and even prior to size reduction to size III material. It can in some cases greatly simplify gravity separation by removing all of a certain density material by the more robust method of color sorting. As shown in Example 13, color sorting size II material can be preferred because color sorting can be extremely effective for this size flakes. One arrangement with color sorting early in the overall process is shown in FIG. 16.

In some cases, different grades of a plastic can have a different thickness. FIG. 17 shows such an arrangement of separations processes where thickness/friction sorting can be employed to isolate separate grades of a plastic. Examples 29-32 describe a number of applications of thickness/friction sorting in such an arrangement.

For some products, sufficient purity can be achieved without using all the separation processes. For example, in cases where only one material reports to a particular density fraction in gravity separation, the arrangement in FIG. 18 might be employed. Color Sorting can or can not be included for this arrangement, depending on the color distribution.

In some implementations, repeating similar processes at different stages in the overall process may be necessary or desirable. For example, FIG. 19 illustrates one arrangement including two color sorting stages. This can be beneficial if color sorting is not perfect in a first color sorting stage or if color sorting using different settings is necessary later in the process.

In some implementations, an arrangement of processes that does not include gravity concentration can be used. Such an arrangement, as shown in FIG. 20, can be used in less complex mixtures or when other separation techniques are as or more effective than density separation. One of the advantages of not using gravity concentration is that waste water treatment issues are reduced.

Gravity concentration can be used at the end of the separation process in addition to earlier in the process, as shown in FIG. 21. The advantage of this configuration is be that gravity concentration can be used as a final purification step at the end of the process. In addition, gravity concentration can be used to separate grades at this stage in the process. Gravity concentration can also be used only at the end of the separation process, as shown in FIG. 22. In this configuration, the gravity concentration is performed on a smaller amount of material than in the configuration of FIG. 21, while still achieving the purification and separation by grades.

Feed mixture and process can be sufficiently consistent that blending is not required, as shown in FIG. 23.

The products can be in the form of flakes. In this case, extrusion and compounding may not be necessary, as shown in FIG. 24A.

processes according to the invention. FIG. 24c shows a number of other possible multistep processes and FIG. 24 d shows a number of specific subgroupings of processes.

Thus, for example, processes according to the invention can be implemented to include multiple color sorting or gravity separation stages either in sequence or separated by other processes. Blending can be performed at various stages in the overall process in order to improve the feed consistency to the various processes. The exact selection and arrangement of individual separation processes will depend on many of the factors described above. Extrusion and compounding, if included, is always last.

TABLE 2

Advantages and disadvantages of arrangements of the overall process

| arrangement | advantage | disadvantage |
| --- | --- | --- |
| Standard (FIG. 14) | Useful for a broad range of feed sources. | May not be optimal for any one type of feed material |
| Early (size II or III) thickness/friction sorting (FIG. 15) | Ability to remove rubber and foam early in the process. | Not necessary for all feed sources |
| Early (size II or III) color sorting (FIG. 16) | May simplify gravity separation for some materials. Color sorting may be very efficient for size II flakes. | May lead to a requirement for multiple gravity separation systems. |
| Thickness/friction to create grades of plastic (FIG. 17) | Good control of a product properties. Ability to improve purity and enable other separations. | Creation of a larger number of product streams, complicating the plastics recycling plant. |
| Only color sorting after gravity separation (FIG. 18) | More processing not necessary if gravity separation is sufficient. Color sorting can provide consistent colors. | Product may be poor if gravity separation goes out of control. |
| No separation after gravity separation (FIG. 18) | More processing not necessary if gravity separation is sufficient. | Product may be poor if gravity separation goes out of control. |
| Two stages of color sorting (FIG. 19) | Better color control. Ability to use multiple color sorting settings. | Creation of a larger number of product streams. Higher capital cost. |
| No gravity concentration (FIG. 20) | Reduced waste water treatment. | Less robust to composition variations. |
| gravity concentration at the end of the separation process (FIG. 21) | Opportunity for final purification by density. Opportunity for separation by grade. | Higher capital cost. Higher energy costs. |
| Gravity concentration only at the end of the separation process (FIG. 22) | Opportunity for final purification by density. Opportunity for separation by grade. | Less ability to damp out feed and upstream process variations. |
| Separation process without blending (FIG. 23) | Reduced capital and energy costs. | Less ability to damp out feed and upstream process variations. |
| Separation process without extrusion and compounding (FIG. 24) | Reduced capital and energy costs. | Reduced ability to control product consistency and quality. |
| Separation process without surface to mass control (FIG. 24b) | Reduced capital and energy costs. Simplified process flow. | Reduced ability to control product consistency when feed composition changes. |

For certain feed materials, the surface to mass distribution is sufficiently narrow that no further surface to mass control is necessary prior to an SMD type of process. FIG. 24b shows an example of such a process flow. The advantage of such a process is a simplified process flow, although it may not be robust to variations in the feed composition.

Table 2 lists some advantages and disadvantages of the various process permutations described above. The various processes described above are only a number of permutations of many possible implementations of multistep separation Creation of Unique Product Grades Through the Use of Thickness/Friction Sorting Sorting by thickness and/or friction can be useful for a variety of feed materials. One example of its utility is its ability to separate different grades of the same plastic type.

The use of thickness/friction sorting in the separation of products from streams of white goods can be extremely useful. Major components of white goods streams typically include plastics from refrigerators and washing machines. Refrigerators make up the majority of this material. The major plastics in refrigerators are ABS and HIPS, with lesser amounts of PP, clear PS, PC and SAN. The ratio of ABS to HIPS depends on the geographic origin and ages of the refrigerators, but the observations described below should be generally true.

One problem with the separation of this variety of plastics is that many of them tend to be similar in density. The gravity separation stage can therefore yield a product stream containing, for example, two major and four minor plastic types. Complete purification by a further separation process such as electrostatic separation may even prove difficult because of the large number of plastic types and grades.

ABS is most often found in refrigerator liners as thin sheets about 1.6 mm or less that have been thermoformed from either monolayer or bilayer coextruded sheets. Injection molded ABS, which tends to be found in thicker parts, is present to a lesser extent. HIPS, on the other hand, can be found as either extruded sheets in liners (including trilayer coextruded sheets) or in thicker injection molded parts such as vegetable trays, freezer doors and utility shelves. The HIPS liners are often thicker than 1.6 mm and the injection molded HIPS can be over 3 mm thick. HIPS therefore tends to be much thicker than ABS. PP found in refrigerators is typically a heavily filled PP used in temperature control dials. PS, SAN and PC tend to be used in lettuce crispers and similar thick, clear, injection molded parts. All of these materials are thicker than most of the ABS and much of the HIPS found in refrigerators. Washing machines contain a large amount of unfilled PP. The grade of this PP may depend on the part thickness and complexity. It may differ from some of the refrigerator plastics described above.

Thus, thickness sorting might be useful in the purification, and might even be used to isolate grades of ABS, HIPS and PP. The examples below illustrate instances in which thickness sorting can be used to create improved grades of plastic.

Process Options for the Removal of Plastics Containing Bromine

Waste plastics from streams of mixed electronics typically include plastics which contain flame retardants to meet safety requirements such as those required by Underwriters Laboratories and similar institutions in other countries. Parts that most often contain Br include computer monitor housings and television housings.

Because of customer perception and even regulatory pressures, plastics containing bromine can be separated from Br-free plastics. Fortunately, a number of both manual and automated techniques exist for removing Br from plastic products. Manual separation of plastics containing Br from non-brominated plastics can be accomplished on whole parts. Isolation of computer monitors and televisions from other electronics plastics is one step towards the removal of Br from non-brominated plastics. Other plastic parts may contain Br as well, thus manual separation can include verification techniques such as hand-held XRF spectrometers. Manual separation techniques are typically not as cost effective as automated techniques. In addition, identification errors or other human errors can result in less than perfect separation. It can therefore be desirable to use automated separation techniques.

A number of automatic separation techniques exist which are capable of separating plastics containing Br from Br-free plastics. Such techniques include both intrinsic and extrinsic property differences. The density of plastics is much higher if a significant amount of Br is present in the plastic. Since Br is typically present at levels of 5% or higher, the density of brominated plastics is typically greater than that of the non-flame retarded plastic by 0.05 g/cm$^3$ or greater. It is relatively easy to separate materials with such wide density differences using separators such as sink-float tanks or hydrocyclones.

Separation by density is not perfect, however, and a small but measurable amount of higher density Br-containing plastics can report to lower density product streams. This is especially true when the material fed to the density separation system is variable in composition. A two stage density cut which is capable of removing almost all of the higher density brominated plastic for broad ranges of feed composition can be used.

The density separation of brominated and non-brominated plastics typically must be accomplished at elevated densities above that of water. It is therefore important to control the density carefully. Techniques for controlling the density of separation slurries at elevated densities are described in Provisional Application No. 60/397,808, filed Jul. 22, 2002, which is incorporated by reference herein.

Example 33 describes the benefits of two stage density separation (DPDS) with carefully controlled separation densities can be used to remove plastics containing bromine. Example 34 demonstrates the removal of most bromine-containing plastics using rising current separators such as elutriation devices.

Devices exist which can eject particles containing Br. The detection of the strong X-ray fluorescence K$\alpha$ signal of Br can be used to control the ejection of brominated plastics. This technique works best for streams containing small amounts of Br, so it may be best used after other techniques such as separation by density, which can be used with effectiveness for broader ranges of composition.

The presence of significant amounts of brominated flame retardants in a plastic should significantly alter the electrical properties of the plastic relative to the Br-free plastic. The electrical property differences of the plastics should therefore result in one type charging positive relative to the other when the plastic surfaces are contacted with each other.

Charging differences exist between different plastic types or plastics with different additives, so it should be possible to separate the plastics containing bromine using TES. Examples 27 and 28 demonstrate the feasibility of TES for separating plastics containing Br from those without Br.

The color of plastics has little to do with the presence of flame retardants, but the brominated plastics in certain mixtures may tend to be a certain color. As an example, consider a mixture of plastics from household appliances. Plastics from refrigerators and other white goods are typically bromine-free and white in color. Televisions, on the other hand, are typically black in color and usually contain bromine. The removal of television plastic by color sorting can therefore significantly reduce the bromine content of the final product.

Parts made from plastics containing Br sometimes have thicker walls than parts made from non-brominated plastics. Since brominated flame retardants are often added in such large amounts that the mechanical properties of the plastic suffer, it is often the case that the parts must be made thicker. This is especially true for computer monitors.

It can also be important to be able to carefully control the amount of Br found in recycled plastic products. The presence of small amounts of Br and Sb in plastic products is useful as a marker that the material contains post consumer recycled plastics, as described in U.S. application Ser. No. 10/511,109, "Compositions of Materials Containing Recycled Plastics," to L. E. Allen, III, B. L. Riise, and R. C. Rau, filed on April 2003, incorporated by reference above.

Examples of Strategies for the Recovery of Engineering Thermoplastics from Mixed Feeds In order to improve yields, engineering thermoplastics (ETPs) can be recovered from mixed streams such as those from office automation equipment (OA). ETPs include, but are not limited to, modified PPO, nylons, PC and PC/ABS. Flame retarded grades of ABS, HIPS, modified PPO, nylons, PC and PC/ABS are also considered to be ETPs. The recovery of ETPs is a significant challenge due to the complexity of the mixtures of these materials and the lack of large and consistent quantities of this material in many feed streams.

An additional aspect of ETP mixtures is that flame retardant grades of ABS and HIPS containing Br and Sb-based flame retardants are often present. This means that all products will have at least small levels of Br and Sb and that the presence of low levels of Br and Sb in plastic products is an indicator that they can be derived from post consumer streams containing ETPs as discussed above.

The recovery of ETPs is likely to require one or more stages of triboelectric separation (TES). Examples 27 and 28 describe the use of TES for the separation. The recovery of ETPs can also require double precision density separation (DPDS).

Other separations such as color sorting can also be helpful under certain circumstances. This is true because certain types of ETPs can tend to be certain colors. Similarly, separations such as sorting by thickness and friction can be helpful for ETP separation, especially since certain plastics can tend to be thicker than others. Surface to mass control can be useful for improving TES as well as other techniques depending on surface to mass. Density differential alteration can also prove useful for the separation of ETPs because different ETPs tend to have different softening temperatures and different viscous properties.

Example 35 describes an example ETP mixture to be separated and an example process flow, and provides results of a probability model for the separation (which includes both TES and DPDS) and discusses how DPDS can be used to control the product properties.

Potential Products for Various Feed Streams

The types of products resulting from the overall recycling process depend dramatically on the feed type, the feed source location, the temporal mixture of the feed, and the arrangement of processes.

The major types of plastics products are preferably also major plastic components in the feed material. The types of plastic in the feed typically depend on the feed type and geographical origin of the feed. Table 3 shows typical major ( ) and minor (m) plastics one might find in various feed streams.

TABLE 3

Abundance of Selected Plastics in Various Feed Streams
(Major = M, minor = m)

| source | ABS | HIPS | PP | PC/ABS | PC | PPO | PS | SAN |
|---|---|---|---|---|---|---|---|---|
| U.S. white goods | M | M | M | m | m | m | M | M |
| European white goods | m | M | M | m | m | m | M | M |
| Japanese white goods | M | M | M | m | m | m | M | M |
| U.S. automotive | M | m | M | M | M | M | m | m |

TABLE 3-continued

Abundance of Selected Plastics in Various Feed Streams
(Major = M, minor = m)

| source | ABS | HIPS | PP | PC/ABS | PC | PPO | PS | SAN |
|---|---|---|---|---|---|---|---|---|
| U.S. office automation | M | M | m | M | M | M | m | m |
| U.S. consumer electronics | M | M | m | M | M | M | m | m |

The various products resulting from the recycling process typically also depend on the overall arrangement of separation processes. As we mentioned above, more than one of the various process permutations might appear in the overall plastics recycling process. As an example of this, consider a hypothetical overall process for sorting U.S. white goods. In the sorting of U.S. white goods, the standard process plus thickness sorting (FIG. 17) can be performed to create two ABS and HIPS grades, but a simpler process (FIG. 18) plus thickness/friction sorting for the PP stream. FIG. 25 illustrates one example of a process flow and products implementing this strategy. Many other arrangements of processes are possible.

The series of unit operations which are used to create any given product can be considered in the context of a process genealogy. According to this concept, a process flow can be defined according to the output desired rather than the feed mixture. Any given product will have a definite history of unit operations which it has undergone in a given sequence, much as a given individual has a definite list of genetic ancestors. The same plant may one day create this product and a second product which will have experienced a very different sequence of unit operations because the two products diverged at an earlier stage in the plant. A third product likewise will have diverged at a different point in the recycling plant and so have yet another genealogy of process operations. The three products would likely share the first few steps until the materials diverged and could have completely different final processing steps. The products may be though of as cousins. This concept acknowledges that feed mixtures can vary but that the process of creating a given product from the components of any given feed mixture can remain constant.

The overall process plant flow schematic is thus not necessarily given in discussions of the organization of process steps and description of advantages but once the scope of products to be created is understood based on a known feed mixture it is a straightforward task to assemble the individual product flow genealogies into an overall plant flow schematic.

In some cases, it may also be desirable to recombine products from different streams in order to yield products with controlled compositions. Such mixing would typically occur at the blending or compounding stage, but it may also be performed at some point earlier in the process.

The invention will be further described in the following examples, which are illustrative only, and which are not intended to limit the scope of the invention described in the claims.

EXAMPLES

Example 1

Removal of Metal from Plastic Using an Air-Leg Separator

A Size I feed material derived from Japanese white goods contained a significant amount of metal including large chunks, thin strips of metal, and wires. The material was fed to an air leg separator with the inlet velocity set to 23 m/s. Table 4 shows the weight percentages of large metal and small metal in the feed, lights and heavies streams. These results show that an air leg can, in a single stage, remove nearly all of the bulky metals which might damage size reduction equipment, such as a grinder.

TABLE 4

Compositions of large and small metal pieces in the feed and product streams of an air-leg separator (Size I)

| Stream | wt. % large metal | wt. % small metal |
|---|---|---|
| Feed | 3.4 | 4.3 |
| lights | 0.3 | 3.3 |
| heavies | 39.5 | 15.9 |

Example 2

Plastic Separation Using an Elutriator

A Size II feed material derived from Japanese white goods contained a significant amount of metal including large chunks, thin strips of metal, and wires. The material was fed to a gravity concentration system with the upward water velocity set to 0.13 m/s.

The types of material were categorized as target plastics, heavy plastics and metal. Target plastics consisted of plastics with a density less than 1.20 g/cm$^3$. Heavy plastics included all plastics more dense than 1.20 g/cm$^3$. Metal included chunks of metal, thin strips of metal, and wires.

Table 5 shows the weight percentages of target plastics, heavy plastics and metal in the feed, lights and heavies streams. These results show that a gravity concentration system can effectively remove all metal and the majority of heavy plastics in a single stage.

TABLE 5

Yields of target plastics, heavy plastics and metal in a gravity concentration system

| stream | wt. % target plastics | wt. % heavy plastics | wt. % metal |
|---|---|---|---|
| feed | 90.5 | 1.8 | 7.7 |
| lights | 99.5 | 0.5 | 0 |
| heavies | 43.0 | 8.0 | 49.0 |

Example 3

Removal of Rubber from Size II Automotive Shredder Residue

Rubber and foam can be removed from a waste plastic material by sorting by thickness and/or friction. A roll thickness sorter can be used for such a separation, since foam and rubber tend to be thicker and have different friction properties relative to plastics.

Various Size II plastics and rubber were fed to a slot thickness sorter with an upper gap set to 1.6 mm and a lower gap set to 6.4 mm. Table 6 shows the percentages of various plastics and rubber reporting to thin (<3.2 mm), mid (3.2-6.4 mm) and thick (>6.4 mm) fractions.

TABLE 6

Separation of Size II Plastics and Rubber from Automotive Shredder Residue

| Polymer | thin (<3.2 mm) | id (3.2-6.4 mm) | hick (>6.4 mm) |
|---|---|---|---|
| ABS | 18% | 42% | 40% |
| PP | 25% | 44% | 31% |
| PPO | 11% | 32% | 58% |
| Rubber | 0% | 8% | 92% |

Almost all of the rubber reported to the thick fraction. Much of the plastic that reported to the thick fraction did so because it was curled or had corners. The separation might therefore be even better for Size III material.

Example 4

Gravity Concentration of Different Thickness Fractions

Mixtures of B (specific gravity between 1.00 and 1.10) and C (specific gravity between 1.10 and 1.20) plastics derived from Japanese white goods were separated using an elutriator.

FIG. 26 shows the % B in the light product mixture as a function of the upward water velocity in the elutriator for thick (>3 mm thickness) and thin (<3 mm thickness) for particles in two different size ranges (½-¾=size II and ⅜-½=size III). The % B for the overall mixture (no size or thickness sorting) is also shown.

FIG. 26 shows that the purity is maintained to higher velocities for thin materials. This means that the best yield and highest purity of B can be obtained by separating by size and thickness and then elutriating the different fractions at different velocities. The results also suggest that different thicknesses of B can be separated using elutriation.

Example 5

Thickness/Friction Sorting to Stabilize the Composition of Feed to a Plastic Recycling Plant Plastics from automotive shredder residue tend to be very thick (>3 mm), whereas plastics from white goods tend to be very thin (<2.5 mm). If a preprocessing center receives a mixture of automotive shredder residue and white goods in varying quantities, the feed can be separated into two much more uniform products that can then be sent to separate plastics recycling processes designed for the particular types of feed.

Example 6

Thickness/Friction Sorting to Stabilize the Composition of Feed to a Plastic Recycling Plant Plastics from automotive shredder residue tend to be dark colors such as black, red, blue or dark gray, whereas plastics from white goods tend to be light colors such as beige or white. If a preprocessing center receives a mixture of automotive shredder residue and white goods in varying quantities, the feed can be separated into two much more uniform products that can then be sent to separate plastics recycling processes designed for the particular types of feed.

Example 7

Wet Granulation of Plastic Flakes

FIG. 27 shows the cumulative particle size distributions of plastic flakes from Japanese white goods granulated with a 6 mm screen (wet) or a ¼ inch (6.25 mm) screen (dry). As shown in FIG. 27, the particle size distribution for wet granulation is much sharper.

Example 8

Separation of Plastics from Mixed Office Automation Equipment Using Hydrocyclones FIG. 28 shows a density histogram of plastics found in a mixture recovered from office automation equipment.

Using an EP of 0.008 (as suggested by FIG. 2), the separation of the mixture shown in FIG. 28 can be predicted at a separation density of 1.060. Table 7 shows the yields and compositions of the overflow (less dense) and underflow (more dense) products from the separation. These results suggest that density separation can be useful for enriching this mixture for further separations.

TABLE 7

Yields and Compositions of Feed and Products of Density Separation

| stream | Yield (%) | % HIPS | % ABS | % SAN |
| --- | --- | --- | --- | --- |
| feed | 100 | 64 | 22 | 13 |
| overflow | 68.4 | 84 | 12 | 4 |
| underflow | 30.6 | 21 | 46 | 33 |

Example 9

Separation of Plastics from Mixed Office Automation Equipment Using DPDS

Suppose the mixture shown in FIG. 28 is sent through a system such as that shown in FIG. 4. The separation density of all three devices is 1.060 and the EP of all three devices are 0.008.

Table 8 shows the predicted yields and compositions of the underflow and overflow for single precision (SPDS) and double precision (DPDS) density separations. As shown in the table, the separation is expected to be greatly improved using DPDS relative to SPDS.

TABLE 8

Yields and Compositions of Products of Density Separation

| stream | Yield (%) | % HIPS | % ABS | % SAN |
| --- | --- | --- | --- | --- |
| overflow (SPDS) | 68.4 | 84 | 12 | 4 |
| overflow (DPDS) | 69.8 | 89 | 10 | 1 |
| underflow (SPDS) | 30.6 | 21 | 46 | 33 |
| underflow (DPDS) | 30.2 | 8 | 51 | 41 |

Example 10

Separation of Plastics by Elutriation

A mixture of Size III plastics flakes derived from Japanese white goods was placed in an elutriator. The mixture contained A (<1.0), B (1.0-1.1), C (1.1-1.2) and D+ (>1.2) materials. All of the A materials floated to the surface without flow, and none of the D+ materials floated at the flow velocities used in the study.

The light product from this elutriation contains A and B along with small amounts of C plastics. This light product could be sent to a hydrocyclone to remove nearly all of the A with little loss of B and C density fractions.

The fractions of B and C in the floating material are analyzed as the flow at the bottom of the elutriator was progressively increased. FIG. 29 shows the cumulative yield and weight percent of B as a function of the upward water velocity in the elutriator.

Example 11

Gravity Concentration Improved by or to Improve Color Sorting

Mixtures of B (specific gravity between 1.00 and 1.10) and C (specific gravity between 1.10 and 1.20) plastics derived from Japanese white goods were separated using an elutriator. The flakes in the mixture were all thick (>3 mm thickness) and were size II (½-¾).

FIG. 30 shows the % light colored plastic in the less dense (light) and more dense (heavy) product mixtures as a function of the upward water velocity. FIG. 30 also shows that the fraction of light colored flakes in the less dense product decreases with elutriator velocity and the fraction of dark colored flakes in the more dense product increases with elutriator velocity. This means that elutriation at a lower velocity could be used to stabilize the color composition against variability in the amount of higher density dark plastics.

Wet elutriation is a useful technique to sort by color because many higher density plastics such as those containing flame retardants or glass fibers are associated with dark colors in some cases.

Example 12

Separation of Different Grades of ABS Using Gravity Concentration

Different grades of ABS can have significantly different densities depending on their chemical composition (e.g. acrylonitrile content) and the amount of pigment added to the polymer. FIG. 31 shows the density distribution of a mixture of ABS flakes recovered from shredded U.S. refrigerators.

Example 13

Color Sorting Size II Flakes

A sample of flakes with a top size of 25 mm and an average size of about 13 mm derived from white goods was color sorted using a belt color sorter tuned to eject dark flakes smaller than about 5 mm in diameter. This color sorter removed defect particles by blasting them with air after they begin to fall off the end of a rapidly moving belt.

The feed was a mixture of primarily white, gray and black plastic. The dark gray and black that is to be ejected was about 25% of the feed.

Table 9 shows the relative amounts of feed (F), light product (P) and dark reject (R) along with the fractions of dark material in each of these streams. The belt color sorter concentrates dark flakes in the reject stream.

TABLE 9

Color Sorting Size II Material with a belt color sorter

| F | $f_{dark}$ | P | $P_{dark}$ | R | $r_{dark}$ |
|---|---|---|---|---|---|
| 1 | 0.25 | 0.62 | 0.013 | 0.38 | 0.63 |

Example 14

Color Sorting Size III Flakes

Various compositions of black flakes mixed with light gray flakes were created from plastics from office automation equipment. Various size ranges were examined to determine the best size for color sorting.

FIG. 32 shows the product purity as a function of feed defect composition for different particle size ranges using a sliding chute color sorter. The chutes are those typically used for plastic flakes. Performance is better for intermediate size particles ¼-⅜ (6-9 mm) than for particles smaller than ¼ (<6 mm). Smaller particles can be more difficult to detect and eject.

Example 15

Purification of PP from White Goods Using Color Sorting

An A density material derived from Japanese white goods contains a mixture of light gray, medium gray, dark and colored (red, blue, brown, green, etc.) flakes. The flakes are mostly PP, but smaller amounts of PE, ABS and HIPS are present. Table 10 shows the plastic compositions of the different colors.

TABLE 10

Compositions of Color Fractions of Color Sorter Secondary Product (A Stream) from Japanese White Goods

| Color Category | % PP | % PE | % HIPS | % ABS | % other |
|---|---|---|---|---|---|
| light gray | 84 | 8 | 4 | 4 | 0 |
| medium gray | 92 | 0 | 8 | 0 | 0 |
| dark | 75 | 0 | 22 | 0 | 3 |
| colors | 91 | 0 | 0 | 7 | 2 |

These results suggest that a color sort to remove medium gray and darker flakes can remove much of the HIPS from the material. This separation might simplify further processing of the material.

Example 16

Removal of Rubber Based on Differential Frictional and Elastic Properties

In this experiment, a plastic-rich material from Japanese white goods is dropped about 3 cm from a vibratory feeder into chutes that are at an angle of about 60° with respect to horizontal. The material slides down the chutes, which are about five feet long. Plastic sheets are placed on top of the chutes to keep the material from bouncing and/or spilling out of the chutes. The sheets are placed over an angled cross bar that is located towards the bottom of the chutes, as shown in FIG. 33.

As material is run down the chute, a small amount collects on the angled crossbar. The sample was analyzed in the lab to determine the composition. Table 11 shows the amounts of various materials in the sample

TABLE 11

Composition of accumulated rubber-rich stream

| material | amount |
|---|---|
| White rigid plastic | 8% |
| Other rigid plastic | 14% |
| Rubber (red, black gray, colors) | 76% |
| Foam | 2% |

Example 17

Improvement of Light Colored Plastic Derived from Japanese White Goods

Thickness sorting was performed on light colored plastic derived from Japanese white goods using slot sorting sieves with thicknesses of 1.8, 2.0 and 2.6 mm. The sample was placed inside the sieve and screened for 5 minutes while rotating the sieve at about 50 rpm. The thin material fell out of the rotating drum sieve and thick materials remained inside.

Table 12, below, shows the plastic compositions of the various thickness fractions of the light colored plastic sample.

These results show that HIPS tends to be thicker than ABS and PP for this sample of light colored material from Japanese white goods. The purity of HIPS can therefore be improved by thickness sorting. Approximately 34% of the stream can be recovered as high purity HIPS by selectively recovering the thick (>2.6 mm) fraction. The increased purity should result in improved properties for this material.

Example 18

Improvement of Dark Colored Plastic

A plastic mixture was the byproduct from color sorting the B density fraction from a Japanese white goods feed material. This material was a mixture of several types of plastics that were mostly white black or clear. The mixture was separated into various thickness fractions with a slot thickness sorter.

Table 12 shows the color compositions of the various thickness fractions. The thicker fraction which contains a majority of the material also is significantly enriched in black plastic. This thickness separation could be used to facilitate a subsequent color sorting stage that might be used to yield a relatively pure black product.

TABLE 12

Color Compositions and Total Yields of the Various Thickness (in mm) Fractions of Dark HIPS

|  | <1.8 | 1.8-2.0 | 2.0-2.3 | 2.3-2.6 | >2.6 |
|---|---|---|---|---|---|
| % white | 76 | 63 | 51 | 44 | 23 |
| % clear | 2 | 3 | 3 | 9 | 9 |
| % dark | 23 | 34 | 46 | 47 | 69 |
| % of dark plastic mixture | 13 | 8 | 16 | 11 | 52 |

Example 19

Improvement of a Mixed Plastic Stream

A plastic mixture was a product from various color sorting stages on the B density fraction from a Japanese white goods feed material. This material was a mixture of several types of plastics that were mostly white or clear, but with some dark flakes. The mixture was separated into various thickness fractions with a slot thickness sorter.

Because the amount of clear plastic was fairly small in the B stream, color sorting to isolate the clear plastic was slow and inefficient.

We observed that the clear plastic tends to be much thicker than the opaque plastic, as shown in Table 14. Thickness sorting can therefore be used to obtain a much higher purity stream of clear plastic that could be more easily sorted by color or other means.

TABLE 14

Color Compositions and Total Yields of the Various Thickness (in mm) Fractions of Clear PS

|  | <1.8 | 1.8-2.0 | 2.0-2.3 | 2.3-2.6 | >2.6 |
|---|---|---|---|---|---|
| % white | 91 | 81 | 51 | 32 | 32 |
| % clear | 3 | 17 | 41 | 65 | 66 |
| % dark | 6 | 2 | 7 | 3 | 0 |
| % of mixed plastic | 11 | 6 | 13 | 15 | 54 |

Example 20

Granulation to Obtain a Narrow Surface to Volume Distribution

Plastic flakes derived from a Japanese source of white goods were the raw material for this example. Flakes of intermediate size (Size III) were created using a granulator with a ¾ (19 mm) screen. This material was then reduced in size (to Size IV) using another granulator with a ⅜ (9.5 mm) screen.

FIG. 34 shows the particle size distributions before (size III) and after (size IV) this granulation stage. The particle size distribution is narrower for the size IV material. The surface to mass distribution is expected to be narrower as well.

In order to test the assumption that the surface to mass distribution is narrower for the Size IV flakes, we can calculate a surface to volume ratio by assuming geometry. We assume that the particles are cylindrical disks with a diameter d and thickness t. The mass per particle was measured in each particle size fraction (where d is the particle size) and then calculate the surface to volume ratio using equation (1). The surface to mass ratio is then easily determined by dividing by the particle density.

$$\frac{S}{V} = \frac{2\pi\left(\frac{d}{2}\right)^2 + \pi dt}{\pi\left(\frac{d}{2}\right)^2 t} = \frac{2}{t} + \frac{4}{d} \quad (1)$$

Using this equation and the distributions in FIG. 34, the following curve was obtained for the cumulative surface to volume distribution for size III and size IV flakes.

According to FIG. 35, roughly 90% of the size IV material has an SN between 19 and 22 $cm^{-1}$. For the size III material, on the other hand, only about 50% has an SN between 14 and 22 $cm^{-1}$. The size IV material therefore has a narrower S/V distribution than the size III material.

The exact values of S/V in the curve depend on the cylindrical disk geometry assumption, but the same trends are observed if other geometries are assumed for the S/V calculation.

The large S/V particles can be problematic for some processes requiring a narrow surface to mass distribution. Air classification and screening are techniques capable of separating particles with a high SN.

Example 21

Thickness/Friction Sorting to Obtain a Narrow Surface to Volume Distribution

Equation 1 demonstrates that thin particles of a given size d should have a larger S/V than thicker particles with the same size d. Therefore, thickness sorting can be applied to size III material to separate out higher S/V flakes.

The size III material was separated by thickness using a roll thickness sorter manufactured by American International Manufacturing Company (Woodland, Calif.). Thin material was able to pass between rotating rollers set at a gap which was adjusted to become larger as the flake material passed from the feeder towards the end of the rollers. Thin material fell between the rollers close to the feeder. Mid material fell between the rollers from half way down the rollers to the end of the sorter. Thick material was unable to pass between the rollers. The roller spacing was set such that the thin material fell through a spacing between rollers thinner than 0.22 cm, the mid fraction passed through a spacing between rollers between 0.22 and 0.28 cm and the thick fraction did not pass through a spacing between rollers of 0.28 cm. Table 15 shows the yields for this separation as well as the average thickness calculated using Equation 1.

TABLE 15

Yields in Thickness Fractions of Size III Feed Material

| thickness | yield | calculated t (cm) |
|---|---|---|
| thin (<0.22 cm) | 6.6% | 0.14 ± 0.02 |
| mid (0.22-0.28 cm) | 8.1% | 0.16 ± 0.02 |
| thick (>0.28 cm) | 85.3% | 0.24 ± 0.03 |

FIG. 36 shows the cumulative S/V distributions for the size II thin and size IV fractions. Both materials have very similar S/V distributions.

Example 22

Surface to Mass Control Using an Air-Leg Separator on Shredded Plastic

A mixture of shredded plastic (less than 10 cm) was separated in an air-leg separator which feeds the stock into an upward flowing air stream which lifts particles with a lower terminal velocity. The products of the separation were heavy (H) and light (L) fractions. The separation, which is based on the drag on materials in an upward flowing air stream, results in the H stream containing mostly thicker parts and the L stream containing mostly thinner parts.

The L and H fractions were separately granulated using a 5/16 (8 mm) screen. The granulated plastic mixtures were separated in a TES separation system to yield two high purity ABS products and two high purity HIPS products.

Table 16 shows the average mass per particle of the four products. The product particles recovered from the H stream are significantly heavier than those recovered from the L stream. Since the particle size distributions of the two streams are similar, this suggests that the L stream is thinner on average, and therefore has a higher surface to mass ratio.

TABLE 16

Average mass per particle for TES products

| product | mass per particle (g) |
|---|---|
| L ABS | 0.015 |
| L HIPS | 0.018 |
| H ABS | 0.030 |
| H HIPS | 0.031 |

Example 23

Surface to Mass Control Using an Air-Leg Separator on Granulated Plastic

A mixture of plastic granulated to pass an 8 mm screen was separated in an air-leg separator into heavy (H) and light (L) fractions. FIG. 38 shows the thickness distribution of the L and H fractions. Since the size distributions for the two streams are similar, it is clear that the L material has a larger average surface to mass ratio.

Example 24

Two Stage TES of Mixtures of ABS and HIPS

Because of their similar densities, ABS and HIPS tend to report in the same fraction when a mixed plastic stream derived from durable goods is separated by density. In appliance feed streams, smaller amounts of components such as PP (both filled and unfilled) also report in the same density fraction. The separation of the mixture into pure components is important in order to achieve products with desirable properties. TES techniques can be used to perform such separations.

A two stage TES separation such as that shown in FIG. 12 was used to recover nearly pure streams of ABS and HIPS from a stream containing primarily ABS, HIPS and PP. Prior to density separation and TES, a shredded plastics-rich feed material was sorted into L and H streams using an air-leg separator. The final products from the TES separation were those described in Example 22.

In order to achieve similar particle deflections, the electric fields in the TES separators were set much higher for the H material than for the L material. This resulted in high purity ABS and HIPS products for both the L and H streams.

Table 17 compares the % purity for the L and H product streams with the purity of similar streams without surface to mass control (N ABS and N HIPS). The products obtained after surface to mass control are higher in purity than those obtained without surface to mass control.

Table 17 also shows the properties of the ABS and HIPS products recovered using TES with both with and without surface to mass control. The melt flow rates were measured according to ASTM D 1238, the notched izod impact strengths were measured according to ASTM D256 and the tensile strengths at yield were measured according to ASTM D638.

TABLE 17

Properties of light gray ABS and HIPS products from TES with (L and H) and without (N) surface to mass control

| product | % purity | MFR (g/10 min) | NI (J/m) | TS @ Y (MPa) |
|---|---|---|---|---|
| L ABS | 98 | 3.4 | 154 | 43.5 |
| H ABS | 92 | 8.6 | 96 | 42.0 |
| N ABS | 88 | 5.8 | 96 | 38.6 |
| L HIPS | 94 | 4.2 | 85 | 26.4 |
| H HIPS | 86 | 4.0 | 85 | 29.4 |
| N HIPS | 84 | 5.8 | 58 | 25.8 |

The mechanical properties of the ABS and HIPS, especially the notched izod impact strengths, are better for the products that were processed by TES after surface to mass control. These improved mechanical properties are most likely due to the higher purity.

Another key property difference is the melt flow rates for the various ABS products. Extrusion grades of ABS are often used in thin wall applications such as refrigerator liners. The L stream tends to be enriched in thinner plastic pieces such as these refrigerator liners. Since extrusion grades have lower melt flow rates than injection molding grades, the L stream has a lower melt flow rate than the H stream. In addition, the ABS with no thickness sorting will have a melt flow rate that is intermediate between extrusion and injection molding grades. We therefore should be able to control the product melt flow rate by careful recombination of the L and H products.

Example 25

Preparation and Evaluation of Tailored Media Sheet

The raw materials for the TMS in this example were ABS (Magnum 3490 from Dow Chemical) and Beki-Shield GR75/C12-E/5 from Bekaert Corporation. Beki-Shield GR75/C12-E/5 is a concentrate containing 75% stainless steel fibers (8 micron diameter), 10% thermoplastic polyester in which the fibers are embedded, and 15% ethylene acrylic acid zinc ionomer as a coating for the 2 mm diameter pellets. ABS tensile specimens with 0, 5 and 10 weight percent Beki-Shield were compounded and injection molded into tensile specimens.

The HIPS used in this trial was gray HIPS recovered from office automation equipment by MBA Polymers. This HIPS was injection molded into tensile specimens using standard procedures.

ABS specimen was placed in contact with a grounded stainless steel plate. A HIPS specimen with zero initial charge was then rubbed against the ABS specimen (while still in contact with the plate) for about 5 seconds. The charge on the HIPS specimen was then measured with a Faraday cup. The charge on the HIPS specimen was then neutralized with the deionizing blower and the test was repeated.

The charging and measurement sequence, which took between 10 and 20 seconds per cycle, was repeated about 20-30 times for both ABS without Beki-Shield and ABS with 5 weight percent Beki-Shield.

The charge on the ABS specimen was also measured periodically to see if it would stabilize at a steady value.

The charge on the ABS specimens gradually increased and stabilized at about +13 nC (5% Beki-Shield) and +16 nC (without Beki-Shield) after about 10-20 cycles of charging. The charge on an ABS specimen with 10% Beki-Shield was close to zero, however, indicating that it was conductive.

The charge on the HIPS specimen remained constant at about −1.0 to −2.0 nC for each cycle.

Natural ABS would not charge against any of the Beki-Shield filled ABS materials. This is another good indication that the stainless steel is not drastically altering the charging properties of the ABS.

In addition, a 10% Beki-Shield specimen was rubbed against a polyethylene bag with which we were holding the specimen. The specimen was placed in front of the deionizing blower and measured the charge on the specimen. We found a charge of about −0.2 nC, indicating that electrons were migrating from the bag to the ABS specimen. This further confirmed the conductivity of the ABS with 10% Beki-Shield.

The results of these tests suggest that there is almost no conductivity in the ABS with 5% Beki-Shield and that ABS with 10% Beki-Shield is conductive. In addition, the ability of the filled materials to charge HIPS is comparable to that of ABS without additive. The results also suggest that it can be possible to charge a large amount of plastics in a mixture before the media is saturated to the extent that it can no longer charge the mixture, even if only 0 or 5% Beki-Shield is used.

Example 26

Separation of ABS from SAN Using TES

A surface to mass of particles in a mixture of ABS and SAN from Japanese mixed electronics waste was carefully controlled using a combination of roll sorting along with air table separation. The mixture was passed through a triboelectrostatic separator and both positive and negative products were collected. A middle fraction was recirculated.

The color compositions of the positive and negative products are given in Table 18. The clear plastic (mostly SAN) is clearly concentrated in the product collected at the negative electrode. Dark and colored (green, blue, red, etc.) flakes are concentrated at the positive electrode.

TABLE 18

Color composition of positive and negative products

| electrode | % clear | % light gray | % dark | % colors |
|---|---|---|---|---|
| negative | 52 | 31 | 7 | 10 |
| positive | 3 | 66 | 23 | 23 |

An analysis of the products also showed that a small amount of HIPS (6%) concentrated in the positive electrode product stream. The separation also results in two products with different properties. Table 19 gives the properties of the two product streams as well as of a 50:50 mixture of the streams.

TABLE 19

Properties of ABS/SAN TES products

| electrode | MFR (g/10 min) | NI (J/m) | TS @ Y (MPa) |
|---|---|---|---|
| negative | 9.8 | 46 | 51.9 |
| positive | 8.3 | 102 | 42.7 |
| 50:50 mixture | N/A | 75 | 46.5 |

Example 27

Separation of PC/ABS from Flame Retarded ABS Using TES

A 50:50 mixture of PC/ABS and flame retarded ABS (ABS-FR) passed through a triboelectrostatic separator and both positive and negative products were collected. The product compositions are given in Table 20.

TABLE 20

Compositions of products from TES of ABS-FR and PC/ABS

| stream | % PC/ABS | % ABS-FR |
|---|---|---|
| feed | 50 | 50 |
| negative electrode | 96 | 4 |
| positive electrode | 12 | 88 |
| middle | 30 | 70 |

Example 28

Separation of HIPS from Flame Retarded HIPS Using TES

A 50:50 mixture of HIPS and flame retarded HIPS (HIPS-FR) passed through a triboelectrostatic separator and both positive and negative products were collected. The yields and product compositions are given in Table 21. The negative electrode product is clearly enriched in HIPS and the middle and positive electrode products are enriched in HIPS-FR.

TABLE 21

Compositions of products from TES of HIPS and HIPS-FR

| stream | Yield % | % HIPS | % HIPS-FR |
|---|---|---|---|
| feed | 100 | 50 | 50 |
| negative electrode | 24 | 79 | 21 |
| positive electrode | 24 | 42 | 58 |
| middle | 52 | 42 | 58 |

Example 29

The Use of Thickness/Friction Sorting to Create PP Products

Consider a PP-rich product after wet separation of a stream of Japanese white goods. This material can be further separated with color sorting and electrostatic separation as described in the standard overall process. The light product obtained from this process is called standard light PP.

Surface to mass control and electrostatic separation are processes that can be somewhat difficult to control and are also relatively expensive. It therefore can be desirable to use somewhat simpler processes such as thickness/friction sorting.

The Size III light product from the color sorter is sorted in a slot thickness sorter with a slot thickness of 2.5 mm. A majority of the material (72%) reports to the thick fraction. The thick light PP and thin light PP fractions are both extruded and tested without further separation processes.

Table 22 shows the properties of standard light PP, thick light PP and thin light PP. The thick light product has properties similar to the standard light product. The mechanical properties of the thin light product are somewhat lower, but presumably these could be improved by the use of surface to mass control and electrostatic separation to remove plastic impurities such as ABS, HIPS and PE that would tend to be in the thin fraction.

TABLE 22

Properties of light PP Products obtained from Japanese white goods

| sample | MFR (g/10 min) (230° C./2.16 kg) | NI (J/m) | TS @ Y (MPa) |
|---|---|---|---|
| standard light PP | 24 | 62 | 24.8 |
| thin light PP | 32 | 51 | 23.9 |
| thick light PP | 29 | 64 | 25.2 |

Example 30

Thickness Sorting to Create Separate Grades of ABS from U.S. Refrigerators

Based on the above discussions of the composition of ABS in refrigerators, extrusion grades of ABS are expected to be more concentrated in the thinner fractions. A stream of nearly pure ABS is separated from U.S. refrigerators into thin (<1.6 mm), mid (1.6-2.8 mm) and thick (>2.8 mm) fractions using a slot thickness sorter. Forty-two percent of the size IV flakes reported to the thin fraction, 38% to the mid fraction, and 20% to the thick fraction.

Table 23 shows the properties of the mixed light ABS, thin light ABS, mid light ABS and thick light ABS products. The slightly lower melt flow rate impact strength in the thin fraction suggests a concentration of extrusion grade ABS in the fraction. The thickness sorting was performed on size IV flakes. There can be an even greater differentiation when performed on size In flakes.

TABLE 23

Properties of light ABS products from U.S. refrigerators

| sample | MFR (g/10 min) | TSY (MPa) | NI (J/m) |
|---|---|---|---|
| mixed light ABS | 2.3 | 42.8 | 171 |
| thin light ABS | 1.9 | 41.8 | 134 |
| mid light ABS | 2.1 | 42.1 | 155 |
| thick light ABS | 2.4 | 41.9 | 171 |

Example 31

Thickness Sorting to Create ABS Grades from Japanese White Goods

ABS tends to be thinner than HIPS, rubber and SAN. An ABS-rich flake product from a stream of Japanese white goods was sorted with a slot thickness sorter. Table 24 shows the compositions of the various thickness fractions in relation to the light colored ABS product.

TABLE 24

Plastic Compositions and Total Yields of the Various Thickness (in mm) Fractions of Light ABS

|  | <2.0 | 2.0-2.6 | >2.6 | Light ABS product |
|---|---|---|---|---|
| % ABS | 99 | 72 | 64 | 87 |
| % HIPS | 0.5 | 3 | 6 | 2 |
| % SAN | 0.5 | 5 | 24 | 7 |
| % PP | 0 | 7 | 0 | 1 |
| % rubber | 0 | 0 | 5 | 2 |
| % other | 0 | 10 | 0 | 2 |
| % of light ABS product | 61 | 17 | 22 | 100 |

These results shows that HIPS, SAN and rubber are concentrated in the thicker fraction. This fact suggests that thickness sorting can greatly improve the usefulness of the ABS product. About 61% of the light ABS product could be recovered as a nearly pure ABS material by recovering the fraction thinner than 2.0 mm.

Rubber tends to clog the melt filtration screen pack during extrusion of the recovered plastics. The removal of rubber is therefore preferred. Such removal can be accomplished by recovery of the fraction of the light ABS product thinner than 2.0 mm.

Since HIPS is incompatible with ABS, the removal of fractions thicker than 2.0 mm typically yield a high purity ABS product with improved properties. The removal of thicker HIPS typically improve the toughness of the product and increase the tensile strength.

SAN is compatible with ABS, but is stronger and not as tough. The removal of SAN typically results in improved toughness with some sacrifice in tensile strength. Table 8 shows that recovery of the fraction thinner than 2.0 mm in the light ABS stream would yield a product essentially free of SAN.

Another advantage of sorting the light colored ABS product by thickness is the fact that thick and thin ABS parts tend to be made using different grades. Extrusion grades tend to be used in thin thermoformed parts in appliances such as refrigerators. Higher melt flow rate injection molding grades tend to be used in thicker injection molding parts.

For a light-colored ABS product from Japanese white goods, the fraction thinner than 2.0 mm (thin light ABS) was recovered for comparison with the standard light ABS sample.

The properties for standard light ABS and thin light ABS are shown in Table 25. The thin fraction tends to have a lower melt flow rate indicative of being derived from extrusion grades of ABS. The impact strength is also higher for the thin fraction, suggesting that the removal of HIPS and SAN has increased the toughness. Also, the tensile strength is lower. The melt flow rate is at 230° C. and 3.8 kg and the tensile strength is at 0.2 inches per minute crosshead speed.

TABLE 25

Properties of light ABS products from Japanese white goods

| product | MFR (g/10 min) | Ni (J/m) | TSY (MPa) |
|---|---|---|---|
| Standard light ABS | 3.3 | 129 | 48.3 |
| thin light ABS (<2.0 mm) | 1.8 | 166 | 42.2 |

Example 32

Surface to Mass Control and TES for the Purification of ABS

A significant quantity of plastic flakes from appliances was processed through the TES system without surface to mass control. The purity of the ABS product was not acceptable, so further processing was required. The ABS-rich stream was separated into L and H fractions using an air-leg separator. The material was then processed through the TES system to recover L and H products. As in Example 24, the electric fields were set higher for the H stream than for the L stream.

The properties of the two products are shown in Table 26. In this case, the MFR was measured according to the ISO 1133 condition for ABS.

TABLE 26

Properties of gray ABS products from TES

| sample | MFR (g/10 min) @ 220/10.0 | NI (J/m) | TS @ Y (psi) |
|---|---|---|---|
| L ABS | 7.5 | 191 | 41.4 |
| H ABS | 16.4 | 154 | 42.7 |

The properties of the two products are superior to those of ABS that has not been separated by surface to mass prior to TES. There is also a significant difference in the MFR FIG. 39 shows the MFR as a function of composition for various compounds of the L and H ABS products. This figure demonstrates that such recombination can be done to formulate a desired MFR for the product as long as it lies between 7.5 and 16.4 g/10 min.

Example 33

Density Separation at an Elevated Density for Br Removal

Consider the separation of a binary mixture of HIPS(PS) and flame retarded HIPS (FR) with separation and component parameters as described in Table 27. Separation parameters are the same for all devices

TABLE 27

Density Separation Parameter

| Feed Rate | 100 kg/hr |
|---|---|
| $\rho_{PS}$ | 1.05 |
| $\rho_{FR}$ | 1.15 |
| $\rho_0$ | 1.10 |
| EP | 0.01 |

FIG. 40 shows the % Br in the PS product as a function of the feed composition for SPDS, DPDS and when a third density separation stage is included after DPDS. It is assumed that the FR contains 10% Br. For the separation parameters in Table 27, the amount of Br in the PS product decreases by an order of magnitude for each additional stage of density separation. FIG. 40 also shows that the use of two or more stages allows for adequate separation over a broad range of feed compositions.

Example 34

Elutriation to Remove Br-Containing Plastics

A Size II feed material derived from Japanese white goods contained a significant amount of metal including large chunks, thin strips of metal, and wires. The material was fed to gravity concentration system with the upward water velocity set to 0.13 m/s.

The types of material were categorized as target plastics, heavy plastics and metal. Target plastics consisted of plastics with a density less than 1.20 g/cm$^3$. Heavy plastics included all plastics more dense than 1.20 g/cm$^3$. Metal included chunks of metal, thin strips of metal, and wires.

Table 4 shows the weight percentages of target plastics, heavy plastics and metal in the feed, lights and heavies streams. These results show that a gravity concentration system can effectively remove all metal and the majority of heavy plastics in a single stage.

Example 35

Separation of a Mixture Containing ETPs

Consider a mixture derived from office automation equipment with the density distribution shown in FIG. 40. Based on grades being defined by distinct densities, the mixture contains two grades of HIPS-FR (at 1.150 and 1.170), three grades of ABS-FR (1.150, 1.165 and 1.180), three grades of PC/ABS (1.150, 1.165, 1.180), three grades of PC/ABS-FR (1.155, 1.170, 1.195) and three grades of PC (1.165, 1.180, 1.195).

From the mixture described by FIG. 40, a HIPS-FR product, one or more ABS-FR products and one or more PC (a composite of PC, PC/ABS and PC/ABS-FR) products can be recovered.

In order recover these products, first a DPDS can be performed at about 1.170 followed by TES to recover the various products. This simplifies further TES by creating two slightly simpler TES feed mixtures.

If the plastics can lose electrons to be PC>PC/ABS>PC/ABS-FR>ABS-FR>HIPS-FR, the PC components can be lumped together using TES.

A proposed process for recovering high purity products is given by FIGS. 41 through 44. The more dense product from a density separation at about 1.12 g/cm$^3$ is often referred to as the C+ fraction because A and B density fractions (materials with densities less than about 1.12 g/cm³) have been removed. The C and D density fractions are taken to be the less dense (C) and more dense (D) products of a density separation at 1.17 g/cm³. More dense materials from a density separation at 1.25 g/cm³ the E+product.

If the mixture shown in FIG. 41 is separated using the process flow described by FIGS. 42-44 with typical separation parameters, yields shown in FIG. 45 and compositions shown in Table 28 are predicted.

TABLE 28

Predicted Compositions of Feed, Products and Byproducts

| stream | % HIPSFR | % ABSFR | % PC/ABS | % PC/ABS-FR | PC | % PC | % impurity |
|---|---|---|---|---|---|---|---|
| feed | 26 | 27 | 14 | 26 | | 47 | na |
| C total | 34 | 27 | 6 | 31 | | 39 | na |
| D total | 3 | 28 | 35 | 14 | 1 | 69 | na |
| C HIPSFR | 98.2 | 1.8 | 0 | 0 | | 0 | 1.8 |
| C PC | 0 | 0.05 | 17 | 78 | .5 | 99.95 | 0.05 |
| D PC | 0 | 0.02 | 52 | 17 | 1 | 99.98 | 0.02 |
| C ABSFR | 2.7 | 96.8 | 0 | 0.5 | | 0.5 | 3.2 |
| D ABSFR | 3.7 | 95.2 | 0.01 | 1.1 | | 1.1 | 4.8 |
| byproducts | 20 | 58 | 1 | 20 | | 21 | na |

Impurities for HIPSFR are ABSFR and all PC. Impurities for ABSFR are HIPSFR and all PC. Impurities for PC are ABSFR and HIPSFR.

FIG. 46 shows the % impurity in the ABS-FR, HIPS-FR and PC products as a function of the number of TES stages. The slopes differ due to selection of component and separator parameters, but the trend in all cases is that the purity of the various products improves with increasing numbers of TES stages.

The number of stages required will actually depend on the required purity. ABSFR and HIPSFR are tolerant of small amounts of impurities (especially of each other), so they may be recovered before achieving very low levels of impurities. This could mean three or more stages for ABSFR, but likely fewer for HIPSFR.

For PC, on the other hand, impurity concentrations below about 0.1% are required. This means that four or more TES stages can be required even without recovering the separate PC components.

Suppose the DPDS was eliminated at 1.17 and the entire feed was processed as C material. FIG. 47 shows the yields and Table 29 shows the compositions of the products from such a separation when the TES separator parameters remain the same as for the previous simulation.

TABLE 29

Predicted Compositions of Feed, Products and Byproducts without DPDS

| stream | % HIPSFR | % ABSFR | % PC/ABS | % PC/ABS-FR | PC | % PC | % impurity |
|---|---|---|---|---|---|---|---|
| feed | 26 | 27 | 14 | 26 | | 47 | na |
| C HIPSFR | 96.8 | 3.2 | 0 | 0.04 | | 0.04 | 3.2 |
| C PC | 0 | 0.02 | 31 | 54 | 15 | 99.98 | 0.02 |
| C ABSFR | 1.6 | 97.9 | 0 | 0.6 | | 0.6 | 3.2 |
| byproducts | 12 | 64 | 0.5 | 24 | | 21 | na |

The yields and compositions appear to be very similar to those with DPDS at 1.17.

The primary advantage to DPDS is in fact the separation of different ABSFR grades and some differentiation of PC types and grades. FIGS. 48 and 49 show more detailed compositional breakdowns of ABSFR and PC with and without DPDS.

As shown in FIG. 48, DPDS at 1.17 gives ABS-FR products enriched in either ABS-FR I (C) or ABS-FR III (D)). The composition of the mixture without DPDS is more mixed, and also more difficult to control if the feed composition varies.

Since properties (especially flammability) likely depend on the mixture of ABS-FR grades, control over the composition may be valuable.

As shown in FIG. 49, the compositions of C and D PC mixtures are quite different. Though the mixtures are still complex, it should be easier to control product properties by splitting into C and D streams. In addition, splitting into C and D streams should facilitate further separation into unique PC, PC/ABS and PC/ABS-FR products if required.

FIG. 50 shows the percent impurity in the D stream PC as a function of the number of TES stages for various values of a parameter $\in$ which describes the effectiveness of TES. The purity of the PC stream does improve significantly with extra TES stages and improved separation (small $\in$).

A number of embodiments of the invention have been described. Nevertheless, it will be understood that various modifications can be made without departing from the spirit and scope of the invention. Accordingly, other embodiments are within the scope of the following claims.

What is claimed is:

1. A plastic recycling process, comprising:
   receiving a plastic-rich mixture that includes at least two types of plastics;
   determining the plastic-rich mixture to have at least one property, wherein the property is an amount of metal in the mixture, a range of densities, a difference in thicknesses, friction, adhesion or elasticity, different relative charging characteristics, different conductivity, an amount of trapped moisture or gases, a range of colors, a particle size or a difference in viscosity;
   selecting, based on the at least one property, at least six processes for processing the plastic-rich mixture, wherein the selection is also based on a type of a feed source for the plastic-rich mixture, a geographical origin of the feed source, or a temporal distribution of the types of plastics in the mixture, wherein the at least six processes comprise the following sequence of processes in an order of:
   a) a preprocessing step;
   b) a size reduction step;

c) a surface to mass control process, which involves sorting with an air table and which results in two or more fractions that each have a narrow distribution of surface to mass ratios;
d) a separation process which separates a first plastic type from a second plastic type and is enhanced by the narrow distribution of surface to mass ratios, the process involving either electrostatic sorting, froth flotation, or density differential alteration, wherein the two or more fractions resulting from the surface to mass control process are treated by the separation process separately from one another;
e) a blending step; and
f) an extrusion step;
subjecting the plastic-rich mixture to the sequence of processes; and
collecting a recycled plastic material as an output of the sequence of processes.

2. The process of claim 1, wherein:
selecting the processes includes determining a desired recycled plastic material and selecting the processes to cause the recycled plastic material to include the desired recycled plastic material.

3. The process of claim 1, wherein:
subjecting the plastic-rich mixture to the surface to mass control process and the separation process includes separating the plastic-rich mixture into different grades of plastic material.

4. The process of claim 1, wherein:
subjecting the plastic-rich mixture to the surface to mass control process and the separation process includes separating the plastic-rich mixture into different types of plastic material.

5. The process of claim 1, further comprising:
selecting the plastic-rich mixture from a source selected from the group consisting of white goods, office automation equipment, consumer electronics, automotive shredder residue, packaging waste, and household waste according to one or more desired properties of the recycled plastic material.

6. The process of claim 1, further comprising:
selecting the plastic-rich mixture based on a geographic location of origin of the plastic-rich mixture.

7. The process of claim 1, wherein:
selecting the at least six processes includes determining one or more desired properties of the recycled plastic material.

8. The process of claim 1, wherein:
one or more of the processes is repeated in the sequence of processes.

9. The process of claim 1, wherein:
the extrusion step includes compounding the recycled plastic material with one or more additives.

10. The process of claim 1, wherein:
collecting a recycled plastic material as an output of the sequence of processes includes collecting a plurality of recycled plastic materials.

11. The process of claim 1, wherein:
the size reduction step includes reducing the average size of plastic particles in the sequence of processes from 75 mm to less than 8 mm.

12. The process of claim 1, wherein:
the preprocessing step including air aspiration.

13. The process of claim 1, wherein:
subjecting the plastic-rich mixture to the size reduction step includes subjecting the plastic-rich mixture to one or more wet granulation size reduction operations.

14. The process of claim 1, wherein:
subjecting the plastic-rich mixture to a preprocessing step includes subjecting the plastic-rich mixture to one or more gravity concentration operations.

15. The process of claim 14, wherein:
subjecting the plastic-rich mixture to one or more gravity concentration operations includes subjecting the plastic-rich mixture to a gravity concentration operation using solid particle media.

16. The process of claim 14, wherein:
subjecting the plastic-rich mixture to one or more gravity concentration operations includes subjecting the plastic-rich mixture to one or more truncated cone hydrocyclones or elutriators to remove metal or non-target plastics from the plastic mixture.

17. The process of claim 1, further comprising:
subjecting the plastic-rich mixture to an arrangement of three consecutive gravity operations.

18. The process of claim 17 wherein:
subjecting the plastic-rich mixture to an arrangement of three consecutive gravity concentration operations includes subjecting the plastic rich mixture to a modified hydrocyclone to remove metal, a modified hydrocyclone to remove high density plastics and a hydrocyclone to separate low from medium density plastics.

19. The process of claim 1, wherein:
receiving a plastic-rich mixture includes receiving a plastic-rich mixture including HIPS, ABS and SAN and the method further comprises:
subjecting the plastic-rich mixture to a gravity concentration operation to create a first stream having a higher percentage of HIPS than the plastic-rich mixture and a second stream having a higher percentage of ABS and SAN than the plastic-rich mixture and the first stream.

20. The process of claim 1, wherein:
receiving a plastic-rich mixture includes receiving a plastic-rich mixture including a first grade of a first plastic type and a second grade of the first plastic type, and the method further comprises: and
subjecting the plastic-rich mixture to a gravity concentration operation to create a first product stream and a second product stream, wherein the first product stream has a higher percentage of the first grade of the first plastic type than the plastic-rich mixture and the second product stream has a higher percentage of the second grade of the first plastic type than the plastic-rich mixture and the first product stream.

21. The process of claim 1, further comprising:
subjecting the plastic-rich mixture to a sliding chute device that removes rubber.

22. The process of claim 1, wherein:
subjecting the plastic-rich mixture to a sequence of processes includes prior to the separation process that is enhanced by the narrow distribution of surface to mass ratios, subjecting the plastic-rich mixture to a gravity concentration operation to create one or more streams of plastic material, followed by the separation process that is enhanced by the narrow distribution of surface to mass ratios, wherein the separation process that is enhanced by the narrow distribution of surface to mass ratios is a triboelectrostatic separation of one of the one or more streams of plastic material.

23. The process of claim 1, wherein:
the separation process that is enhanced by the narrow distribution of surface to mass ratios is a triboelectrostatic separation.

24. The process of claim 1, wherein:
the separation process enhanced by narrow distribution of surface to mass ratios is a triboelectrostatic separation.

25. The process of claim 24, wherein:
subjecting the plastic-rich mixture to a tribelectrostatic separation includes subjecting the plastic-rich mixture to a triboelectrostatic separation in which a charge mediating material is added.

26. The process of claim 24, wherein:
subjecting the plastic-rich mixture to a tribelectrostatic separation includes tuning a triboelectrostatic separator, including selecting a geometry of the triboelectrostatic separator, selecting a charge of charge plates of the triboelectrostatic separator, selecting an angle of the charge plates, or selecting a voltage applied to the charge plates.

27. The process of claim 24, wherein:
subjecting the plastic-rich mixture to a tribelectrostatic separation includes subjecting the plastic-rich mixture to two or more tribelectrostatic separators in series.

28. The process of claim 24, wherein:
subjecting the plastic-rich mixture to a triboelectrostatic separation includes feeding one or more product streams from a first stage triboelectrostatic separator back into the first stage triboelectrostatic separator.

29. The process of claim 24, wherein:
subjecting the plastic-rich mixture to a triboelectrostatic separation includes feeding one or more product streams from a second stage triboelectrostatic separator to a first stage triboelectrostatic separator.

30. The process of claim 24, wherein:
subjecting the plastic-rich mixture to a triboelectrostatic separation includes subjecting one or more product streams from a tribelectrostatic separator to a surface to mass control operation, followed by a subsequent triboelectrostatic separation.

31. The process of claim 1, wherein:
receiving a plastic-rich mixture includes receiving a mixture of ABS and HIPS; and
collecting a recycled plastic material includes collecting a first output and a second output, wherein the first output has a higher percentage of ABS than the plastic-rich mixture and the second output has a higher percentage of HIPS than the plastic-rich mixture.

32. The process of claim 1, wherein:
receiving a plastic-rich mixture includes receiving a mixture including a first plastic type, wherein a first portion of the first plastic type has a first property and a second portion of the first plastic type has a second property; and
collecting a recycled plastic material includes collecting a first output and a second output, wherein the first output includes a higher percentage of the first plastic type than the plastic-rich mixture and the second output includes a higher percentage of the second plastic type than the plastic-rich mixture and the first output.

33. The process of claim 1, wherein:
the separation process that is enhanced by the narrow distribution of surface to mass ratios is a triboelectrostatic separation; and
collecting a recycled plastic material includes collecting a first output and a second output, wherein the first output includes ABS and the second output includes SAN, the first output has a lower percentage of SAN than the second output and the second output has a lower percentage of ABS than the first output.

34. The process of claim 1, wherein:
the blending step combines a first stream including ABS with a second stream including SAN.

35. The process of claim 1, wherein:
the separation process that is enhanced by the narrow distribution of surface to mass ratios is a triboelectrostatic separation to separate PC and ABS from flame retarded ABS and to separate a PC/ABS blend from flame retarded ABS.

36. The process of claim 1, wherein:
the separation process that is enhanced by the narrow distribution of surface to mass ratios is a triboelectrostatic separation to separate flame retarded HIPS from non-flame retarded HIPS.

37. The process of claim 1, wherein:
subjecting the plastic-rich mixture to an extrusion step includes subjecting the plastic-rich mixture to extrusion compounding with screen packing.

38. The process of claim 1, wherein:
subjecting the plastic-rich mixture to an extrusion step includes subjecting the plastic-rich mixture to extrusion compounding with two or more stages of screen packing with increasingly finer mesh screening.

39. The process of claim 1, wherein:
receiving a plastic-rich mixture includes receiving a plastic containing bromine; and
collecting a recycled plastic material includes collecting a first output including at least a portion of the plastic containing bromine and collecting a second output substantially free of the plastic containing bromine.

40. The process of claim 39, further comprising:
one or more of gravity concentration, color sorting, detecting and selectively ejecting materials containing bromine, triboelectrostatic separation or thickness sorting.

41. The process of claim 1, wherein:
collecting a recycled plastic material includes collecting engineering thermoplastics.

42. The process of claim 1, wherein the sequence of processes includes a triboelectrostatic separation after a gravity concentration operation.

* * * * *

UNITED STATES PATENT AND TRADEMARK OFFICE
CERTIFICATE OF CORRECTION

| | | |
|---|---|---|
| PATENT NO. | : 7,802,685 B2 | Page 1 of 1 |
| APPLICATION NO. | : 10/511224 | |
| DATED | : September 28, 2010 | |
| INVENTOR(S) | : Laurence E. Allen, III | |

It is certified that error appears in the above-identified patent and that said Letters Patent is hereby corrected as shown below:

On the Title page, Item (75), line 1, please delete "Allen" and insert --Allen III,--, therefor.

On the Title page, Item (86), line 12, please delete "US03/11602," and insert --US03/11642,--, therefor.

Column 58, line 27 (approx.), In Claim 19, delete "wherein:" and insert --wherein--, therefor.

Column 58, line 36 (approx.), In Claim 20, delete "wherein:" and insert --wherein--, therefor.

Column 58, line 40 (approx.), In Claim 20, after "comprises:" delete "and".

Column 59, line 10, In Claim 26, delete "tribelectrostatic" and insert --triboelectrostatic--, therefor.

Column 59, line 18, In Claim 27, delete "tribelectrostatic" and insert --triboelectrostatic--, therefor.

Column 59, line 20, In Claim 27, delete "tribelectrostatic" and insert --triboelectrostatic--, therefor.

Column 59, line 34 (approx.), In Claim 30, delete "tribelectrostatic" and insert --triboelectrostatic--, therefor.

Signed and Sealed this
Fourth Day of December, 2012

David J. Kappos
*Director of the United States Patent and Trademark Office*